(12) United States Patent
Khomo

(10) Patent No.: US 8,036,465 B2
(45) Date of Patent: Oct. 11, 2011

(54) METHOD OF TEXT INTERACTION USING CHIROGRAPHIC TECHNIQUES

(76) Inventor: Malome T. Khomo, Munster, IN (US)

( * ) Notice: Subject to any disclaimer, the term of this patent is extended or adjusted under 35 U.S.C. 154(b) by 1018 days.

(21) Appl. No.: 10/984,669

(22) Filed: Nov. 9, 2004

(65) Prior Publication Data

US 2005/0084153 A1    Apr. 21, 2005

Related U.S. Application Data

(63) Continuation-in-part of application No. 10/946,546, filed on Sep. 21, 2004, and a continuation-in-part of application No. 10/876,314, filed on Jun. 24, 2004, and a continuation-in-part of application No. 10/840,905, filed on May 7, 2004, and a continuation-in-part of application No. 10/672,647, filed on Sep. 26, 2003, now Pat. No. 7,317,450.

(60) Provisional application No. 60/552,800, filed on Mar. 12, 2004, provisional application No. 60/542,309, filed on Feb. 6, 2004, provisional application No. 60/520,169, filed on Nov. 14, 2003.

(51) Int. Cl.
   *G06K 9/00*    (2006.01)
(52) U.S. Cl. ........................................ 382/187; 382/181
(58) Field of Classification Search ........... 382/181–231
   See application file for complete search history.

(56) References Cited

U.S. PATENT DOCUMENTS

| | | | |
|---|---|---|---|
| 3,807,882 A | | 4/1974 | Munz |
| 3,821,469 A | * | 6/1974 | Whetstone ................ 178/18.04 |
| 3,868,565 A | | 2/1975 | Kuipers |
| 4,232,290 A | * | 11/1980 | Yasuda et al. ................. 382/187 |
| 4,575,580 A | | 3/1986 | Jandrell |
| 4,613,866 A | | 9/1986 | Blood |
| 4,797,841 A | | 1/1989 | Hatch |

(Continued)

FOREIGN PATENT DOCUMENTS

EP    0455147    11/1991

(Continued)

OTHER PUBLICATIONS

Poupyrev, Ivan, et al., "Virtual Notepad: Handwriting in Immersive VR," Proceedings of the IEEE1998 Virtual Reality Annual International Symposium, Vrais '98, Atlanta, GA, Mar. 14-18, 1998, vol. Conf. 5, Mar. 14, 1998, pp. 126-132, XP000799821, ISBN: 978-0-7803-4782-3.

(Continued)

*Primary Examiner* — Phuoc Tran
*Assistant Examiner* — Alex Liew
(74) *Attorney, Agent, or Firm* — McAndrews, Held & Malloy, Ltd.

(57) ABSTRACT

Disclosed herein is a system for operating chirographic devices. The system may support a spatial chirographic sign reader, a spatial character recognition technique, a chirographic text character writer, a chirographic text character setter, a chirographic text character scanner, a spatial chirographic sign rendering technique, and a spatial chirographic styling sign marker. The system may include a central system unit having a real-time timer clock and bus connectors for chirographic input and output devices. Input device drivers may be adapted to collect spatial chirographic data and label samples with real-time data acquisition. Data may be transferred to chirographic applications of the system for character recognition, text setting, handwriting page scanning, sign styling, and image rendering to achieve specific chirographic effects.

7 Claims, 32 Drawing Sheets

U.S. PATENT DOCUMENTS

| | | | |
|---|---|---|---|
| 5,012,049 A | 4/1991 | Schier | |
| 5,308,936 A | 5/1994 | Biggs et al. | |
| 5,397,865 A | 3/1995 | Park | |
| 5,576,727 A | 11/1996 | Rosenberg et al. | |
| 5,587,560 A * | 12/1996 | Crooks et al. | 178/18.03 |
| 5,682,439 A * | 10/1997 | Beernink et al. | 382/187 |
| 5,717,168 A | 2/1998 | DeBuisser et al. | |
| 5,973,677 A | 10/1999 | Gibbons | |
| 6,044,165 A | 3/2000 | Perona et al. | |
| 6,057,847 A | 5/2000 | Jenkins | |
| 6,081,261 A | 6/2000 | Wolff et al. | |
| 6,160,924 A | 12/2000 | Lazar | |
| 6,229,102 B1 | 5/2001 | Sato et al. | |
| 6,611,242 B1 | 8/2003 | Hongo et al. | |
| 6,737,591 B1 | 5/2004 | Lapstun et al. | |
| 6,831,632 B2 | 12/2004 | Vardi | |
| 7,109,979 B2 | 9/2006 | Moyne et al. | |
| 7,292,229 B2 | 11/2007 | Morag et al. | |
| 7,317,450 B2 | 1/2008 | Khomo | |
| 7,668,375 B2 | 2/2010 | Khomo | |
| 2001/0020937 A1 | 9/2001 | Rosenberg | |
| 2002/0145596 A1 | 10/2002 | Vardi | |
| 2003/0179201 A1 | 9/2003 | Thacker | |

FOREIGN PATENT DOCUMENTS

| | | |
|---|---|---|
| EP | 0762319 | 3/1997 |
| JP | 10187341 | 7/1998 |
| JP | 10333815 | 12/1998 |
| JP | 04070688 | 3/2004 |
| JP | 04268618 | 9/2004 |
| JP | 08006703 | 1/2008 |
| JP | 08249370 | 10/2008 |
| WO | 9521436 | 8/1995 |
| WO | 9926191 | 5/1999 |
| WO | 0135329 | 5/2001 |
| WO | 03067554 | 8/2003 |
| WO | 2004029866 | 4/2004 |

OTHER PUBLICATIONS

European Search Report corresponding to EP Application No. 04 78 4762 dated Oct. 23, 2008.

EP Examination Report mailed Nov. 10, 2008 corresponding to EP Application No. 04 78 4762.

International Preliminary Report on patentability corresponding to International Application No. PCT/US04/031043 issued Mar. 27, 2006.

* cited by examiner

METHOD OF TEXT INTERACTION USING CHIROGRAPHIC TECHNIQUES

CROSS-REFERENCE TO RELATED APPLICATIONS

The present application makes reference to, claims priority to and the benefit from the following U.S. Provisional Patent Applications: Ser. No. 60/552,800, filed Mar. 12, 2004, Ser. No. 60/542,309, filed Feb. 6, 2004, and Ser. No. 60/520,169, filed on Nov. 14, 2003, the complete subject matter of which are all hereby incorporated herein by reference, in their respective entireties.

The present application is a continuation-in-part of U.S. Non-Provisional patent application having Ser. No. 10/672,647, entitled "A Spatial Chirographic Sign Reader", and filed on Sep. 26, 2003, now U.S. Pat. No. 7,317,450, which is hereby incorporated herein by reference, in its entirety.

The present application is also a continuation-in-part of U.S. Non-Provisional patent application having Ser. No. 10/840,905, entitled "A Spatial Chirographic Sign Reader and System for Chirographic Reading", and filed on May 7, 2004, which was published on Mar. 31, 2005 as U.S. Patent Application Publication No. US2005/0069203 A1 and which is hereby incorporated herein by reference, in its entirety.

The present application is also a continuation-in-part of U.S. Non-Provisional patent application having Ser. No. 10/876,314, entitled "Method of Employing a Chirographic Stylus", and filed on Jun. 24, 2004, which is hereby incorporated herein by reference, in its entirety.

The present application is also a continuation-in-part of U.S. Non-Provisional patent application having Ser. No. 10/946,546 entitled "An Interactive Educational Method and Apparatus", and filed on Sep. 21, 2004, which is hereby incorporated herein by reference, in its entirety.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

Handwriting is traditionally performed on a writing surface, such as paper, with an ink-dispensing pen or other writing instrument, such as, a pencil or paintbrush. The result is expected to be understandable by human readers.

Recently, electronic handwriting has been done on planar X-Y digitizing pads using a stylus employed to simulate handwriting upon the pad to create an electronic facsimile of handwriting. The digitizing system collects an array of X-Y coordinates of pixels corresponding to the curve tracing positional points of the stylus tip. Usually, the X-Y arrays are gathered and stored as positional arrays and are made discernible to a human reader when rendered on an X-Y display, but the arrays are rarely discernible as text by a device.

Attempts to make handwriting discernible as machine-readable text have concentrated on handwriting recognition of the X-Y traces by translation into binary coded text after affine transformation of the X-Y trace. Other techniques of recognition of the X-Y traces employ stochastic recognition based on various randomness assumptions using a statistical model. Other attempts with more deterministic techniques of recognition of the X-Y traces use velocity profiling in on-line recognition and forward search in batch recognition. Many similar X-Y trace recognition efforts have resulted in numerically intense algorithms, which tend to restrict the recognition process to off-line batch processing conducted as a separate procedure long after the writing has been done.

More recently, on-line recognition systems have dispensed with natural handwriting and created specialized pen-stroke shorthand for letters of the Latin alphabet and Arabic numerals and punctuation marks, such as an electronic stylus recognition system, for example. Field experience has shown that recognition error rates are high enough to cause manufacturers to begin supplanting the system with keypads and software keyboards. Miniaturized keypads are slow when compared to normal handwriting speed. Full-sized keyboards, although faster in use than miniature keyboards, are too cumbersome for optimum purposes.

Devices that track X-Y motion in true geometry exist in the form of analog joysticks. These are used as actuators for simulation and as gaming input devices where a hand-held game controller may incorporate an analog joystick that permits tracking of directional inputs over 360 degrees around an action reference point and is small enough to be manipulated by a fingertip. The cited range of 360 degrees signifies that the joystick spans a projection of the X-Y plane, but does not span a radial distance, i.e., the joystick is not operable to span a projection along the Z-axis. This is because the range of each joystick sensor is less than the radial range to be spanned.

The joystick may utilize sensor wheels over two orthogonal axes of rotation. Such a configuration may suffice for directional control over a planar range, but is inadequate for capturing natural handwriting strokes, which require a depth sensor and measurement.

At the time of Charles Babbage, the person attributed with inventing the analytic engine, a predecessor of the modern-day computer, a computer was a person whom Babbage observed working at Napier's logarithm table workshop in France. Napier's workers each sat upon assigned desks and specialized on one base-10 place value for the computation of historical six-figure logarithm tables.

Babbage adopted that concept, applied it to mechanical screws, and built a device that mechanized Napier's procedure to nearly thirty place values, and developed precision screws and gears that could be driven in tandem at a 10:1 gear ratio. This brought into existence the concept of a machine register.

Babbage also borrowed from the Italian textile industry of the time. The punch cards employed by the mechanical pattern knitting looms of the day were employed by Babbage to mechanically provide a numeric register value to an analytic engine. The use of punched cards for formulating arithmetic problems for analytic engines was publicized by Ada (Lady Lovelace), a Babbage acquaintance who took an intellectual interest in the Babbage invention.

Hollerith was inspired to create a tabulating machine (a punched card device) that was used in a first-ever major census undertaking of post-civil war United States. The Hollerith system dominated computing for the next century and brought into existence the International Business Machine Company (IBM).

The manner by which the Hollerith system operated was to input data into the analytic machine (computer) by transcribing information onto punched cards. The IBM encoding scheme that persists to this day is called the extended binary coded decimal interchange code. Once the data was punched into the cards, the cards would be appended to a computer program. Punched program cards were preceded by control cards for performing batch-computing jobs. This procedure evolved into a unique culture of mainframe computing.

After a century of the Hollerith method, a console for mainframe computing included a command and control work area overseeing the work of card readers, print queues, and a host of system administration tasks for numerous batch jobs that were being executed at any particular time. From this concentration of control arose a replication of what was then relegated to peripheral control devices (PDP) for overseeing communications, printing, and other I/O functions.

The now-defunct Digital Equipment Corporation (DEC) refined the PDP into independent computing machines, free from the constraints of a mainframe, and defined what is now historically known as the minicomputer era. One departure, however, was in the adoption of variable record lengths. The mainframe imposed 80 column records universally, which was the standard length for punched cards.

DEC also defined a series of terminals, derisively termed dumb terminals by mainframe users, which only controlled an output text display and input text keyboard. The virtual terminals (VT), as they were then known, brought about a new mode of using computers, namely through a text entry command line. The host computer would invoke a command interpreter and the user would enter commands with strict syntax and semantics. The premier example of this was the DEC command language (DCL) facility used on VT terminals, for example. The most rudimentary terminal in the series was the VT-100 DEC terminal.

Concurrent with this development, new research initiatives arose for interactive computing, most famously, the international academic and industrial collaboration called Multiplexed Information and Computing Service (MULTICS). The MULTICS effort, subscribed to by competitors of IBM, attempted to make the features of mainframes generic.

Out of the MULTICS research initiative arose, within AT&T Bell Laboratories, a much narrower interaction model, appropriately called Uniplexed Information and Computing System (UNIX®), in which the computer kernel only did one thing, i.e., multiplex concurrent tasks on one computer with a scheduler. UNIX® adopted a number of interactive computing features of DEC-PDP machines, while retaining the more useful generics of MULTICS. The most salient of these features to users was the shell command interpreter, which became the standard for command-line interactive computing.

When console displays became capable of a real layout of text, the interaction model evolved from a command line to a menu screen. An interactive program would present a menu screen of available commands and a user would select commands using various typesetting keystrokes to lead the typesetting cursor to the text of a desired selection and send a directive for invoking that command by hitting a transmit key.

The transmit key of the console arose from telecommunications, telegraphy in particular, wherein a terminal that looked like a typewriter had a typesetting carriage return and line feed where typed text was entered. The transmit key served that purpose, in telecommunications, and was adopted as the command key for text screen menu systems.

It is appropriate to note that DEC-VT terminals also adopted the American Standard Code for Information Exchange (ASCII) for inter-computer communications. Independent TeleType manufacturers whose premier products were also named TeleType developed the ASCII standard.

UNIX® developers also incorporated the DEC adaptations into their computing models, wherein a terminal may be identified as a teletypewriter (TTY). It may also be noteworthy that the UNIX® implementation of terminal screen addressing of a typesetting cursor are found in appropriately named cursor utilities.

As UNIX® workstations began supplanting minicomputers, solid-state miniaturization and large scale circuit integration techniques gave rise to retail-affordable microcomputers, primarily led by Apple Computer Corporation, using the BASIC computer language interface for programmers and users and a control program/manager (CP/M) for console services.

At this point, IBM developed a new microcomputer product, the IBM-PC, and employed Microsoft, a young CP/M Basic software developer and vendor to provide critical microcomputer applications for the IBM-PC. The BASIC language interface sold by Microsoft was largely derived from DEC Basic, upon which the Microsoft start-up had cut its teeth. At the point IBM required a Disk Operating System (DOS) helper for the IBM-PC, Microsoft adopted a variant of the Digital Research Inc.'s CP/M DOS Helper (later known as DR-DOS), and the standard interaction terminal on the Microsoft DOS (MS-DOS) was given the capability of VT 100 terminals and an ASCII interchange code convention.

When graphics-capable microcomputers became retail affordable, a new interaction model came into being. Pointing devices were introduced into computer interaction. Research at Massachusetts Institute of Technology (MIT) was combined with research at Xerox Corporation into a windowing computer system predicted by psychology researcher Dr. Licklider of MIT decades before. A number of aspects of the interaction paradigm first appeared on text command screens.

The location of main commands at a top row of the screen and the display of abbreviated command options immediately below a selected main command for a temporary period of time, for example, a pull-down menu, and reservation of the remainder of the screen for the application interaction data was adopted. When graphics was added to the pull-down menu system, the ability to reserve an area of the screen with a graphics icon of what had been a text command label brought rise to the personal computing model named Windows, Icons, Menus, and Pull-Down System (WIMPS).

Apple Computer adopted the graphics windowing computer model of Xerox® into their Macintosh® computer, and when graphics capability became common to IBM-PC's, IBM® launched their Presentation Manager® under a multitasking PS/2 successor to DOS, while Microsoft launched a competing Windows® system. To date, windowing systems dominate the interaction paradigm.

The WIMPS paradigm has been elaborated by specialization, such as for example, dialog control, text editing control, selection list, combo-box control (combination of text and list) in text applications, and features, such as for example, overlay, panning, and zoom magnification and retraction. The areal icon selection for menus and controls was refined further in engineering drawing graphics applications as a snap behavior, wherein the pointer mouse/digitizer cursor was allowed to capture a nearby graphic feature into a prevailing context where having the user exactly point at the minute feature location was not practical.

In brief the historical computing sequence starting with Napier is as follows: Napier: human arithmetic computing with working desk register and handwritten input and output; Babbage: mechanical arithmetic computing with a machine register; Ada: programming with punched cards; Hollerith: batch data processing with punched cards; TeleType: interactive typewriting keyboard; DEC: interactive computing console; MIT: human computer interaction pointing devices; and Xerox: window interaction computing using console with pointer mouse.

Over two decades of evolution of window interactive computing, many applications for computing have emerged in addition to the WIMPS paradigm. The earliest was the accounting spreadsheet, followed soon after by the clerical word processor. When graphics became available to applications, engineering drawing followed. When graphics animation became possible, simulated games came into common use. As communications have become more pervasive, interactive models have also become remote, wherein remote geometric spatial computing has been applied to robotics, and telecomputing, as in telemetry and telemedicine, for example.

The mainstay of user interfaces in all these applications continues to be WIMPS. Because a chirographic system in accordance with an embodiment of the present invention may specifically be designed for use as a handwriting device and a graphical marking device, the chirographic system may be adapted to provide an opportunity for converting the Napier computer into a fully computerized model by employing similar tactile operations as those that Napier relied upon.

Further limitations and disadvantages of conventional and traditional approaches will become apparent to one of skill in the art through comparison of such systems with embodiments presented in the remainder of the present application with reference to the drawings.

BRIEF SUMMARY OF THE INVENTION

Aspects of the present invention may be found in a method for writing on-line recognizable text characters. The method may comprise using a spatial chirographic reader in an inverted disposition, fixing a stylus orientation to be collinear with a reader boom and implementing a stereographic ray tracer for font positioning coordinates.

In an embodiment according to the present invention, the method may also comprise implementing a stereographic ray tracer for stylus inking coordinates, writing a text character with the stylus, reading a character symbol, verifying chirographic readings with font positioning X-Y displacements, and identifying a text character using a spatial character recognition technique.

Aspects of the present invention may also be found in a device for spatially writing recognizable handwritten text characters. The device may comprise a platform having a flat surface and a hollow hemi-spherical cavity, and a housing for a spatial font positioning tracking assembly.

In an embodiment according to the present invention, the device may also comprise a pylon fixed relative to the platform for elevating an inverted spatial chirographic sign reader over the flat surface, a spatial stylus inking tracking assembly for the stylus comprising a spring attachment proximate the pylon, wherein the stylus rests retracted toward the pylon. The device may also comprise a means for coupling the font positioning assembly and the stylus inking assembly.

Aspects of the present invention may also be found in a method for setting on-line recognized text characters. The method may comprise using a spatial chirographic writer equipped with position setting coordinates, employing the chirographic character recognition method with the writer, providing the writer with an X-axis tracking mechanism for the platform, providing the writer with a Y-axis tracking mechanism for the platform, and associating an X-axis traversal of the platform with a change of a setter carriage position.

In an embodiment according to the present invention, the method may also comprise associating a Y-axis traversal of the platform with a change of the setter line position, assigning an initial line and carriage position to the text setter, writing a text character symbol with the writer, identifying the text character using a spatial character recognition technique, and setting an identified text character at a current line and carriage position.

In an embodiment according to the present invention, the method may also comprise performing a carriage-shift indicating a handwritten stroke with the writer, shifting the carriage position forward by one character position upon setting an identified text character, independently shifting the setter carriage position forward by sliding the platform in a positive carriage direction along an associated setter carriage axis, and independently shifting the carriage position backward by sliding the platform in a negative carriage direction along an associated setter line axis.

In an embodiment according to the present invention, the method may also comprise setting a new initial setter position to a next independently shifted carriage position along an associated setter carriage axis, performing a line feed-indicating a handwritten stroke with the writer, and independently shifting a line position forward by sliding the platform in a positive line direction along an associated setter line axis.

In an embodiment according to the present invention, the method may also comprise independently shifting a line position backward by sliding the platform in a negative line direction, setting a new line position to an independently shifted line position, and assigning combinations of independent line and carriage shifts to additional text setting positionings required by a setting application in which the setter may be employed.

Aspects of the present invention may also be found in a device for setting recognized handwritten text characters. The device may comprise a chirographic text character writer and a position tracking assembly for the platform of the writer.

Aspects of the present invention may also be found in a method for recognizing on-line text characters in a compact disposition. The method may comprise employing a spatial chirographic reader in an inverted disposition, implementing an X-Y font positioning coordinate tracer, implementing a Z-axis tracer for a stylus inking coordinate, orienting the Z-axis tracer to be rectilinear to the X-Y font positioning coordinate tracer, and applying a spatial character recognition technique.

Aspects of the present invention may also be found in a device for spatially writing recognizable handwritten text characters. The device may comprise a platform having a flat surface and a shallow circular cavity, a housing for a spatial font positioning tracking assembly, a pylon relatively fixed with respect to the platform for elevating an inverted spatial chirographic sign reader over the flat surface, a spatial stylus inking tracking assembly for a stylus having a spring attachment proximate the pylon so that the stylus rests retracted toward the pylon, and a means for coupling the font positioning assembly and the stylus inking assembly.

Aspects of the present invention may also be found in a method for making a chirographic text character setter usable in a mobile deployment. The method may comprise modifying the chirographic text setter to uncouple font and setter positioning, asserting uncoupled font positions with a palm grasp position of a stylus, asserting uncoupled setter positions with a wrist action upon a pylon clasp rest, and resting a hand upon the pylon clasp rest.

In an embodiment according to the present invention, the method may also comprise wrapping a finger around a setter grip, holding the stylus with a thumb pressing against at least one counter finger upon the stylus, strapping the pylon clasp rest of the mobile setter to a user's hand proximate the wrist, and performing writing actions with the hand and setting actions with the wrist.

Aspects of the present invention may also be found in a mobile chirographic text character setting device. The device may comprise a font positioning assembly, a stylus positioning assembly, a setter positioning assembly, a clasp for a setter pylon, a wrist rest for the setter pylon, and a mobility wrist strap attachment to the wrist rest.

Aspects of the present invention may also be found in a method for recognizing pre-written text characters. The method may comprise modifying a spatial chirographic reader to scan a pre-written character, scanning pre-written text with the modified reader, and synthesizing rotational paths.

Aspects of the present invention may also be found in a device for scanning a pre-written text character on a page. The device may comprise a spatial chirographic sign reader modified for character scanning, a scanner assembly, and a guide rule for the scanner.

Aspects of the present invention may also be found in a method comprising placing a reader device and a pre-written medium upon a flat surface, placing a rule guide upon the pre-written medium aligned so that desired text may be scanned, placing a scanner assembly over the rule guide, attaching a scanner assembly to a reader receptacle, sliding a scanner over a writing to capture character scans as a reader concurrently records position data for conversion.

Aspects of the present invention may also be found in a method for rendering spatial chirographic data for display and printing raster devices. The method may comprise converting raw chirographic positional data into standard form, collecting positional data sharing a same font frame line, tracking a path traced by positional data from a first to a last position of each font frame in a font frame line, checking ink depth of a path at significant raster dot positions pointed to by an indicatrix vector in the font frame line over each raster interval, marking dot positions inside a minimum ink depth, and magnifying marked dots onto a raster medium.

Aspects of the present invention may also be found in a method for rendering stylized chirographic signs. The method may comprise setting a simulated pen width for a marker, setting a simulated minimum ink depth for the marker, setting a simulated initial aspect ratio for a tip of the marker, setting a simulated brush length of a stem of the marker, setting a simulated maximal ink depth for the marker stem, mounting the marker onto a receptacle, recording a simulated initial pen orientation of the marker, and stylizing pen width and ink depth apertures.

Aspects of the present invention may also be found in a device for marking stylized chirographic signs. The device may comprise a chirographic reader and a marker assembly.

Aspects of the present invention may also be found in a method comprising placing the reader on a flat surface, placing a rule guide upon the written medium aligned so that a desired text may be scanned, attaching a marker assembly to a reader receptacle, deploying a tip of a marker over a writing guide surface, and simulating marking of stylized signs over the writing guide surface.

Aspects of the present invention may also be found in a spatial chirography system for operating spatial chirographic devices comprising a chirographic device connected to a chirographic control unit, and chirographic data.

Aspects of the present invention may also be found in a method comprising connecting available devices to a system unit bus connector, loading device driver modules into an operating system kernel, installing instruction programs into system storage, starting the system, performing an open procedure on a device, servicing device interrupts for read and write requests, and performing a close procedure upon one of shutdown and power failure/interruption.

Aspects of the present invention may also be found in a wireless chirographic system for operating wireless chirographic devices. The system may comprise a wireless chirographic unit, a wireless chirographic device adaptor, an output device, and a wireless chirographic device.

Aspects of the present invention may also be found in a method comprising initializing device transmissions by transmitting metadata of a wireless device to a wireless chirographic device adaptor, setting received metadata in the device emulation modules of the adaptor, sending position data from the wireless device to the adaptor, assigning received position data to emulated position data array elements of the chirographic device adaptor, and accessing position data array elements of the chirographic device adaptor from an emulated interface according to a metadata address emulation for the chirographic device input type.

Aspects of the present invention may also be found in a networked chirographic system for performing spatial chirography between remotely distributed resources, the system comprising a chirographic system fitted with a networking adaptor, and a chirographic application on the chirographic system, a partition of the application comprising user request client and service response server resources.

In an embodiment according to the present invention, the system may also comprise grouping of response server resources into distributed service interfaces of a networked application server system, grouping distributed application user requests into client interfaces of network application protocols, means for conveying application user requests from a client to the network server, means for fulfilling the user request on the chirography system server, and means for conveying requested chirographic application data from a server to the requesting network client.

Aspects of the present invention may be found in a spatial chirography system for operating spatial chirographic devices. The system may comprise a chirographic system unit, a chirographic device connected to the chirographic system unit, and chirographic system data. The chirographic system unit may comprise a central processing unit, a system memory module, a system time clock, a data storage medium, a data transmission bus, and a bus connector for chirographic devices.

In an embodiment according to the present invention, the chirographic device may comprise at least one of a spatial chirographic sign reader, a chirographic text character writer, a chirographic text character writer, a chirographic text character setter, a chirographic text character scanner, a system output device, and a spatial chirographic styling sign marker.

In an embodiment according to the present invention, the chirography system data may comprise at least one of chirographic position data, a procedural instruction text for manipulating spatial position data, an operating system text for executing central processing unit instructions, and system time clock interrupt ticks.

In an embodiment according to the present invention, the chirography position data may comprise at least one of spatial position data of a spatial chirographic sign reader, spatial position data of a chirographic text character writer, reference path data of a spatial character recognition technique, font frame position data of a chirographic text character writer, text setting position data of a chirographic text character setter, page scan position data of a chirographic text character scanner, styling position data of a spatial chirographic styling sign marker, and renderer position data of a spatial chirographic sign rendering technique for a system output device.

In an embodiment according to the present invention, the spatial position data may comprise a time counter provided by a timing clock of the chirography system, a first coordinate dimension of a spatial position of a chirographic stylus tip, a second coordinate dimension of the spatial position of the chirographic stylus tip, a third coordinate dimension of the spatial position of the chirographic stylus tip, and a reading of coordinate dimensions of the spatial position of the chirographic stylus measured at a common minimum interrupt tick time interval of the system clock timer.

In an embodiment according to the present invention, the font frame position data may comprise stylus spatial position data of a spatial chirographic sign readers, a first coordinate dimension of a font coordinate planar position of a chirographic stylus tip, and a second coordinate dimension of the font coordinate planar position of the chirographic stylus tip.

In an embodiment according to the present invention, the text setting position data may comprise font frame position data of a chirographic text character writer, a first coordinate dimension of a typeface carriage columnar position of the writer in a line being set with text, and a second coordinate dimension of a typeface line rank position of the writer in a page being set with text.

In an embodiment according to the present invention, the page scan position data of a chirographic text character scanner may comprise text setting position data of a chirographic text character setter, a direction of scan of a scanned page line in relation to a reference direction of a typeface line in setter position coordinates, an adaptation of a first stylus position coordinate to a first font frame coordinate and to a first scan dot position dimension, an adaptation of a second stylus position coordinate to a second font frame coordinate and to a second scan dot position dimension, and an adaptation of a third stylus position coordinate to a volume dimension offset from a frame coordinate plane and set according to a synthesized spatial path.

In an embodiment according to the present invention, the styling position data of a spatial chirographic styling sign marker may comprise page scan position data of a chirographic text character scanner, an adaptation to a simulated orientation of a calligraphic nib of one coordinate of a chirographic device to a spatial direction of an orientation of a marker and an adaptation to a simulated depth of ink marking by an art brush tip of one stylus position coordinate orthogonal to a typeface coordinate plane. The adaptation to a simulated orientation of a calligraphic nib of one coordinate of a chirographic device to the spatial direction of the orientation of the marker may comprise at least one of an adaptation of a direction of scan of a chirographic text character scanner to a spatial direction of the orientation of the marker in relation to an active direction of a marker handwritten stroke in stylus position coordinates and an adaptation of one stylus position coordinate to a spatial direction of the orientation of the marker in relation to the active direction of a marker writing stroke in the stylus position coordinate. A rotation plane of stylus orientations may be parallel to the typeface coordinate plane of a chirographic text character setter.

In an embodiment according to the present invention, the renderer position data of a spatial chirographic sign rendering technique for a system output device may comprise sign styling position data of a spatial chirographic styling sign marker, a system memory array which to render a chirographic sign, an adaptation of a first dimension of the system memory array to a dimension of an output device raster dot scan position and to a first typeface coordinate dimension, and an adaptation of a second dimension of the system memory array to a raster line and a dimension of an output device raster line scan position and to a second typeface coordinate dimension.

In an embodiment according to the present invention, the procedural instruction text for manipulating the chirography position data may comprise at least one of an instruction program for converting spatial position data into text, an instruction program for converting setter position data into composite lines of recognized text, an instruction program for converting scan position data into composite lines of recognized text, an instruction program for converting renderer position data into raster device images on a system output device, and an instruction program for converting sign styling position data into stylized images on a system output device.

In an embodiment according to the present invention, the operating system text for executing central processing unit instructions may comprise an operating system kernel, chirographic device driver interfaces, and device driver modules for attached chirographic devices.

In an embodiment according to the present invention, the device driver modules for the attached chirographic devices may comprise instructions to transfer input data from the kernel to procedures for manipulating the spatial position data and instructions to transfer rendered output data from the kernel to the output device.

In an embodiment according to the present invention, the system time clock interrupt ticks comprise a constant frequency electrical impulse generated by a calibrated oscillator, an assertion of the electrical impulse on a privileged interrupt vector on a bus to signal a reference moment in real time, a system counter accumulating an occurrence of clock ticks into real time elapsed, and a time interval counter in a device driver module for assigning to each reading of an input device position data a real time of sample.

These and other advantages and novel features of the present invention, as well as details of an illustrated embodiment thereof, will be more fully understood from the following description and drawings.

DETAILED DESCRIPTION OF THE INVENTION

Figure 1:
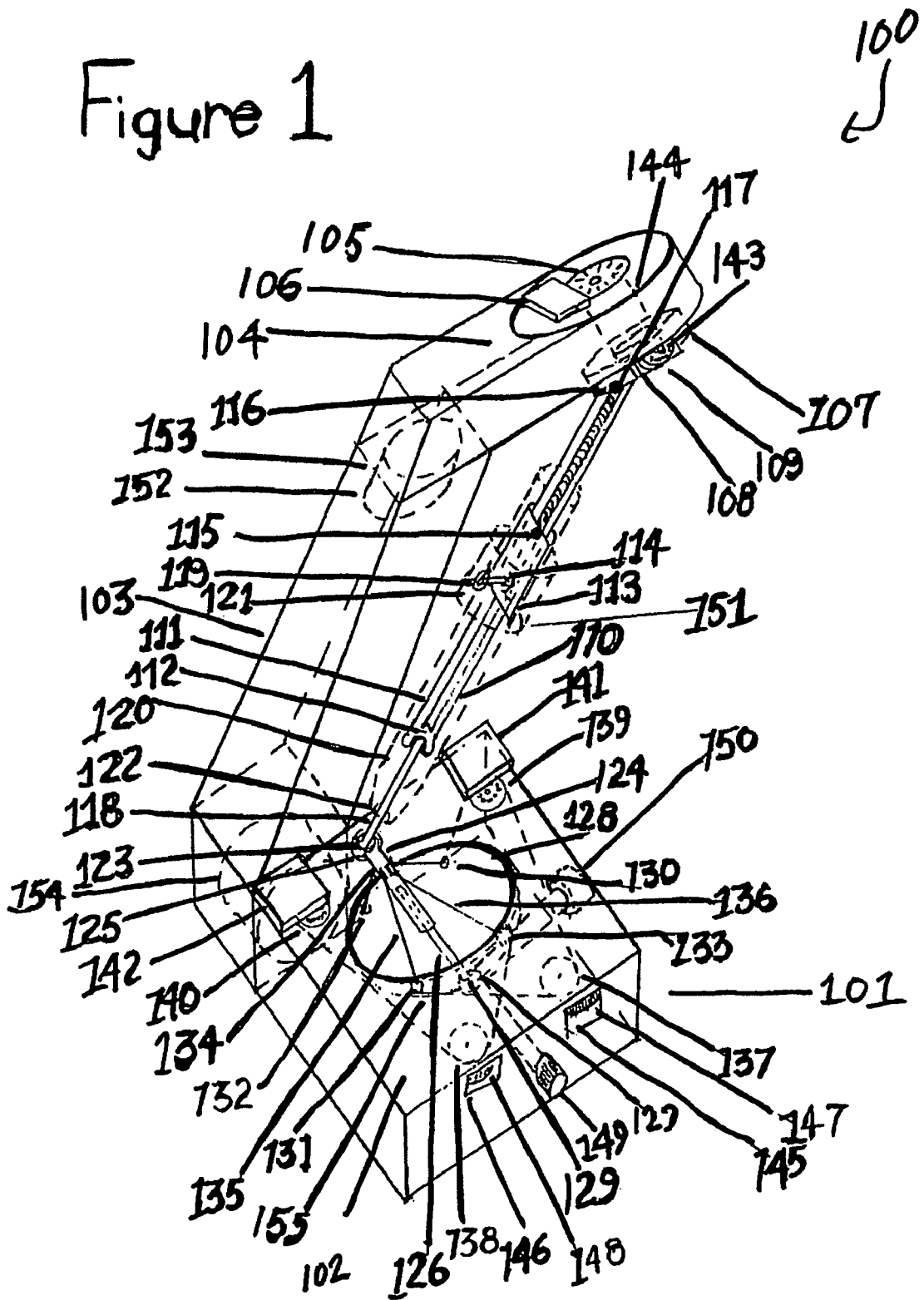
FIG. 1 is a perspective view illustrating a chirographic text character writer according to an embodiment of the present invention.

In the following detailed descriptions of the drawing figures, spatially orienting terms are used throughout, such as for example, "left", "right", "vertical", "horizontal", "upper", "lower", etc. It is to be understood that these terms are used for convenience of description of preferred embodiments by reference to the drawing figures. These terms do not necessarily describe an absolute location or orientation in space, such as left, right, upward, downward, etc., that any particular components of the present invention may assume.

Aspects of the present invention may be found in a method for writing on-line recognizable text characters. The method may comprise using a spatial chirographic reader in an inverted disposition, fixing the stylus orientation to be permanently collinear with the reader boom, and implementing a stereographic ray tracer for the font positioning coordinates.

In an embodiment according to the present invention the method may also comprise implementing a stereographic ray tracer for the stylus inking coordinates, writing a text character with the stylus, reading the character symbol, verifying the chirographic readings with font positioning X-Y displacements, and identifying the text character using the spatial character recognition technique.

In an embodiment according to the present invention, using a spatial chirographic reader in an inverted disposition may comprise attaching the spatial chirographic reader on a pylon so that the boom extends downwards toward an X-Y plane, locating an origin in the writing volume space proximate to the intersection of the axes of the major and minor pinions of the inverted reader, reversing the directional sense of the Z-axis orthogonal to the X-Y plane, and attaching the boom bracket to a spring anchored at fulcrum brackets so that the bracket retracts towards the fulcrum.

In an embodiment according to the present invention, fixing the stylus orientation to be permanently collinear with the reader boom may comprise inserting the inverted reader boom through the hollow stylus body, locking the stylus body to a boom bracket receptacle with hook end of stylus probe, extending the stylus probe through the tapered, pointing end of the stylus body; associating the writing tip with the end of the stylus probe, and providing a ball joint to the end of the stylus probe.

In an embodiment according to the present invention, implementing a stereographic ray tracer for the font positioning coordinates may comprise connecting a stereographic pestle in the font positioning assembly mortar base, measuring the font positioning X-Y displacements as the pestle swivels, implementing a projection pole with an orifice at the bottom of the mortar, implementing a font positioning projection ray tracer by inserting the narrow end of a pestle shaft through the orifice, gauging the inclination of pestle by enclosing the free end of the pestle with a pestle sheath fitted with fathom line attachments, and providing a stylus coupling socket joint at the end of the pestle sheath.

In an embodiment according to the present invention, measuring the font positioning X-Y displacements as the pestle swivels may comprise attaching both ends of two fathom lines to the pestle sheath fixtures after guiding each line through one opposite pair of mortar fathom guide holes and around a position sensing wheel.

In an embodiment according to the present invention, implementing a stereographic ray tracer for the stylus inking coordinates may comprise coupling the stylus probe end ball joint with the pestle socket joint, and aligning the stylus and pestle collinearly to set a reference Z-axis centerline for the stylus stereographic projection coordinates.

Aspects of the present invention may be found in a device for spatially writing recognizable handwritten text characters. The device may comprise a platform having a flat surface, a hollow hemi-spherical mortar cavity, a housing for a spatial font positioning tracking assembly, a pylon relatively fixed with respect to platform for elevating an inverted spatial chirographic sign reader over the surface, a spatial stylus inking tracking assembly for the stylus with spring attachment to proximity of pylon so that the stylus rests retracted towards the pylon, and a means for coupling the font positioning and stylus inking assemblies.

In an embodiment according to the present invention, the mortar hemispherical hollow cavity may comprise an orifice for a pestle shaft at the bottom of the mortar cavity, and at least one pair of opposite facing guide-holes equally spaced at the rim of the mortar cavity.

In an embodiment according to the present invention, the spatial font position tracking assembly may comprise a pestle sheath fitted over a pestle shaft to snugly fit over the free end of pestle shaft to act as a bushing to let the sheath swivel freely relative to the shaft, wherein the pestle sheath for the pestle shaft is fitted with at least one pair of fathoming guideline fixtures.

In an embodiment according to the present invention, the spatial font position tracking assembly may also comprise at least one fathoming guideline threaded through opposing mortar guide-holes and having one end around a guide pulley attached to the housing and another end around a quadrature wheel, the line fastened in taut tension on opposite fixtures of the pestle sheath, wherein the pulleys and quadrature wheels are rotatably attached to the inside housing surface.

In an embodiment according to the present invention, the spatial font position tracking assembly may also comprise at least one quadrature sensor attached to the outside housing surface in close proximity to a quadrature wheel so that the at least one sensor can measure the motion of the pestle sheath along the connecting line of the associated opposite fathom guide holes, and the pestle shaft having a stem diameter small enough to extend through the polar orifice, and one end having a head diameter large enough to the lock shaft head in place at the orifice.

In an embodiment according to the present invention, the inverted spatial chirographic sign reader may comprise a spatial chirographic sign assembly facing the writing volume, and an arrangement of the major pinion quadrature wheel and sensor to an opposite face.

In an embodiment according to the present invention, the tracking assembly for the stylus may comprise a hollow body of the stylus, a stylus shaft locking onto the inside of the body of the tracking bracket receptacle, the elongated inner walls of the body being in slide-able contact with boom stems serving as retraction and extension guides from the pylon base, a reference tracking point fixed at the outside end of the stylus shaft, a stylus shaft in slide-able contact with a boom stem bridge serving as a retraction and extension guide of the stylus tip, and a coupling joint at the stylus probe end.

In an embodiment according to the present invention, the means for coupling the font positioning and stylus inking assemblies may comprise a joint coupling the stylus probe end rotatably to the pestle sheath end joints, a means for calibrating the home position for the stylus Z-axis identified by the collinear alignment of the stylus shaft and the pestle shaft.

Aspects of the present invention may be found in a method for setting on-line recognized text characters. The method may comprise using a spatial chirographic writer equipped with position setting coordinates, employing the chirographic character recognition method with the writer, providing the writer with an X-axis tracking mechanism for the platform, providing the writer with a Y-axis tracking mechanism for the platform, associating the X-axis traversal of the platform with a change of a setter carriage position, and associating the Y-axis traversal of the platform with a change of the setter line position.

In an embodiment according to the present invention, the method may also may comprise assigning an initial line and carriage position to the text setter, writing a text character symbol with the writer, identifying the text character using the spatial character recognition technique, setting the identified text character at the current line and carriage position, and performing a carriage shift-indicating a handwritten stroke with the writer.

In an embodiment according to the present invention, the method may also may comprise shifting the carriage position forward by one character position upon setting an identified text character, independently shifting the setter carriage position forward by sliding the platform in the positive carriage direction along the associated setter carriage axis, and independently shifting the carriage position backward by sliding the platform in the negative carriage direction along the associated setter line axis.

In an embodiment according to the present invention, the method may also may comprise setting the new initial setter position to the next independently shifted carriage position along the associated setter carriage axis, performing a line feed-indicating a handwritten stroke with the writer, independently shifting line position forward by sliding the platform in the positive line direction along the associated setter line axis, independently shifting line position backward by sliding the platform in the negative line direction, setting to a new line position to the independently shifted line position, and assigning combinations of the independent line and carriage shifts to additional text setting positionings required by the setting application in which the setter is employed.

Aspects of the present invention may also be found in a device for setting recognized handwritten text characters. The device may comprise a chirographic text character writer, and a position tracking assembly for the platform of the writer.

In an embodiment according to the present invention, the position tracking assembly may comprise a cavity in the platform body for rotatably containing a position tracking ball, an opening at the platform bottom for inserting the tracking ball into the cavity of the platform, a locking ring for containing the tracking ball in the platform cavity, coordinate shift tracking structures, guide rollers for the tracking ball, and supports to contain the impact of the rolling and bouncing actions of the tracking ball against the rollers.

In an embodiment according to the present invention, the coordinate shift tracking structures may comprise a quadrature sensor support having a hollow hub for a roller pinion affixed upon the platform base, an anchor having hollow receptacles for roller pinions also affixed upon the platform base, a roller pinion covered with friction bearing roller material along a shaft, one end rotatably fitted into an anchor receptacle and another end fitted through one sensor support hub, and a quadrature wheel connected to a free end of the pinion proximate the quadrature sensor and affixed to the sensor support.

In an embodiment according to the present invention, the guide rollers for the tracking ball may comprise a stiff but flexible wire frame housing a roller to press upon the tracker ball from a side opposing each coordinate tracking roller, the ends of the wire frame locked into the platform base by anchor rings that the wire-ends hook onto, the structure of the wire frame, when hooked into place, may cause the rollers to exerts tensile pressure upon the tracker ball, additional platform supports adapted to stop an impact of the ball from disengaging the four rollers and preventing the ball from departing from a designated cavity, and an arrangement of the major pinion quadrature wheel and sensor to an opposing face.

In an embodiment according to the present invention, the device may further comprise a measurement means for the setter carriage position and a measurement means for the setter line position.

Aspects of the present invention may be found in a method for on-line recognizable text characters in compact disposition. The method may comprise employing a spatial chirographic reader in an inverted disposition, implementing an X-Y font positioning coordinate tracer, implementing a Z-axis tracer for a stylus inking coordinate, orienting the Z-axis tracer to be rectilinear to the X-Y font positioning coordinate tracer, and applying a spatial character recognition technique to the implementation.

In an embodiment according to the present invention, employing a spatial chirographic reader in an inverted disposition may comprise attaching the spatial chirographic reader on a pylon so that the boom extends downwards to an X-Y plane, locating an origin in space proximate the intersection of the axes of the major and minor pinions of the inverted reader, reversing the directional sense of the Z-axis orthogonal to the X-Y plane, attaching the boom bracket to a spring anchored at fulcrum brackets so that the boom bracket retracts towards the fulcrum, inserting the inverted reader boom through the hollow stylus body, and extending the inverted reader boom elongation with a stylus probe shaft.

In an embodiment according to the present invention, extending the inverted reader boom elongation with a stylus probe shaft may comprise designating one probe end to stylus attaching and another probe end to stylus pointing, employing an attachment end of the probe as a hook attachment, locking the probe to a boom bracket receptacle with a hook end of the stylus probe, extending the stylus probe pointing end through the end of the stylus body, associating the writing tip with the end of the stylus probe, and providing an attachment joint to the pointing end of the stylus probe.

In an embodiment according to the present invention, implementing an X-Y font positioning coordinate tracer may comprise providing an X-Y plane guide for a font positioning having a narrow gap in the platform housing parallel to the writing surface wide enough for an X-Y ray tracer arm, implementing a tracer arm fixed at a rotation pivot, gauging a radial displacement along the pivot arm guide with the position of a sliding sheath, and providing a stylus coupling socket joint at the end of the top side of the guide sheath.

In an embodiment according to the present invention, implementing a tracer arm fixed at a rotation pivot may comprise rotatably attaching one end of the arm guide to a swivel spindle, fixing the spindle on one end of the platform housing, extending the pivot arm through the X-Y guides of the platform housing, measuring the arc displacements as the free end of the arm swings about the pivot, and gauging the inclination of arm by motion of a fathom line attached to the free end.

In an embodiment according to the present invention, implementing a Z-axis tracer for the stylus inking coordinate may comprise coupling the stylus probe end ball joint with the sheath socket joint and aligning the stylus and pivot arm rectilinearly to set a reference Z-axis centerline for the stylus depth coordinate.

In an embodiment according to the present invention, fixing the stylus orientation to be permanently rectilinear with the reader boom may comprise maintaining the stylus axis in orthogonal orientation in relation to the X-Y coordinate tracer.

Aspects of the present invention may be found in a device for spatially writing recognizable handwritten text characters. The device may comprise a platform having a flat surface and a shallow circular cavity, a housing for a spatial font positioning tracking assembly, a pylon relatively fixed with respect to platform for elevating an inverted spatial chirographic sign reader over the surface, a spatial stylus inking tracking assembly for the stylus with spring attachment proximate the pylon so that the stylus rests retracted toward the pylon, and a means for coupling the font positioning and stylus inking assemblies.

In an embodiment according to the present invention, the circular shallow cavity may comprise a circular rim with upper and lower guide walls and a guide for a pivot arm shaft through the planar opening between the guide walls.

In an embodiment according to the present invention, the spatial font positioning tracking assembly may comprise a pivot arm sheath fitted over a pivot arm guide shaft to fit slidably over the guide shaft to act as a bushing to let the sheath swivel freely relative to the shaft, a fathoming guideline fixture upon the free end of the pivot arm, a mating of the free end of the pivot arm to a quadrature wheel, at least one quadrature sensor attached to the outside housing surface proximate a quadrature wheel so that the sensor can measure the motion of the guide arm sheath along an arc traced by the free end of the pivot arm.

In an embodiment according to the present invention, the mating of the free end of the pivot arm to a quadrature wheel may comprise connecting the free end of the pivot arm to the quadrature wheel by affixing the pivot arm along a guideline, wherein one end of the guideline may be attached to a pivot guide shaft end fixture and another end of the guideline may be threaded around a guide pulley attached to the housing of the font position tracking assembly, the guideline may also be threaded around a quadrature wheel and around a second guide pulley, and the guideline may be fastened in taut tension on a fathoming guideline fixture of the pivot arm, wherein pulleys and quadrature wheels may be rotatably attached to the inside housing surface.

In an embodiment according to the present invention, the inverted spatial chirographic sign reader may comprise a spatial chirographic sign assembly facing the writing volume.

In an embodiment according to the present invention, the tracking assembly for the stylus may comprise an elongated hollow body of the stylus, wherein an elongated stylus shaft locks onto the inside of the body of the tracking bracket receptacle, the inner walls of the stylus elongated hollow body may be in slide-able contact with elongated boom stems serving as retraction and extension guides from the pylon base, a reference tracking point fixed at the outside end of the stylus shaft, a stylus shaft in slide-able contact with the boom end serving as retraction and extension guides of the stylus tip, and a coupling joint at the stylus probe end.

In an embodiment according to the present invention, the means for coupling the font positioning and stylus inking assemblies may comprise a joint coupling the stylus probe end rotatably to the pivot arm sheath end joint, and a means for calibrating the home position for the stylus Z-axis identified by the rectilinear alignment of the stylus shaft and the pivot arm shaft.

Aspects of the present invention may be found in a method for making a chirographic text character setter usable in a mobile deployment. The method may comprise modifying the chirographic text setter to uncouple font and setter positioning, asserting the uncoupled font positions with a palm grasp position of the stylus, asserting the uncoupled setter positions with a wrist action upon a pylon clasp rest, resting the hand upon the pylon clasp rest, wrapping a finger around a setter grip, holding the stylus with the thumb pressing against at least one counter finger such as an index finger also upon the stylus, strapping the pylon clasp rest of the mobile setter to a user's hand proximate the wrist, and performing writing actions with the hand and setting actions with the wrist.

In an embodiment according to the present invention, modifying the chirographic text setter to uncouple the font and setter positioning may further comprise employing the font coordinate measurement assembly of a compact chirographic writer, attaching the stylus of the compact chirographic writer rotatably to a pylon that clasps the outer portions of the palm, obtaining the setter coordinate measurement in a separate wrist setter platform, providing a grip for setter assembly platform, and providing an articulated contact between the setter grip and pylon clasp.

In an embodiment according to the present invention, obtaining the setter coordinate measurement in a separate setter platform may comprise providing a compact platform for gauging wrist setter motions, providing a circular opening to the shallow cavity in the platform, providing a grip to the setter coordinate measurement assembly through the circular shallow cavity in the platform, allowing a setter motion guide arm to travel freely in a guide plane of the platform, rotatably attaching one end of the guide to a swivel spindle, fixing the spindle on the middle of one edge of the platform housing, extending the pivoting guide arm through the X-Y guides of the platform housing, measuring arc displacements as the free end of the arm swings about the pivot, and gauging the inclination of the arm by motion of a fathom line attached to the free end.

In an embodiment according to the present invention, the circular opening of the shallow cavity in the platform may comprise a circular opening in a setter platform surface, a circular rim collar at an opening having upper and lower guide walls, a guide space between the upper and lower guide walls, a width of a guide space to permit the free travel of a pivot arm, and a single guide plane path for the pivot arm in the opening between the guide walls.

In an embodiment according to the present invention, asserting the uncoupled font positions with the palm grasp position of the stylus may comprise employing the font and stylus assemblies of the chirographic text writer.

In an embodiment according to the present invention, asserting the uncoupled setter positions with wrist action upon the pylon clasp rest may comprise grasping the grip of text writer, asserting a change in a line feed direction by exerting a chopping motion of the forearm across the wrist, and asserting a change in carriage position of a text character by exerting a twist turning motion of the forearm through the wrist.

Aspects of the present invention may be found in a mobile chirographic text character setting device. The device may comprise a font positioning assembly, a stylus positioning assembly, a setter positioning assembly, a clasp for a setter pylon, a wrist rest for the setter pylon, and a mobility wrist strap attachment to the wrist rest.

In an embodiment according to the present invention, the setter positioning assembly may comprise a carriage and a line setting position assembly, a grip for a line and carriage assembly indicator, an articulated connection of a grip to a writer fulcrum bracket, and a palm clasp extension of a pylon to surround an outer side of the hand between the index finger and the little finger edges of the palm.

In an embodiment according to the present invention, the carriage and line setting assembly may comprise a platform, a circular opening in a surface of the platform, a circular collar extending between upper and lower surfaces of the platform to a middle of a cavity of the platform, a gap between upper and lower collars forming a planar guide path for a setter positioning guide shaft, a setter positioning guide shaft positioned in a planar guide path of the cavity of the platform, a pivot hole on one end of a guide shaft, a spindle axle passing through the guide shaft, a housing for a guide shaft spindle at a mid-point of one edge of the platform, a spindle housing being lockable into the guide shaft rotatably around a pivot hole in a guide plane, a slide-able coupling of a hand grip to the pivot arm, a means measuring a rotational position of the pivot arm in the platform, and a means for measuring a position of the grip along the pivot arm.

In an embodiment according to the present invention, the means for measuring the rotational position of the pivot arm in the platform may comprise a quadrature sensor attached to a platform wall for detecting rotation of a quadrature wheel, the quadrature wheel being rotatably mounted to the platform proximate the quadrature sensor, a fathoming line connecting a free end of the pivot arm to the quadrature wheel, wherein a first end of a guideline is attached to a pivot guide shaft end fixture, and a second end of the guideline is threaded around a guide pulley attached to a housing of a setting coordinate assembly, wherein the first end of guideline may be threaded around the quadrature wheel, the second end of the guideline may be threaded around a guide pulley, and wherein the first end of the guideline may be fastened in taut tension to the free end of the pivot arm.

In an embodiment according to the present invention, the means for measuring the position of the grip along the pivot arm may comprise a conductive sheath slidably connecting the grip to the pivot arm, a sensor electrically sensing the resistance displayed by a portion of the guide arm to a conductive contact provided by the sliding sheath.

Aspects of the present invention may be found in a method for recognizing pre-written text characters. The method may comprise modifying a spatial chirographic reader to scan a pre-written character, scanning a pre-written text with the modified reader, and synthesizing rotational paths.

In an embodiment according to the present invention, the method may further comprise replacing a reader-writing surface with a medium of pre-written text, aligning the pre-written text for reading with a scanner, providing an alignment guide and platform for the scanner, and provide a means for attaching the scanner to the reader.

In an embodiment according to the present invention, the method may further comprise setting a principal frame for an inferred font coordinate, setting minimum scan positioning, locating the pre-written character on a scanned medium, and positioning the principal frame at a located character position.

In an embodiment according to the present invention, the method may further comprise scanning a written page vertically to determine a vertical height of a written line, scanning the written page vertically to determine a vertical spacing between written lines, setting a vertical principal frame length to be the vertical height of the written lines less the vertical spacing between the written lines.

In an embodiment according to the present invention, the method may further comprise finding a first positioning path, identifying inking paths, identifying isolated ink spots at a font width limit, merging synthesized rotation data with reader spatial data to generate a reader stylus path pre-image data of the spatial reader.

In an embodiment according to the present invention, the method may further comprise locating an initial scanner position outside a pre-written frame, setting an initial stylus position at a zero dot location of the scan position, advancing the scanner the minimum scan position into the pre-written frame, checking for a first inked spot in the scanner dot positions, and repeating the checking until at least a first inked spot is found at a scan position.

In an embodiment according to the present invention, the method may further comprise finding a second inked spot contiguous to each first ink spot, wherein the first ink spot may be contiguously connected to a previously found inked spot, and wherein a second contiguous inked spot may be in one of a next dot position in a same scan position and at a next scan position from a first ink spot, determining a linear direction of a contiguously connected ink path for each first ink spot found, and for which a contiguous second ink spot is found by using a gradient of a linear connection, classifying evolving contiguous inked path connections, and connecting classified inking paths with appropriate positioning rotations.

In an embodiment according to the present invention, the method may further comprise determining a linearity of an evolving path by a constancy of successive gradients, determining a circularity of the evolving path by a constancy of curvature, determining a quadratic classification of the evolving path by determining a constancy of quadratic parameters, determining a torsional classification of the evolving path by non-constancy of successive curvatures, determining a curved path evolution by a bifurcation of the evolving path, determining open path endings by exhaustion of contiguous ink dots, and determining looped paths by merging of bifurcated path segments.

In an embodiment according to the present invention, the method may further comprise associating each linear inked path with a rotation through a Z-axis ink depth in a plane associated with a constant X-Y gradient and placing a center of curvature at a mid-point of an ink segment, associating each curved ink path with a rotation in the X-Y plane around a Z-axis and offset in an ink depth, connecting a first fully identified inking path segment with a first positioning path, connecting successively thereafter, rotations through a plane of an inked line segment with Z-axis positioning rotations out of ink depth, passing from one orbit to a next orbit with a torsion impulse changing at least one of a radius of curvature and a rotation plane, and connecting a last identified inked line segment.

In an embodiment according to the present invention, the method may further comprise determining if ink spots are isolated and contiguous neighbors are exhausted, continuing a scan process until no contiguous ink spots exist, ending the scan process when no contiguous ink spots and no new ink spots remain at a last scan position, designating a stopping scan position and a font width position, enumerating unconnected isolated ink spots, connecting unconnected ink spots beginning with a nearest one, determining a mid-point of a font frame, stopping a path connection with an annihilating step into a center, and comparing a recorded path to a standard set of paths for a character set.

In an embodiment according to the present invention, the method may further comprise selecting a scanning head wherein a linear dot sensor array density may be within one order of magnitude of a pen width of pre-written ink markings, and setting a dot pitch of the device to minimum scan, selecting a scanning head wherein a span of the linear dot sensor array may be at least one order of magnitude over the pen width of the pre-written ink marking, setting the span of the linear dot sensor array of a scan head to a minimum vertical position, setting a regular multiple of a dot pitch density as the minimum scan and skipping an aliquot proportion of dot positions when the pen width of the pre-written markings is orders of magnitude wider than the dot pitch spacing, setting a vertical scan height at one dot position to multiple vertical scan head spans, and scanning multiple scan head spans at each scan dot position when a vertical span of the scan head is a fraction of the pen width of the pre-written markings.

Aspects of the present invention may be found in a device for scanning a pre-written text character on a page. The device may comprise a spatial chirographic sign reader modified for character scanning, a scanner assembly, and a guide rule for the scanner.

In an embodiment according to the present invention, the device may further comprise a modified platform, wherein a writing surface portion of platform may be replaced by a detached panning platform upon which a scanner assembly may be mounted, and a modified stylus receptacle, wherein a receptacle bracket may be modified to engage a connector for the scanner assembly.

In an embodiment according to the present invention, the device may further comprise a flat elongate member engaging a surface of a pre-written writing medium, a raised elongate member along an edge of the flat elongate member, wherein a panning platform mates in intimate sliding contact with an exposed surface of the flat elongate member and the inner surface of the raised elongate member, and a straight edge of contact with the pre-written medium surface employable for aligning a panning direction.

In an embodiment according to the present invention, the device may further comprise a panning platform and a scanner device.

In an embodiment according to the present invention, the panning platform may comprise a mount surface for firmly attaching the mounted scanner, a flat gliding surface to support weight of a mount device, and a straight guide surface to align the scanner assembly along an alignment of a guide rule edge straight edge.

In an embodiment according to the present invention, the scanner device may comprise a scanner head, a scanner body, and a scanner grip handle attached to the scanner body, wherein the scanner grip handle may provide a means for attaching the scanner assembly, and a scan direction quadrature wheel.

In an embodiment according to the present invention, the scanner head may comprise the means for digitizing a visible image of handwritten characters upon a writing medium, a scan face from which the means for digitizing may be directed toward handwritten characters, a means for guiding a head face in close proximity to a handwriting medium along a direction of a guide rule, means for scanning a data acquisition module.

In an embodiment according to the present invention, the scanner body may comprise a housing for scanner modules and circuitry, a data acquisition module for the scanner head, means for storing an acquired data acquisition function, integrated circuitry supporting scanning application functions, a guide direction quadrature wheel attached to a scanner body housing, and an attachment to the panning platform.

In an embodiment according to the present invention, the receptacle bracket of the modified stylus receptacle may comprise a receptacle channel opening to receive an attachment portion of the scanner grip handle connector, a means for locking the scanner grip handle in place upon insertion into the channel opening, and a sensor for a guide direction quadrature wheel.

Aspects of the present invention may be found in a method comprising placing a reader device and a pre-written medium upon a flat surface, placing a rule guide upon the pre-written medium aligned so that a desired text may be scanned, placing a scanner assembly over the rule guide, attaching a scanner assembly to a reader receptacle, sliding a scanner over a writing to capture character scans as a reader concurrently records position data for conversion.

Aspects of the present invention may be found in a method for rendering spatial chirographic data for display and printing raster devices. The method may comprise converting raw chirographic positional data into a standard form, collecting positional data sharing a same font frame line, tracking a path traced by positional data from a first to a last position of each font frame in a font frame line, checking ink depth of a path at significant raster dot positions pointed to by an indicatrix vector in the font frame line over each raster interval, marking dot positions inside a minimum ink depth, and magnifying marked dots onto a raster medium.

In an embodiment according to the present invention, the method may further comprise converting stylus tip position data to a locus of the stereographic pre-image of a stylus tip on an inferred rotation unit sphere, associating an initial position of the stylus tip with a unit indicatrix vector, and decomposing a indicatrix vector position into ink depth and font frame coordinates.

In an embodiment according to the present invention, the method may further comprise preparing an array of indicatrix vectors for each font frame in the font frame line, assigning for each font frame in the font frame line cumulative dot position offset of each indicatrix vector in the array.

In an embodiment according to the present invention, the method may further comprise recomposing a path of the stylus tip onto a unit font frame.

In an embodiment according to the present invention, the method may further comprise applying point-wise torsional impulses to the indicatrix vector at rotation end-points, and applying to the indicatrix vector rotations of constant curvature.

In an embodiment according to the present invention, the method may further comprise applying radial-action torsion to the indicatrix vector to one of lengthen and reduce a radius of next rotation, applying a twist-action torsion to the indicatrix vector moving a base of the vector to a next center of curvature.

In an embodiment according to the present invention, the method may further comprise checking whether a cardinal direction pointed to by the indicatrix vector is in an inking hemisphere when a direction of the vector is readily discernible, comparing a sign of an ink depth component of the indicatrix vector position when an ink depth direction of the indicatrix vector is indeterminate.

In an embodiment according to the present invention, the method may further comprise flattening of the ink-depth component of the indicatrix vector, superimposing a flattened dot on a principal frame, marking a dot position with ink if the dot position falls within the ink depth width of a flattened principal frame.

In an embodiment according to the present invention, the method may further comprise subtracting a height of a rotation sphere from an equatorial plane, including a minimum ink depth, from the ink-depth component of the indicatrix vector head at a same frame position.

In an embodiment according to the present invention, the method may further comprise calculating a center-point position of a corresponding dot along a magnifying projective cone ray, calculating a magnified dot size relative to a unit frame dot, calculating a region of a raster medium around a calculated center point to mark with a magnified ink dot, marking with ink all dots of the raster medium lying in a calculated region.

In an embodiment according to the present invention, the method may further comprise marking the ink spots of the raster medium in a dot range of a first font frame line collection, marking the ink spots of the raster medium of a next font frame line collection, repeating marking until all spatial chirographic position data are exhausted.

In an embodiment according to the present invention, the method may further comprise identifying a next font frame line in a position data by indicatrix vector font frame components, collecting a next font frame line indicatrix vectors array, and shifting a raster line position coordinate to match a font height coordinate.

In an embodiment according to the present invention, the method may further comprise employing a screen display and a printer.

Aspects of the present invention may be found in a method for rendering stylized chirographic signs. The method may comprise setting a simulated pen width for a marker, setting a simulated minimum ink depth for the marker, setting a simulated initial aspect ratio for a tip of the marker, setting a simulated brush length of a stem of the marker, setting a simulated maximal ink depth for the marker stem, mounting the marker onto a receptacle, recording a simulated initial pen orientation of the marker, and stylizing pen width and ink depth apertures.

In an embodiment according to the present invention, the method may further comprise stylizing a simulated calligraphic nib with the ink depth aperture, stylizing a simulated cylindrical brush with the pen width aperture, and stylizing a simulated flat brush.

In an embodiment according to the present invention, the method may further comprise projecting a profile of the simulated calligraphic nib, when placed in an active orientation, along a unit indicatrix tangent, and projected upon a normal indicatrix plane, applying a resulting span of a profile to an active minimum ink depth aperture, and rendering a stylized minimum ink depth.

In an embodiment according to the present invention, the method may further comprise interpolating an active ink depth factored on a simulated brush length of the marker, interpolating an active ink depth factored on an ink depth component of the indicatrix vector, applying an interpolated value to a stylized pen width aperture, and rendering an ink marking at an active stylus tip position using a stylized pen width aperture.

In an embodiment according to the present invention, the method may further comprise converting an ink depth component of an active spatial position of the stylus tip into a proportion of a simulated brush length, using a proportion of the simulated brush length to select an aliquot increase of a simulated minimum ink depth toward a simulated maximal ink depth, and adding the aliquot increase of the simulated ink depth to the simulated minimum ink depth to obtain the interpolated value.

In an embodiment according to the present invention, the method may further comprise using a sinusoidal ratio of an angle between the indicatrix vector and a positive ink depth axis for the proportion of the simulated maximal ink depth to be added to the simulated minimal ink depth, and adding a sinusoidal proportion of the simulated ink depth range to the simulated minimum ink depth range to obtain the interpolated value.

In an embodiment according to the present invention, the method may further comprise projecting the profile of the simulated minimum brush profile when the simulated brush is placed in the active orientation along the unit indicatrix tangent and projected upon the normal indicatrix plane, recording the resulting span of the profile to the active minimum ink depth aperture, and projecting the profile of the simulated maximum brush profile when the simulated brush is placed in the active orientation along the unit indicatrix tangent and projected upon the normal indicatrix plane.

In an embodiment according to the present invention, the method may also further comprise recording the resulting span of the profile to an active maximum ink depth aperture, interpolating an active span of a marker profile factored on the simulated brush length of the marker, interpolating an active span of the marker profile factored on the ink depth component of the indicatrix vector, applying the interpolated value to the stylized pen width aperture, and rendering the ink marking at the active stylus tip position using the stylized pen width aperture.

Aspects of the present invention may be found in a device for marking stylized chirographic signs. The device may comprise a chirographic reader and a marker assembly.

In an embodiment according to the present invention, the device may further comprise a modified stylus receptacle, wherein a receptacle bracket may be modified to engage a connector for the marker assembly.

In an embodiment according to the present invention, the device may further comprise a probe shaft, a shaft body, a grip handle attached to the shaft body, wherein the grip handle provides a means for attaching the marker device, and a marker orientation measuring device.

In an embodiment according to the present invention, the device may further comprise a probe tip for use in sliding contact with a writing area of a platform of the reader, and a means for simulating ink depth into a writing medium.

In an embodiment according to the present invention, the device may further comprise the probe shaft being adapted to recede into the shaft body under relative pressure upon the probe shaft exerted on the shaft body against a writing guide surface, a means for locking to prevent the probe shaft from disengaging from the shaft body, and a means for retracting the probe shaft when recessive pressure applied to the probe shaft is released.

In an embodiment according to the present invention, the device may further comprise a housing for the probe shaft, a fitting for the marker orientation measuring device, a marker orientation device firmly attached to the marker body housing, and a connector for a marker handle.

In an embodiment according to the present invention, the device may further comprise an obstruction head feature on an inside end of the probe shaft, and a flanged member of the shaft body opening to catch the obstruction head of the probe shaft.

In an embodiment according to the present invention, the device may further comprise a compression spring disposed in the shaft body such that recession of the probe shaft into the shaft housing compresses the compression spring.

In an embodiment according to the present invention, the device may further comprise a receptacle channel opening to receive an attachment of a marker grip handle connector, a means for locking the marker grip handle in place upon insertion into the channel opening, and a sensor for the marker orientation measurement device.

In an embodiment according to the present invention, the device may further comprise a quadrature wheel situated in close proximity to a sensor for the marker orientation when the marker assembly is mounted upon a receptacle bracket.

Aspects of the present invention may be found in a method comprising placing the reader on a flat surface, placing a rule guide upon the written medium aligned so that a desired text may be scanned, attaching a marker assembly to a reader receptacle, deploying a tip of a marker over a writing guide surface, and simulating marking of stylized signs over the writing guide surface.

Aspects of the present invention may be found in a spatial chirography system for operating spatial chirographic devices comprising a chirographic device connected to a chirographic control unit, and chirographic data.

In an embodiment according to the present invention, the chirographic control unit comprising a central processing unit, a system memory module, a system time clock, a data storage medium, a data transmission bus, and a connector for connecting chirographic devices.

In an embodiment according to the present invention, the chirographic device connected to the chirographic unit may comprise one of a chirographic sign reader, a chirographic text character writer, a chirographic text character setter, a chirographic text character scanner, an output device, and a chirographic styling sign marker.

In an embodiment according to the present invention, the chirographic data may comprise position data, procedural instruction text for manipulating the position data, operating system text for executing central processing unit instructions, and system time clock interrupt ticks.

In an embodiment according to the present invention, the position data may comprise position data of one of the reader and the text character writer, reference path data, font frame position data, text setting position data, page scan position data, styling position data, and renderer position data.

In an embodiment according to the present invention, the position data may comprise a time count provided by the timing clock, a first coordinate dimension of a position of a stylus tip, a second coordinate dimension of the position of the stylus tip, a third coordinate dimension of the position of the stylus tip, and a three dimensional reading of the stylus position measured at a common minimum interrupt tick time interval of the system clock timer.

In an embodiment according to the present invention, the font frame position data may comprise stylus position data, a first coordinate dimension of the font coordinate planar position of the stylus tip, and a second coordinate dimension of the font coordinate planar position of the stylus tip.

In an embodiment according to the present invention, the text setting position data may comprise font frame position data, a first coordinate dimension of a typeface carriage columnar position of a writer in a line being set with text, and a second coordinate dimension of a typeface line rank position of the writer in a page being set with text.

In an embodiment according to the present invention, the page scan position data may comprise text setting position data, a direction of scan of a scanned page line in relation to a reference direction of a typeface line in setter position coordinates, an adaptation of a first stylus position coordinate to a first font frame coordinate and to a first scan dot position dimension, an adaptation of a second stylus position coordinate to a second font frame coordinate and to a second scan dot position dimension, and an adaptation of a third stylus position coordinate to a volume dimension offset from a frame coordinate plane.

In an embodiment according to the present invention, the styling position data may comprise page scan position data, an adaptation to a simulated orientation of a calligraphic nib of one coordinate of a chirographic device to a spatial direction of an orientation of a marker, and an adaptation to a simulated depth of ink marking by an art brush tip of a stylus position coordinate orthogonal to a typeface coordinate plane.

In an embodiment according to the present invention, the adaptation to a simulated orientation of a calligraphic nib of a coordinate of a chirographic device to the spatial direction of the orientation of the marker may comprise an adaptation of a direction of scan of the text character scanner to a spatial direction of the orientation of the marker in relation to an active direction of the marker hand stroke in stylus position coordinates, an adaptation of a stylus position coordinate to a spatial direction of the orientation of the marker in relation to an active direction of a marker writing stroke in a stylus position coordinate, and a rotation plane of stylus orientations may be parallel to a typeface coordinate plane of the text character setter.

In an embodiment according to the present invention, the renderer position data may comprise sign styling position data of the styling sign marker, an array of system memory upon which to render a chirographic sign, an adaptation of a first dimension of the memory array to a dimension of an output device raster dot scan position and to a first typeface coordinate dimension, an adaptation of a second dimension of the memory array to a raster line, a dimension of an output device raster line scan position and to a second typeface coordinate dimension.

In an embodiment according to the present invention, the procedural instruction text for manipulating the position data may comprise an instruction program for converting spatial position data into text, an instruction program converting setter position data into composite lines of recognized text, an instruction program for converting scan position data into composite lines of recognized text, an instruction program for converting renderer position data into raster device images on a system output device, and an instruction program for converting sign styling position data into stylized images on a system output device.

In an embodiment according to the present invention, the output device may comprise at least one of a display device and a printing device.

In an embodiment according to the present invention, operating system text for executing central processing unit instructions may comprise an operating system kernel, device driver interfaces, and device driver modules for attached devices.

In an embodiment according to the present invention, the device driver modules for the attached devices may comprise instructions to transfer input data from the kernel to procedures for manipulating the position data and instructions to transfer rendered output data from the kernel to the output device.

In an embodiment according to the present invention, the system time clock interrupt ticks may comprise a constant frequency electrical impulse generated by a calibrated oscillator, wherein assertion of an electrical impulse upon a privileged interrupt vector on a bus signals a reference moment in real time, a system counter accumulating occurrences of clock ticks into real time elapsed, a time interval counter in a device driver module for assigning to each reading of input device position data a real time of a sample.

In an embodiment according to the present invention, the device driver interfaces may comprise a specification of chirographic position data of the output device, a format of the position data of the device, a relative position of each element of the position data of the device, an interrupt identifier for services provided by the device and communication between the device and system unit, a service request call interface for reading current position data of an input device, a service request call interface for writing of rendering and styling data to an output device, a user service request to support data channel services, including an open service call before requesting data, and a close service call when no more data is needed and a user process prepares to terminate execution, service interfaces to support operational cycles of the device and system, an initialize service call at system start-up, and a terminate service call at system shutdown.

Aspects of the present invention may be found in a method comprising connecting available devices to a system unit bus connector, loading device driver modules into an operating system kernel, installing instruction programs into system storage, starting the system, performing an open procedure on a device, servicing device interrupts for read and write requests, performing a close procedure upon one of shutdown and power failure/interruption.

Aspects of the present invention may be found in a wireless chirographic system for operating wireless chirographic devices. The system may comprise a wireless chirographic unit, a wireless chirographic device adaptor, an output device, and a wireless chirographic device.

In an embodiment according to the present invention, the wireless chirography unit may comprise a central processing unit, a data transmission bus, and a bus connector for the chirographic device adaptor.

In an embodiment according to the present invention, the wireless chirographic device adaptor may comprise an emulated device interface register array, an array of position data elements, and a wireless receiver module.

In an embodiment according to the present invention, the output device may comprise at least one of a display device and a printer device.

In an embodiment according to the present invention, the wireless chirographic device may comprise position data and metadata of the position data.

In an embodiment according to the present invention, the metadata of the position data may comprise a device type identifier information, position data for the identified type of device, a maximum acquisition and transmission frequency, and a spill-over buffer of position data arrays for received data when a CPU reading rate falls below a data arrival frequency.

Aspects of the present invention may be found in a method comprising initializing device transmissions by transmitting metadata of a wireless device to a wireless chirographic device adaptor, setting received metadata in the device emulation modules of the adaptor, sending position data from the wireless device to the adaptor, assigning received position data to emulated position data array elements of the chirographic device adaptor, accessing position data array elements of the chirographic device adaptor from an emulated interface according to a metadata address emulation for the chirographic device input type.

Aspects of the present invention may be found in a networked chirographic system for performing spatial chirography between remotely distributed resources, the system comprising a chirographic system fitted with a networking adaptor, a chirographic application on the chirographic system, a partition of the application comprising user request client and service response server resources, a grouping of response server resources into distributed service interfaces of a networked application server system, a grouping of distributed application user requests into client interfaces of network application protocols, a means for conveying application user requests from a client to the network server, a means for fulfilling the user request on the chirography system server, a means for conveying requested chirographic application data from a server to the requesting network client.

In an embodiment according to the present invention, the chirography system application may comprise a chirography system application for acquisition of position data, a chirography system application for calibration of position data to font frame position data, a chirography system application for conversion of position data into reference path data, a chirography system application for text setting on a page of position data, a chirography system application for scanning a page of pre-written text for position data, a chirography system application for conversion of reference position data into text characters of a character set, a chirography system application for conversion of text characters of a character set into reference position data of a user, a chirography system application for styling of position data for stylized rendering, and a chirography system application for rendering of position data on a remote system output device.

In an embodiment according to the present invention, a partition of an application into user request client and service response server resources may comprise a client chirography application on a local networked chirography system requesting remote chirography services, a server chirography application on a local networked chirography system responding to remote chirography requests, and a chirography application on a local networked chirography system performing data interchange with other remote applications on the network.

In an embodiment according to the present invention, the grouping of response server resources into distributed service interfaces of a networked chirography application server system may comprise position data services, calibration services for the font frame data, page layout services for text setting position data, scanning services for converting page scan position data into spatial position data into reference path data and into page layout data, conversion services of position data into reference path data, recognition services converting reference path data into standard electronic interchange coded text, imaging services for converting chirographic data into renderer position data on a remote system output device, and chirographic image styling services.

In an embodiment according to the present invention, the grouping of distributed application user requests into client interfaces of network application protocols may comprise a set of data service layers of the network protocol for handling writing functions, a set of data service layers of the network protocol for handling rendering functions, a set of data service layers of the network protocol for handling text recognition functions, and a sequencing of the grouped application network protocols into a stack of data service layers.

In an embodiment according to the present invention, the set of data service layers of the network protocol for handling writing functions may comprise physical sensor impulses manifested and stored in an electronic storage medium, a sample of spatial array of stored position readings in time, and an encapsulation of a sequence of positions into standardized paths.

In an embodiment according to the present invention, the encapsulation of a sequence of positions into standardized paths may comprise paths along geodesic planes of rotation of the unit reference indicatrix vectors, paths of point-wise deformation of the geodesic paths of the unit reference indicatrix vectors, and ligature paths of constant torsion connecting the standardized geodesic paths of the unit reference indicatrix vectors.

In an embodiment according to the present invention, the set of data service layers of the network protocol for handling text recognition functions may comprise a collection of the standardized paths into a lexicon of symbols, a reference collection of the symbolic lexicons for all characters in a writing system, and electronic information interchange codes of the character set of the writing system.

In an embodiment according to the present invention, the set of data service layers of the network protocol for handling rendering functions may comprise a standardized path of user writings, a stylizing of the ink markings, a flattening projection onto a unit font frame dimension, and a magnification onto device raster frame dimension.

In an embodiment according to the present invention, the means for conveying chirography application user requests from a client to network server may comprise means for conveying a chirography application user request from the user interface through the data service layers of the network protocol and to the physical representation of the request, a means for transmitting a physical form of the chirography application data through the physical medium separating the client system from the server system, a means for receiving the physical form of the chirography application data through the physical medium separating the client system from the server system, a means for conveying the received physical form of a chirography application user request from the physical layer through the data service layers of the network protocol and to the chirography application protocol layer for the requested service.

In an embodiment according to the present invention, the means for fulfilling the user request on the chirography system server may comprise a service management interface for invoking the application procedures of a chirography system application, a passing of the conveyed user request data into the procedure interface, an invocation of the procedure with the passed-in request, a retrieval of the requested application data returned by the procedure.

In an embodiment according to the present invention, the means for conveying requested chirographic application data from a server to the requesting network client may comprise a means of conveying a chirography application server response data from the server interface through the data service layers of the network protocol and to the physical representation of the response data, a means for transmitting the physical form of the chirography application server response data through the physical medium separating the client system from the server system, a means for receiving the physical form of the chirography application server response data through the physical medium separating the client system from the server system, a means for conveying the received physical form of a chirography application server response from the physical layer through the data service layers of the network protocol and to the chirography application protocol layer of the requesting user.

A spatial chirographic sign reader may be adapted to collect three-dimensional positional data in real-time employing a method of facsimile projection of the positional data onto an X-Y plane to identify written symbols from a font origin below a projection plane, for example. The positional data may comprise simulated handwriting motions made by employing a stylus. The stylus may comprise a stylus tip placed in engagement with a portion of the reader while the reader gathers time and position data.

A spatial character recognition technique may also comprise partitioning the positional data into two types of handwriting strokes adapted to be recorded by the reader, for example. When a depth of the stylus tip is above a maximal ink depth, the handwriting strokes may be designated to positioning and/or to inking, for example. The two types of strokes may also be converted into separate stereographic projections to render a stylus tip path into rotations along a projection of Riemann spheres, for example. The rotations may also be categorized employing cardinal directions about a reference point at a center of a writing volume to provide uniqueness in a character set, wherein a recognition technique may enable recognition of the handwriting strokes as text and identified by standard inking paths of a reference set of character of a written language system, for example.

The spatial reader may also provide direct character recognition when stereographic projection constraints are applied. The stylus employed in conjunction with the reader may enforce a projection constraint, wherein the recognition method may be adapted to impose numerous assumptions regarding dimensions of inking and positioning projections, for example. A calibration process may be employed to control numerous geometrical characteristics. The user may demonstrate substantial awareness of geometry and manipulative skill in the manner by which the stylus may be employed, for example.

Aspects of the present invention may be found in a calibration process adapted to reduce arbitrary degrees of freedom brought upon by an unconstrained stylus and to more consistently adhere to stereographic constraints employed by a character recognition method to improve accuracy of handwritten text recognition.

In an embodiment according to the present invention, a stylus may be attached to a reader in an articulated fashion to provide three degrees of freedom. The stylus may be tracked by adding position measurements for the stylus similar to those for the reader resulting in a chirographic text character writer.

In an embodiment according to the present invention, the reader defines a writing surface and a font coordinate system. The writing surface approximates a projection plane for conical sections emanating from a font origin below a writing volume.

The spatial chirographic reader is adapted to gather positional data of the stylus tip in real-time. The reader may also define a writing area, wherein the user is expected to limit handwriting stroke lengths to ensure that the characters fit into the available area. The reader comprises a reader boom adapted to span the writing volume and permit substantial flexibility on locating the stylus tip therein.

In order to effect character recognition, the writing volume may be covered by two Riemann spheres to convert the stylus tip path into spherical arcs, for example. The portions of the Riemann spheres covering the writing volume form a disc (semi-disc) and each disc/semi-disc possesses a projection pole at an opposite side of the writing volume.

A positioning semi-disc has a pole below the writing surface at the font origin, for example, wherein positioning projection rays approximate the magnitudes of the font size. An inking semi-disc may have no natural pole, for example.

Regarding an articulated stylus, it may be necessary to associate an inking projection ray with an axis of a shaft of the stylus. A projection sphere may comprise dimensions of a shaft length of the stylus, which may be multiples in of the font size, for example.

Because the reader more or less fixes the font size by the writing area by way of the travel distance of the stylus tip along the boom, it may be more accommodating to reverse the nominal roles of stylus and font projections when articulating the stylus with the reader, for example. A result of the role reversal is that the three degrees of freedom being tracked at font coordinates and the reader functions may be assigned to the stylus justifying designation of the stylus as a writer.

FIG. 1 is a perspective view illustrating a chirographic text character writer 100 according to an embodiment of the present invention. FIG. 1 illustrates a top perspective view of the chirographic text character writer 100 comprising a font base platform 101 housing a font reader assembly 102 and a pylon 103 supporting a reader assembly 104 generally above the platform 101. The chirographic text character writer 100 may also comprise a reader assembly boom pointing downwardly toward the platform 101.

A reader assembly 104 may be suspended downwardly from the pylon 103, for example. The reader assembly 104 may comprise support pinion 144 having a quadrature wheel 105 attached thereto and in close proximity to a quadrature sensor 106 also attached along a top side of the reader assembly 104. Some elements of the reader assembly 104 are obscured in FIG. 1 by a housing of the reader assembly 104, wherein obscured parts are depicted in broken outline under partial transparency of the housing.

On a bottom side, support pinion 144, fully obscured, is attached to a fulcrum bracket 107. Another quadrature sensor 108, mostly obscured by another quadrature wheel 109 is attached to the fulcrum bracket 107. The fulcrum bracket 107 houses a minor pinion 143 wherein the quadrature wheel 109 is mounted on the minor pinion 143. The minor pinion 143 is attached to reader boom stems 110 and 111, which are connected at by a bridge segment 112. The bridge segment 112 is curved to accommodate a stylus probe 118 extending past the ends of boom stems 110 and 111.

A stylus receptacle bracket 113 may be mounted upon boom stems 110 and 111. The stylus receptacle bracket 113 has a small receptacle opening 114 through which the stylus probe 118 locks to the receptacle bracket by an 'L' shaped probe hook 119. The entire probe with stems (110 and 111) and receptacle bracket 113 may be encased in a stylus sheath 120, shown transparent (in broken outline) in FIG. 1. The stylus probe hook end 119 locks the stylus sheath 120 in place via a snugly engaging through a penetrating locking hole 121 in sheath 120, for example.

Apart from locking to probe hook 119, the stylus sheath 120 also fits slideably over boom stems (110 and 111) and travels in unison with the receptacle bracket 113. The top of the stylus sheath 120 may be open adjacent the boom stems (110 and 111) to accommodate spring 117 that hooks to sliding bracket hole 115 and fulcrum bracket hole 116. The bottom of the stylus sheath 120 may be tapered in a cone shape focusing toward the stylus tip and may comprise an orifice 122 through which the probe shaft 118 may extend. The stylus shaft may therefore slide freely along the boom guided by the probe shaft 118, the receptacle bracket 113, and boom stems (110 and 111) and may be maintained in a retracted (raised) position by spring 117 running along an end of the shaft.

The bottom end of the stylus probe shaft may be formed in a ball joint 123 engaging the stylus writer to the font reader assembly 102 in an articulated manner, for example. The top surface of the font reader assembly 102 is rendered transparent to reveal features inside the platform 101. In the middle of the top surface is a prominent opening fitted with a circular collar 128 around which fits a rim of a hemi-spherical mortar cup 155 corresponding to an un-projected hemisphere of a positioning Riemann sphere. At a bottom of the mortar cup 155 is an orifice 129 through which a pestle shaft 126 protrudes. The orifice 129 may correspond to a projection pole and the pestle shaft 126 to a projection ray emanating from the projection pole. A bottom of the pestle shaft 126 may comprise a locking ball feature 127 that keeps the pestle shaft 126 in place and allows the pestle shaft 126 to swivel around the orifice 129.

A length of the pestle shaft 126 may be encased in a pestle sheath 124, shown in FIG. 1 partially retracted and transparent to depict the pestle shaft 126 within. The pestle sheath 124 may act as a bushing for a top end of the pestle shaft 126. The top of the pestle sheath 124 may comprise a socket joint 125 rotatably engaging a ball joint 123 of the stylus tip, for example.

The pestle sheath 124 may have four fixtures 134 to which are attached two position fathoming lines (135 and 136). The first fathoming line 135 may thread through mortar guide hole 131, pass through guide spindle 137, quadrature wheel 139, and guide hole 130, to an opposite sheath fixture 124. Motion of the pestle shaft 126 along a direction line connecting guide holes 130 and 131 may be asserted by quadrature wheel 139 and may be measured by quadrature sensor 141.

The second fathoming line 136 may be attached to a third fixture 134, threaded through mortar guide hole 133, pass through guide spindle 138, quadrature wheel 140, and guide hole 132, to an opposite fixture 134. Motion of the pestle shaft 126 along a direction line connecting guide holes 132 and 133 may be asserted by quadrature wheel 140 and may be measured by quadrature sensor 142.

Adjustment of the stylus posture may be made by turning the lower stiff pylon hinge 154 at a base of the 101 and upper pylon stiff hinge 152 of the reader assembly housing face 153 to suit the writing preferences of the user.

Calibration or alignment of the pestle shaft X-Y zero to a reference ray direction may be achieved by turning spindles 137 and 138 by their edges 147 and 148, accessible through openings 145 and 146 of the housing 102. A means for adjusting an extension of the stylus shaft length 151, shown in transparent form, may facilitate alignment and/or calibration by turning the calibration sleeve to move the shaft and bracket back or forth along adjuster ring treads (not shown). An adjuster ring (not shown) rotatably locks onto a ringed groove on an outer surface of the stylus body and to the stylus probe hook 119.

Alignment of the pole of the mortar cup 29 may be altered by moving a pestle end feature 127 employing screw adjusters 149 and 150 and to permits slight inclinations of the mortar face, for example.

A stylus inking coordinate system may be similar to the font coordinate system of the spatial chirographic reader, for example. The stylus receptacle reference location may be removed from the receptacle by the length of the stylus probe. Other minor adjustments, including reversing the reference directions may be employed because the spatial reader is essentially upside-down in relation to the spatial chirographic reader.

A font positioning coordinate system may comprise a Cartesian coordinate system, configured so that the X-Y plane coincides with the writing portion of the support platform, and the Z-axis is disposed nominally collinear with the stylus probe and coinciding with the pestle shaft 126 pointing outward at a middle of the mortar hollow and having the origin at the pestle orifice 129, for example. Placement of the stylus may vary so that the Z-axis may not extend through the middle of the mortar, or conversely, not be collinear with the stylus probe.

The X-Y readings gathered may not be orthogonal but may be constrained by spherical homogeneous coordinate constraints. The X and Y values may be derived and used to improve the accuracy of inking coordinate measurements. The converse applies equally, wherein a positioning measurement of the font coordinate system may verify stylus positioning coordinate readings. The font positioning coordinate readings may be more sensitive than the stylus inking coordinate readings, although wide stylus handwriting strokes may reverse the relative accuracy.

Aspects of the present invention may also be found in a chirographic text character writer employing spatial character recognition techniques to convert three-dimensional real-time positional data of a reader apparatus into recognized text.

Aspects of the present invention may also be found in a spatial text character setting method controlling setting of a carriage and line position associated with a recognized character in a writing session.

The spatial character recognition may be employed for handwriting character recognition in a writing system. Although a writing system may be unable to exhaust all possible distinctly identifiable inking character handwriting strokes, it may be considered prudent to reassign carriage and line control for handwriting strokes not immediately associated with recognized characters of the writing system (unrecognizable strokes, for example).

Aspects of the present invention may be found in providing inputs for a chirographic text setting function independent of inputs employed in spatial character recognition, for example. In other words, because the spatial character recognition Technique may be universally applicable in any handwriting system, for example, a text setting technique that is equally universally applicable may also be employed.

Aspects of the present invention may be found in enabling a chirographic writer the ability to simultaneously track two handwriting motions (handwriting strokes) so that horizontal carriage spacing, including carriage return, and vertical line advance and retreat, may be asserted independently of character recognition handwriting strokes by tracking the motion of the writer against a surface upon which the write rests.

In an embodiment according to the present invention, the chirographic text writer may comprise two additional sensors. A first sensor may be employed for supporting setting of a recognized character along a horizontal travel path of the writer to a right shift of a current carriage position, and supporting a return of a setting position to a beginning of a line providing sequential placement of a recognized character along a handwriting line, for example.

A second sensor may be employed for detecting a vertical advancement of the writer to signify a line feed of an assumed carriage of a writing medium, or a reverse line feed to return the character setting position to a previous line, for example.

Figure 2:
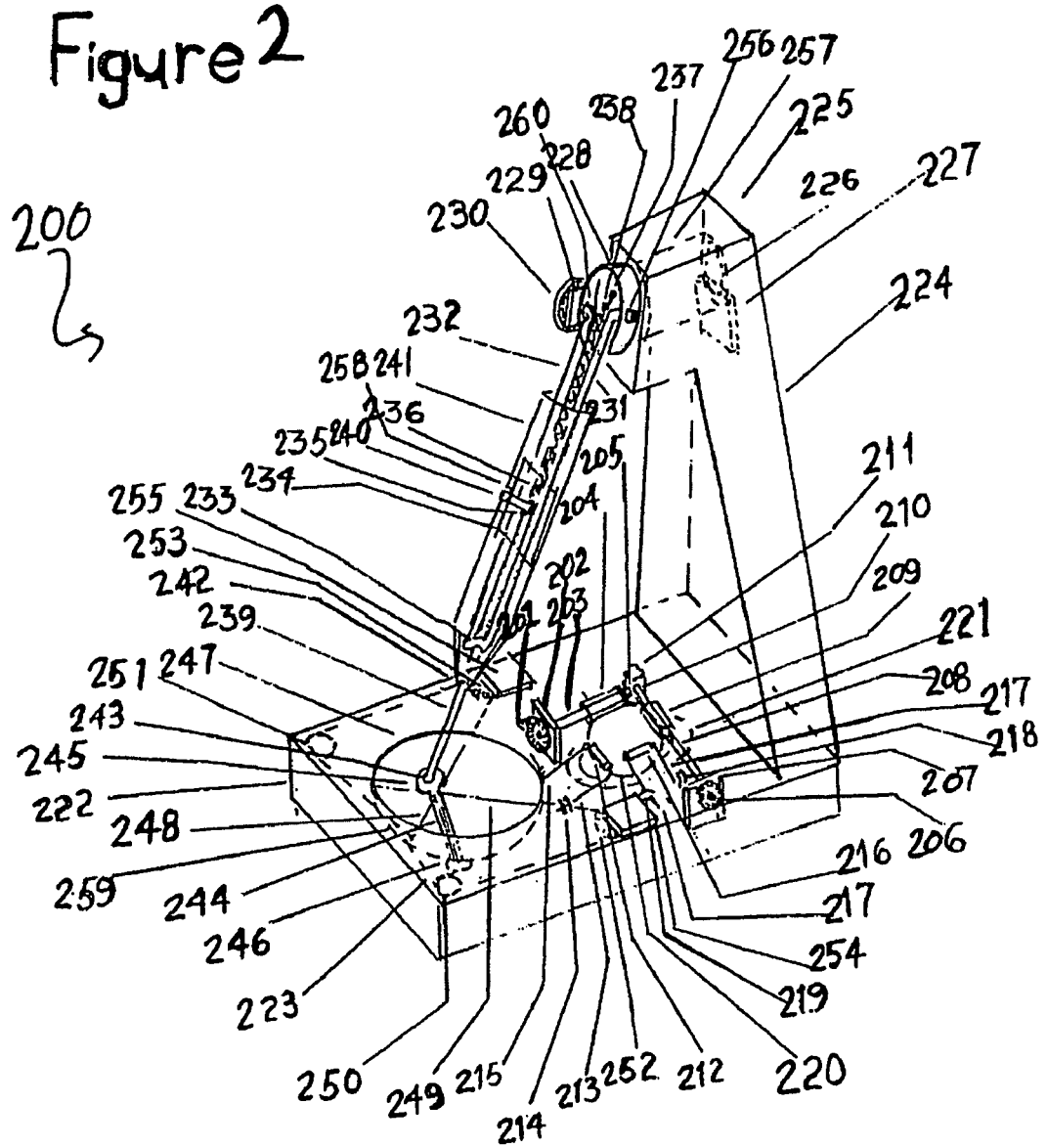
FIG. 2 is a perspective view of a chirographic text character setter according to an embodiment of the present invention.

FIG. 2 is a perspective view of a chirographic text character setter 200 comprising a spatial writer having features deployable along to the platform base according to an embodiment of the present invention. The font platform base 222 houses an extension of the writer to hold text character setting carriage and line sensors and henceforth may be referred to as the setter 200.

The setter platform 222 houses a motion detection mechanism, such as for example, a motion detection mechanism commonly used in a computer mouse, but specialized for carriage and line tracking. The structure may be wholly contained within the platform base 222 of the setter 200. FIG. 2 depicts a perspective view with a top surface of the platform 222 being aligned with a writing surface of the platform 222 rendered transparent and unnumbered.

The setter 200 may comprise a line position change detection quadrature wheel 201 attached to line detection spindle 203, and in close proximity to a line position detection quadrature sensor 202, which may be affixed to a bottom of platform base 222. The other end of the line detection spindle 203 may be rotatably attached to anchor 211, also affixed to the bottom of platform base 222. A spindle end may fit rotatably into an anchor receptacle 205. The line detection spindle 203 may be lined with a roller 204 that may be in rotatable contact with ball 220, which will turn the line detection spindle 203 whenever the platform 222 traverses a contact surface in a 'next line' direction of the writing surface, for example.

The platform 222 may also comprise a carriage motion detection quadrature wheel 206 attached to a carriage detection spindle 208, and in close proximity to a carriage detection quadrature sensor 207, affixed to the platform base 222. The other end of the carriage detection spindle 208 is rotatably attached to anchor 211. The carriage detection spindle 208 may be rotatably coupled into anchor receptacle 210. The carriage detection spindle 208 may also comprise a roller 209 in rotatable contact with a tracking ball 220, which may be adapted to turn the carriage detection spindle 208 whenever the platform 222 traverses a contact surface in a 'next column' direction of the writing surface.

The tracking ball 220 may be maintained in contact with carriage roller 209 by a spring-loaded roller 212 pressing the ball 220 toward roller 209 with a spring wire 213 anchored on the platform base 222 by fixtures 214 and 215, for example. The tracking ball 220 may also be maintained in contact with line roller 204 by being pushed toward tracking ball 220 by spring loaded roller 216 pressing the ball 220 toward roller 204 with spring wire 217 anchored on the platform base 222 by fixtures 218 and 219, for example.

The tracking ball 220 may be locked in place by a flush screw cap 221 screwed onto the platform base 222 after the tracking ball 220 is inserted into a platform cavity. Additional connections may be fixed to an upper surface of the platform 222 (not shown to support depicted structures and to protect the structures from impact damage, for example.

One connection, for example, may be a restraining cap limiting vertical motion of the ball 220 fitted to an underside of the transparent top surface of the platform base 222, for example.

Another connection may be a restraining column(s) on a free side of each of rollers 204, 209, 212 and 216, for example, fixed with respect to an underside of the transparent top surface of the platform base 222.

Another connection may comprise vertical stops for spring wires 213 and 217, for example, which may also be fixed to the underside of the transparent top surface of the platform base 222.

The above connecting structures may be affixed to a wheel-casting socket attached to the top surface of the platform 222, for example. The remainder of the elements disclosed in FIG. 2, illustrate elements of the setter 200 that are also disclosed in the writer, illustrated in FIG. 1. For example, a font base platform 222 housing a font reader assembly 223 being attached to pylon 224 for supporting writer assembly 225 in above the platform 222.

The writer assembly 225 may be suspended downwardly from the pylon 224, but in all essential respects may be similar to elements disclosed in FIG. 1 for the spatial chirographic reader. The setter 200 may also comprise a support pinion 257 with a quadrature wheel 226 attached thereto and in close proximity to a quadrature sensor 227, which may also be attached at a far side of pylon 224. Some assembly elements may be obscured by a housing of writer assembly 225, wherein the obscured parts are depicted in broken outline under partial transparency of the housing. On the perspective near side of the diagram, the fulcrum support pinion 257, which is fully obscured in FIG. 2, may be attached to fulcrum bracket 228, for example.

A quadrature wheel 230, which is partially obscured in FIG. 2, by quadrature sensor 229, may be attached to a fulcrum minor pinion 256. The fulcrum minor pinions 256 and 260 may be rotatably anchored to fulcrum bracket 228. The fulcrum minor pinions 256 and 260 may also be attached to reader boom stems 231 and 232, respectively. The reader boom stems 231 and 232 may be connected at a bottom end by bridge segment 233, which may be curved to accommodate a stylus probe 239 extending past ends of the boom stems 231 and 232.

Upon boom stems 231 and 232 a stylus receptacle bracket 236 may be mounted. The stylus receptacle bracket 236 may have a small receptacle opening 235 through which the stylus probe 239 may be locked to the receptacle bracket 236 by an 'L' shaped probe hook 240. The stylus probe 239, boom stems 231 and 232, and receptacle bracket 236 may be encased in a stylus sheath 241, shown as transparent in FIG. 2. An end of the stylus probe hook 240 may lock the stylus sheath 241 in place via a penetrating locking hole 258 in sheath 241.

Apart from locking to probe hook 240, the stylus sheath 241 fits slide-ably over boom stems 231 and 232 and travels in unison with receptacle bracket 234. The top of stylus sheath 241 may be open, and in addition to housing boom stems 231 and 232, the sheath 241 may also accommodate a spring 238 hooked to sliding bracket hole 235 and fulcrum bracket hole 237. The bottom of stylus sheath 241 may be tapered in a cone-shape focusing toward a stylus tip 243 and may have an orifice 242 through which stylus shaft 239 extends to stylus tip 243. The stylus shaft 239 may therefore slide freely along the boom guided by the probe shaft, receptacle bracket 236, and boom stems 231 and 232 and may be kept in a retracted (raised) position by spring 238 running along the shaft 239. The bottom end of the stylus shaft 239 may form a ball shaped joint end 243 engaging the stylus writer to the font reader assembly 223.

The top surface of the font reader assembly 223 is rendered transparent to reveal features inside the platform 222. A middle of the top surface may comprise an opening fitted with a circular collar 247 around which fits a rim of a hemispherical mortar cup 259 corresponding to an un-projected hemisphere of a positioning Riemann sphere. The bottom of mortar cup 259 may comprise an orifice through which a pestle shaft 244 may protrude. The orifice may correspond to a stereographic projection pole and the shaft 244 may correspond to a projection ray emanating from the pole. The bottom of the shaft 244 may comprise a locking ball feature 246 keeping the pestle shaft 244 in place and allowing the shaft 244 to swivel around the orifice. The top of pestle shaft 244 may comprise a socket joint 245 rotatably engaging ball joint 243 of the stylus tip 243 in a ball and socket fit.

The pestle shaft 244 may be attached to position fathoming lines. A first position fathoming line 248 may pass through a guide spindle 251, and a quadrature wheel 253, which is partially obscured by quadrature sensor 255, and back to shaft 244. Motion of the pestle shaft 244 along a direction line 248 may be asserted by quadrature wheel 253 and may be measured by the quadrature sensor 255.

The second position fathoming line 249 may be attached to the pestle shaft 244 and pass through quadrature wheel 252, which is partially obscured by quadrature sensor 255, and then through guide spindle 250, and back to the pestle shaft 244 through a mortar guide opening to an attachment on a opposite side of initial attachment to the pestle shaft 244. Motion of the pestle shaft 244 along a direction line 249 may be asserted by quadrature wheel 252 and may be measured by the quadrature sensor 254.

The text setter coordinates may be configured to be parallel to the X-Y plane coinciding with the writing portion of the support platform. A carriage coordinate axis runs along the X-axis of the font coordinates, and the positive direction corresponds to an implied shift needed to position a next character ready for setting. This direction may be in the positive X-axis direction (by a right-handed Cartesian coordinate) when text setting in the Latin alphabet system, for example. The direction may also be in the negative X-axis direction when text setting the Arabic alphabet system.

A line coordinate axis runs along the Y-axis of the font coordinates, and the positive direction is in the negative Y-axis direction (by a right-handed Cartesian coordinate) when text line setting is in a downward page direction, for example.

Aspects of the present invention may be found in a spatial chirographic sign writer employing an inverted spatial chirographic sign reader as a stylus position-tracking device and by adding position measurement at a writing platform.

Aspects of the present invention may be found in implementing a reader in calibration environments. Five spatial readings of a stylus and two font coordinate readings may be measured, however, only three readings are necessary for accurate calibration. For example, the vertical travel of the stylus, in combination with X and Y planar measurements along the writing plane may be sufficient to calibrate the device. In an embodiment of the present invention, redundant and/or unnecessary measurements may be discarded making the writer design less costly to manufacture, for example.

Discarding a mortar and pestle calibration constraint, for example, may also eliminate the complexity of handling writer font coordinates permitting a more compact design and a thinner platform housing.

Aspects of the present invention may be found in employing a chirographic text character writer for which only linear travel of an inverted boom may be retained. Because only planar X-Y readings may be discerned from writing plane readings, a simplified reader configuration that does not span the Z-axis may also be employed. Simplification results in only one calibration requirement, that is, that the stylus shaft be rectilinear to a reference X-Y guideline, for example.

Figure 3:
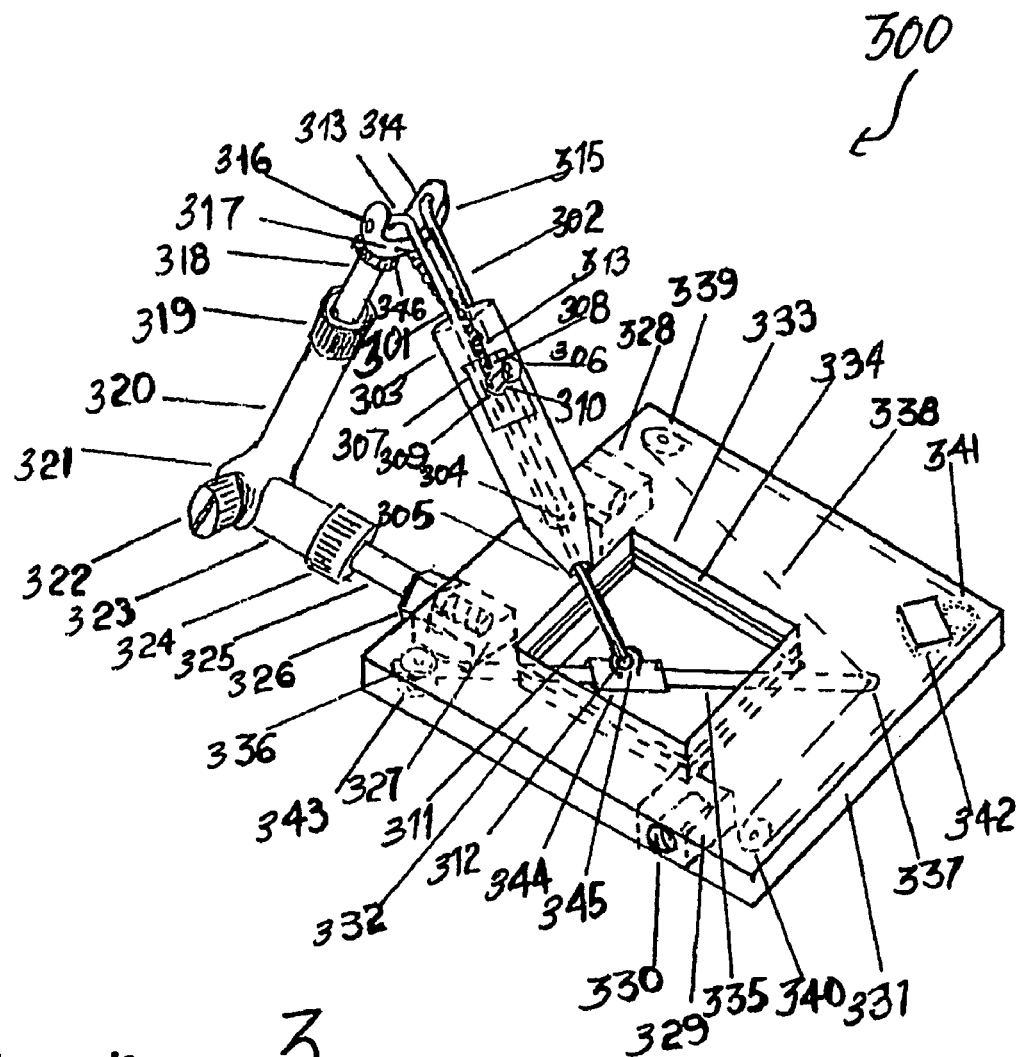
FIG. 3 is a perspective view of a chirographic text character writer according to an embodiment of the present invention.

FIG. 3 is a perspective view of a chirographic text character writer according to an embodiment of the present invention. FIG. 3 illustrates a top perspective view of the chirographic writer comprising a font base platform 331 housing a font reader assembly 332 and mounting blocks 327, 328 and 330 for bolt-end 326 of a stylus pylon assembly. A top face 332 of the platform 331 may comprise a font frame opening 333 extending from an upper and lower face of the platform 331 and leaving a gap 334 around an opening so that a fathoming guide strip 335 may freely travel along a plane of the gap 334. The fathoming guide strip 335 may comprise a hole at each end. One end hole may be rotatably attached to a spindle 343, wherein the spindle 343 may be attached to the platform 331 to turn the guide strip 335 into a pivot arm. The other end 337 of the fathoming guide strip 335 may travel in a circular arc within the body of platform 331.

A fathoming line 338 may be attached to the fathoming guide strip end hole 337 and may thread around pulleys 339 and 340 turning the quadrature wheel 341 to measure an arc travel of the 337 of the fathoming guide strip 335 and around pivot 336 and adjacent to quadrature sensor 342.

An exposed section of the fathoming guide strip 335 accommodates a sheath 344 having a receptacle 345 for stylus tip 312. The sheath 344 may engage pivot arm guide strip 335 in slide-able contact and may also be provided with a means for sensing a position of the sheath 344 along the guide strip 335.

In an embodiment according to the present invention, the means for sensing the position of the sheath 344 along the guide strip 335 may be provided by a measurement of an electrical resistance of the guide strip 335 from one measurement end of the guide strip 335 to a point of contact made with the conductive sheath 344.

Many features of the stylus booms are retained from the chirographic writer described above, such as for example, boom stems 3011 and 302, which are attached to pinion ends 313 and 314 and rotatably engage fulcrum bracket 315. Opposite ends of boom stems 301 and 302, may be connected by a bridge member 309 adapted to guide probe shaft 311. A receptacle bracket 307 may be mounted upon boom stems 301 and 302. The receptacle bracket 307 may comprise a small receptacle opening 309 through which the stylus probe 311 may be locked to the receptacle bracket by 'L' shaped probe hook end 310, for example. The stylus probe 311, boom stems 301 and 302, and the receptacle bracket 307 may be encased in a stylus sheath 303, shown as transparent in the FIG. 3. The stylus probe hook end 310 may lock the stylus sheath 344 to the receptacle bracket 307 by penetrating the locking hole 306 of the sheath 344 to keep the sheath in line with the bracket receptacle opening 309.

Apart from locking to the probe hook end 310, the stylus sheath 344 may slide-ably fit over boom stems 301 and 302, so that the sheath 344 travels in unison with the receptacle bracket 307. The top of the stylus sheath 344 may be open, and in addition to housing boom stems 301 and 302, the sheath may also accommodate a spring 313 hooked to a sliding bracket hole 308 and a hole 317 in fulcrum bracket 315, for example. The bottom of the stylus sheath 344 may be tapered into a cone shape to focus towards a stylus tip and may have an orifice 305 through which the probe shaft 311 extends. The stylus sheath 344 may therefore slide freely along the boom guided by the probe shaft 311, the receptacle bracket 307, and boom stems 301 and 302. The boom may also be maintained in a retracted (raised) position by the spring 313 running along the shaft to attachment on a sliding bracket, for example.

The bottom end of the stylus probe shaft 311 may form a ball-shaped joint end 311 adapted to attach the stylus writer to a font reader socket joint receptacle 345 in an articulated ball and socket manner.

The top surface of the font reader assembly 332 is rendered transparent to reveal features inside the platform 331. In the middle of the top surface is an opening fitted having a rectangular opening 333 provided therein. The top of the sheath 344 may comprise a socket joint 345 rotatably engaging a ball joint 312 of the stylus tip.

An arc traced by a free end 337 of the guide strip 335 may be tracked by fathoming line 338. Two ends of fathoming line 338 may be attached at an end 337 of the guide strip 335. Fathoming line 338 may pass through guide spindles 339 and 340, and around quadrature wheel 341. Arc motion of guide end 337 may be asserted by quadrature wheel 341 and may be measured by quadrature sensor 342.

Stylus posture may be adjusted. For example, the location of the stylus may be varied by attachment to one of mounting blocks 327, 328, or 329. In FIG. 3, for example, the stylus may be attached to mounting block 327 with bolt-end 326 of the pylon base. The pylon base may extend horizontally with shaft 325 and be slide-ably connected to adjustable end 323, for example. Adjustment of the horizontal disposition of the stylus may be facilitated by, for example, loosening and/or tightening ring nut 24 at a desired mating position of horizontal members 325 and 323.

A horizontal end member 323 of the pylon may be joined to a vertical member in a strut joint 321 of the vertical pylon member 220 and may be fixed in position with a pressure screw 322, for example. The inclination of the vertical pylon member 320 may be adjusted by loosening and tightening pressure screw 322 after a desired inclination is fixed. The height of fulcrum bracket 315 may be adjusted by, for example, mating member 318 when locking ring nut 319 is loosened. The height of the fulcrum bracket 315 may be fixed by, for example, tightening locking nut 319 at a desired mating position of vertical member 318. The fulcrum bracket 315 may rotate freely around bearing 346 and may fit over a top vertical member of the pylon.

The measurement coordinates relative to writer guide pivot hole 336 may coincide with polar coordinates, wherein the measured angle theta θ relative to a horizontal edge of the platform may correspond to a polar coordinate relative to the X-axis and a measured position along the guide rho p may correspond to a radial translation as follows:

$$x_m = \rho \cos(\theta);$$

$$y_m = \rho \sin(\theta).$$

The inclination of the stylus relative to the guide shaft as measured by a spherical inverse latitude angle phi ϕ may be rectilinear by design, and may be kept at angle π/2, and a depth coordinate measurement may be given by the position of the stylus boom receptacle position beta β, relative to the font origin.

$$z_m = \beta.$$

In an embodiment according to the present invention, the sheath 344 may comprise two fixtures, to which may be attached two ends of a position fathoming line. The position fathoming line may thread around a guide spindle at guide end 337 and then a quadrature wheel on spindle 343, so that motion of the sheath 344 along the guide strip 335 may be asserted by the quadrature wheel on spindle 343, and may be measured by the quadrature sensor associated with that quadrature wheel. The manner of assembly of the quadrature wheel and sensor may be similar to that shown for the arc-tracing quadrature wheel 341 and sensor 342, for example.

In an embodiment according to the present invention, a means for sensing a position of a bracket along guide strip 335 may be provided by a quadrature wheel at spindle 343, which may be turned by a fathoming line attached to the bracket and looping around a pulley at end 337. In an embodiment according to the present invention, the level of miniaturization may overcome inertial quadrature wheel situations associated with rapid handwriting movements, for example.

Aspects of the present invention may be found in a spatial chirographic text character setter employing a carriage position tracker of a writing platform of a spatial chirographic writer and also employing a line position tracker of the writing platform, wherein the device may be employable as a chirographic text character writer.

In an embodiment according to the present invention, a support pylon of the writer may be employed to facilitate sensing of carriage and line setting hand motions. The write may be employed in a mobile fashion, wherein the point of rest of the platform may be associated with an upper arm and/or wrist of a user rather than a tabletop, for example.

In an embodiment according to the present invention, the pylon of the writer may comprise two articulated parts between which setting of a carriage shift or line feed may be sensed by a wrist motion of the user, for example.

To achieve sensing of text setting actions from the wrist of the user, for example, the device may pivot from the upper arm proximate to the wrist of the user. A palm-position detector may detect hand-action, relative to a wrist-point of rest, for example.

Palm position detection may be implemented via a palm clasp, which may effectively supplant the pylon of the writer. A palm clasp may comprise an elongated structure that begins on a side of the palm, between a base of the little finger and the wrist, and may turn to a back of the hand and extends across a span of the knuckles to the index finger, and may turn around the index finger to a space between the index finger and the thumb when the index finger is kept apart from the thumb, for example.

If the two ends of the palm clasp are taken as reference points for orientation of the wrist, then the palm clasp may be employed to detect rotation of the wrist through two planes.

The first plane may be a rotational path of the palm when the hand of a user is moving vertically and away from the user. The second plane may comprise a rotational path of the palm when the hand of the user is turning within or around a frontal plane of the user. Motion in the two planes may be detected by one end of the palm clasp if the other end of the palm clasp is fixed in space by a support in a mobile application of the device, for example.

In an embodiment according to the present invention, an end of the palm clasp mating to the little finger edge of the palm of the user may be employed as relatively stationary reference point, for example. Thus, the mobile device may be employed with the arm of the user pressing down on a reference surface, such as a desktop, for example.

Measurement of the relative movement and/or turning actions may be captured by a grip that may be in articulated contact with a free end of the palm clasp. The free end of the grip may travel according to carriage shift and line feed directions relative to the writer platform, for example.

In an embodiment according to the present invention, the wrist may rest upon the index finger edge of the palm, changing the disposition of the free end of the grip relative to the platform and the palm clasp. The configuration may support a side of the palm clasp to the little-finger edge of the palm, for example.

Aspects of the present invention may be found in employing a chirographic text character writer having a support platform affixed to a palm grip in articulated contact with a wrist support clasp, wherein motion of the grip relative to the platform and relative to the wrist may capture carriage and line positioning measurements.

Figure 4:
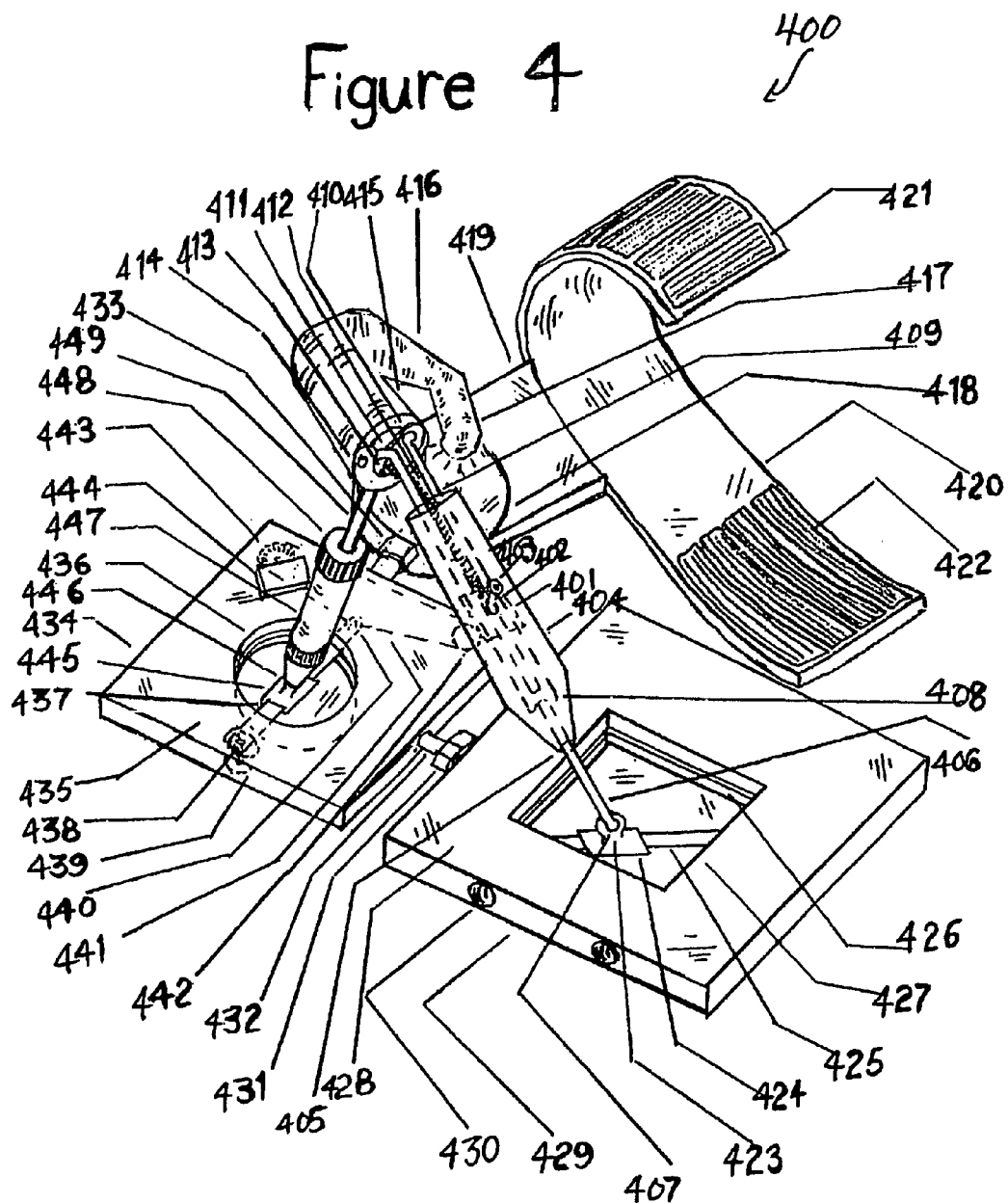
FIG. 4 is a perspective view of a chirographic text character writer according to another embodiment of the present invention.

FIG. 4 is a perspective view of a chirographic text character writer 400 according to another embodiment of the present invention. FIG. 3 illustrates a top view of the chirographic writer comprising a font base platform 429 and a font reader assembly having a transparent top face 428. Mounting block 430 is illustrated on a side of the platform 429. A mounting bolt, such as for example, mounting bolt 431 may fit into threaded hole 430. The top face 428 of the platform displays a font frame opening 427 comprising an upper and lower face and a gap 426 at a middle of the opening faces around the opening so that fathoming guide strip 425 may freely travel along a plane of the gap 426.

The exposed section of the guide strip 425 may accommodate a sheath 424 having a receptacle 423 for stylus tip 407. The sheath 424 may engage the pivot arm of guide strip 425 in slide-able contact and may be provided with a means for sensing a position of the sheath 424 along the guide strip 425.

In an embodiment according to the present invention, sensing the position of the sheath 424 along the guide strip 425 may be provided by a measuring the electrical resistance of the guide strip 425 from one end of the guide strip 425 to a point of contact made with a conductive sheath 405.

Features adopted from the writer stylus and shown in FIG. 4 may comprise a writer receptacle bracket 401 that latches onto the stylus with an 'L' shaped probe hook end 402, which terminates in a locking hole 403 of stylus shell 404. The stylus body may comprise a lower tapered end with an opening 405 for stylus probe 406 ending at a ball joint 407. The stylus probe 406 may be guided by bridge 408 of a stylus boom stem 409 extending to the fulcrum as pinions 410 and 411 bending into fulcrum bracket 414.

A remnant of a horizontal end member of the pylon of the writer is connecting bolt 431 of horizontal attachment 432 of a wrist setter-sensing platform 434. The top surface of the wrist setter assembly 435 is rendered transparent in FIG. 4 to reveal features inside the platform. In the middle of the top surface is a circular opening 36. In the cavity of the circular opening 436, a positioning guide 437 may travel freely through the guiding space between upper and lower collars of circular opening 436. A position-tracing sheath 445 may engage positioning guide 437. The top of the sheath 445 may comprise a joint 446 to grip 447 in a rectilinear orientation to the sheath 445 and guide strip 437. The orientation of the wrist of the user, relative to the font assembly platform in the movement line of feed direction may be sensed by the relative position of the tracing sheath 445 along the guide strip 437.

One end of the guide strip 437 may comprise a hole 438, which may be rotatably fixed to a pivot of rotation spindle 439. A free end of guide strip 437 may rotates freely in wrist-sensing platform 434. The arc traced by the free end 440 of the guide strip 437 may be tracked by fathoming line 441 having two ends attached at end 440 of the guide strip 437. The fathoming line 441 may pass through guide spindle 442 and quadrature wheel 443. An arc-motion of guide end 440 may be asserted by quadrature wheel 443 and may be measured by quadrature sensor 444. The orientation of the wrist of the user, relative to the font assembly platform in the turning carriage shift direction may be sensed by the relative displacement of the fathoming line 441 traced by sensor 443.

The two directions of wrist motion described above may be measured and asserted by a bottom end of the pylon-position sensing grip 447. The grip 447 is shown in FIG. 4 comprising vertical member 449, which fixes a height at which an end of the vertical member 449 rotatably suspends a stylus fulcrum bracket 414. The height of the fulcrum bracket 414 may be adjusted by loosening locking nut 448 and adjusting the height of the fulcrum bracket 414 to a desired mating position of the vertical member 449 with respect to vertical member 447. The locking nut 448 may be tightened to keep the fulcrum bracket 414 at an adjusted height. The fulcrum bracket 414 may rotate freely around a bearing of the fulcrum bracket 414 that fits over the top of vertical member 449 of the pylon grip 447.

The fulcrum bracket 414 may be attached to a top knuckle clasp 415 of a palm knuckle extension 416 and to a bottom knuckle clasp 417 of the pylon palm clasp. The bottom end of the pylon palm clasp may be attached to a base 418 serving as a wrist rest. The relative position and separation of the ends of the clasp may be assumed adjustable to suit the size, form, left or right-handed-ness of the engaged hand of the user.

The base 418 of the mobile pylon may be connected to wrist-sensing platform 434 by a securing bolt 433, whose extension shaft may be connected directly to the wrist-sensing platform 434. The connection of the bolt 433 of the extension shaft to platform 434 is not shown in FIG. 4. It may be assumed that the connection from the wrist-sensing platform 434 to the pylon base 418 may be designed in such a way that a user may adjust the relative orientation of the forearm of the user with respect to the direction asserted by horizontal member 432 reflecting the orientation of the carriage shift direction.

The orientation of the wrist of the user, with respect to the writing platform 429 may be fixed by wrist harness 420 attached to pylon base 418 by extension 419, for example. The wrist harness 420 may be fitted on one end with hooking fabric 421 on the outside of the harness end engaging hook catching fabric 422 on an inside of an opposing end of the wrist harness 420, such as for example, employing hook and eye fasteners, also referred to as Velcro™ fasteners. Other fasteners may be equally employable without changing the intended function of wrist harness 420 and to hold the orientation of the forearm and clasp in constant disposition relative to the writing font platform 429.

Coordinates of the writer platform, when measured using polar coordinates, may be such that a measured angle theta θ may be relative to a horizontal edge of the platform edge. The edge may also be identified using the Cartesian X-axis and a measured radial position along the guide strip rho ρ providing the following X, Y, ρ, and θ composite readings:

$$x_m = \rho \cos(\theta);$$

$$y_m = \rho \sin(\theta).$$

The depth coordinate measurement may be given by the position of the stylus boom in rectilinear position relative to receptacle position beta A, relative to the font origin, and as specified for the chirographic writer:

$$z_m = \beta$$

A wrist-sense set of coordinate measurements may be obtained from readings of the wrist-sensing platform. However, there are situations to consider with regard to these measurements. One situation may be when the wrist setter measurements are in some way coupled to the font coordinate readings. Another situation may be when the measurements are not coupled to the font coordinate readings. The font position measurements may be coupled to the wrist setter positioning measurements when a carriage or line positioning change is sensed and when a user is only exerting stylus motion, for example. The converse also applies. The stylus position measurements may be coupled to the wrist positioning movements when a stylus motion is asserted and when the intention is a carriage or line position change.

The wrist sense coordinate readings may independently sense the character space and line feed handwriting motions, so the focus may be upon uncoupled wrist coordinate motions.

In the uncoupled context, the coordinates for the carriage position measurement (mc) and the line position measurements (ml) may be given by:

$$x_{mc} = \rho \cos(\theta);$$

$$y_{ml} = \rho \sin(\theta).$$

The actual uncoupling may depend upon a variety of applications of the device in the field. When the font and wrist setter coordinates are coupled, an uncoupling may be determined by a particular in-the-field usage. Without referring directly to any usage, a number of uncoupling means may be suggested and made part of the teachings herein.

In an uncoupled embodiment, readings of the wrist and font measurements may be used directly. The uncoupling may be attained by guaranteeing a separation of the two platform measurements, which may be achieved by not measuring the wrist measurements at the grip, but rather at a position of the wrist rest with respect to the surface engaged.

In one form of coupled font and wrist coordinates, an uncoupling by position component of the wrist positioning platform relative to that of the font platform may be suggested. The uncoupling may be attained by a difference of the relative position of the font and wrist position measurements and may be achieved by a relative dampening of a position dependent attribute such as range or time, in one of the sensors with respect to another.

In another form of the coupled font and wrist coordinates, an uncoupling by velocity component of the wrist positioning platform relative to that of the font platform may be employed. The uncoupling may be attained by a dampening of relative velocity readings of font and wrist position measurements, and may be achieved by a relative dampening of a velocity dependent attribute such as friction, in one of the sensors with respect to another.

In yet another form of the coupled font and wrist coordinates, an uncoupling by acceleration component of the wrist positioning platform relative to that of the font platform may be employed. The uncoupling may be attained by a dampening of relative acceleration between the font and wrist position movement, and may be achieved by a relative dampening of an inertia-dependent attribute such as mass, in one of the sensors with respect to another.

Aspects of the present invention may be found in a spatial character recognition technique adapted to convert text into three-dimensional real-time positional data of a stylus collected by a spatial chirographic sign reader. The use of a stylus to collect chirographic hand strokes may comprise a reverse of a process by which handwriting that has already been committed to a writing medium, such as paper, may be subjected to optical character recognition by using spatial recognition techniques, for example.

The reverse process may be achieved by installing upon a reader a stylus receptacle. The stylus receptacle may comprise a scanning device adapted to capture a copy of pre-written text; so that a valid path of handwriting strokes may be synthesized from the scan of X-Y coordinates of pre-written text, for example.

Aspects of the present invention may be found in converting a stylus receptacle of the spatial chirographic sign reader into receiving a scan for use in spatial character recognition of pre-written chirographic text, for example.

Aspects of the present invention may be found in a method of replacing the writing area of the chirographic reader platform with a small scanning platform guide positioned over the pre-written medium to be scanned. The stylus receptacle of the chirographic reader may also be modified to receive a hand-operated scanner, so that the scan data may be merged into reader spatial coordinates, for example.

Figure 5:
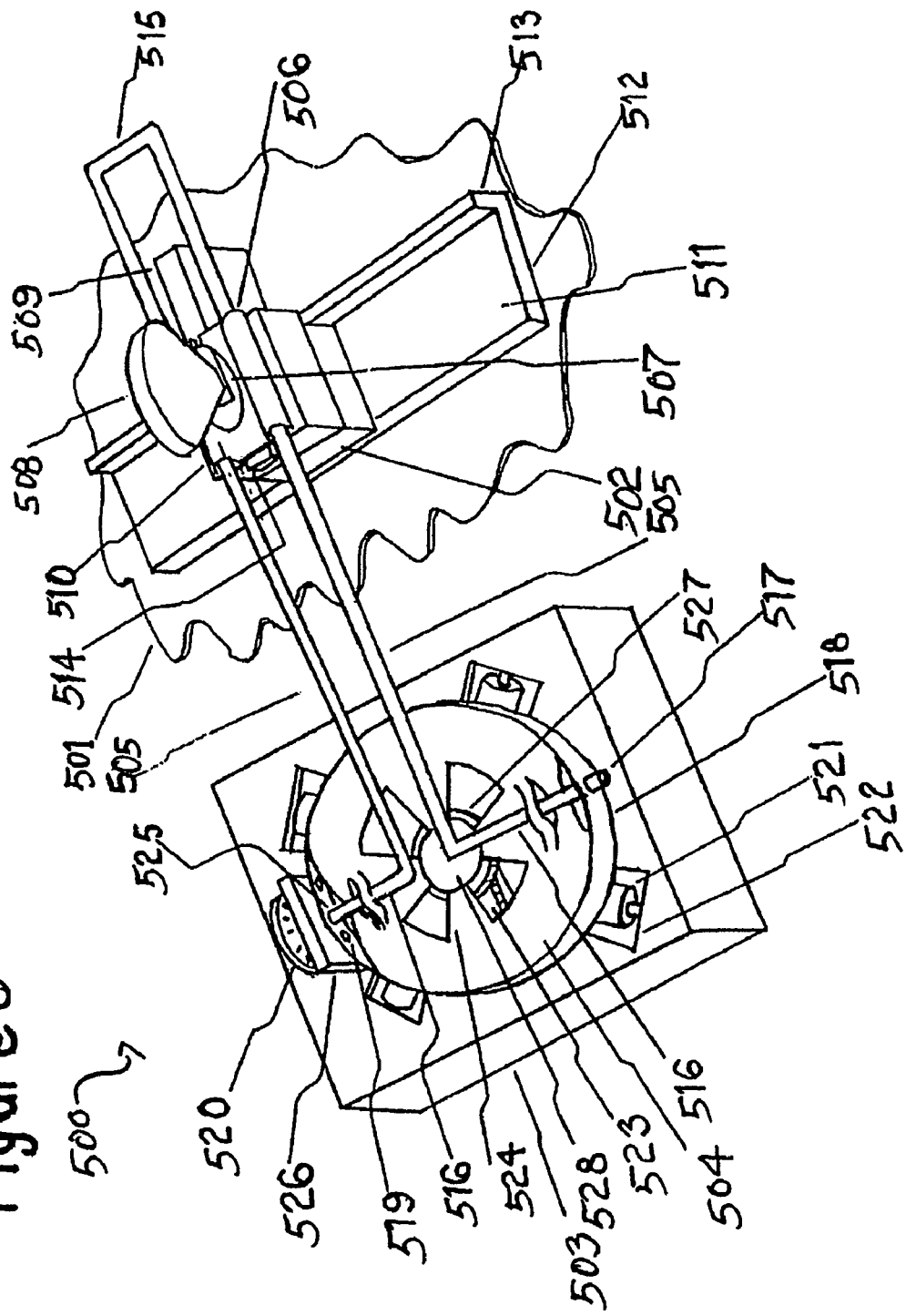
FIG. 5 is a perspective view of a chirographic text character scanner according to an embodiment of the present invention.

FIG. 5 is a perspective view of a chirographic text character scanner 500 according to an embodiment of the present invention. FIG. 5 illustrates a top perspective view of the text character scanner 500 comprising a spatial reader having a boom receptacle modified to attach a scanner.

The reader platform may be modified so that a portion of the writing area may be occupied by a pre-written medium 501 and the remainder of the writing area support platform may be diminished in size into a panning platform 502 supporting a scanning device 510 comprising a scanner head 509. The panning platform 502 may rest upon a line-setting guide 511. The line-setting guide 511 may comprises a horizontal flat section 512 resting upon the pre-written medium 501 and a vertical straight elongated section 513 acting as a line ruler for the writing on medium 501. The vertical section 513 may also act as a positioning guide for scanner head 509 housing a linear array of reflector sensors, for example.

A grip handle 508 may permit a user to manipulate the scanner 510 over the medium 501. A connection of grip handle 508 to scanner body 510 may fit through a receptacle opening 507 of receptacle bracket 506. The receptacle bracket 506 may be slide-ably attached to boom stems 505. The receptacle bracket 506 may also have a scan direction sensor 514 mounted thereupon for detecting an inclination angle between the line ruler 513 and boom stems 505. The two booms 505 may be connected at ends thereof to a bridge section 515.

In an embodiment according to the present invention, the reader support platform 503 may differ from previously disclosed spatial chirographic sign reader embodiments by elimination of a boom support spring that was used in a previously disclosed embodiment to keep the boom stems in an elevated position when not engaged by a stylus. The boom stems 5 according to the embodiment disclosed in FIG. 5 may be unobstructed at respective bases where the boom stems may be bent into minor pinions 516 of a boom fulcrum. The pinions 516 may engage a fulcrum bracket 504, which may also be attached to a support collar 518. The pinions 516 may engage the support collar 518 rotatably through opening 525 and may emerge on another side as pinion ends 717. Only one of a pair the aforementioned items, opening 525 and pinion end 17, are disclosed in FIG. 5, but there exists one for each end of the pinion portion of the two boom stems 505.

The pinion end 517 that is obscured in FIG. 5 may pass through the opening 525 of the support collar 518 and through similar openings in pinion quadrature sensor 526. The pinion end that is obscured from view may also be attached to quadrature wheel 520.

The working surface of the fulcrum support collar 518 may rest upon a roller 521 rotatably attached to a housing well 522 of support platform 503. A fulcrum bracket 504 may also be attached to a major support pinion 528 having flanges 524. A quadrature wheel 527 may be attached to the major support pinion 528 and rotation of pinion 528 may be detected by quadrature sensor 523.

Figure 6:
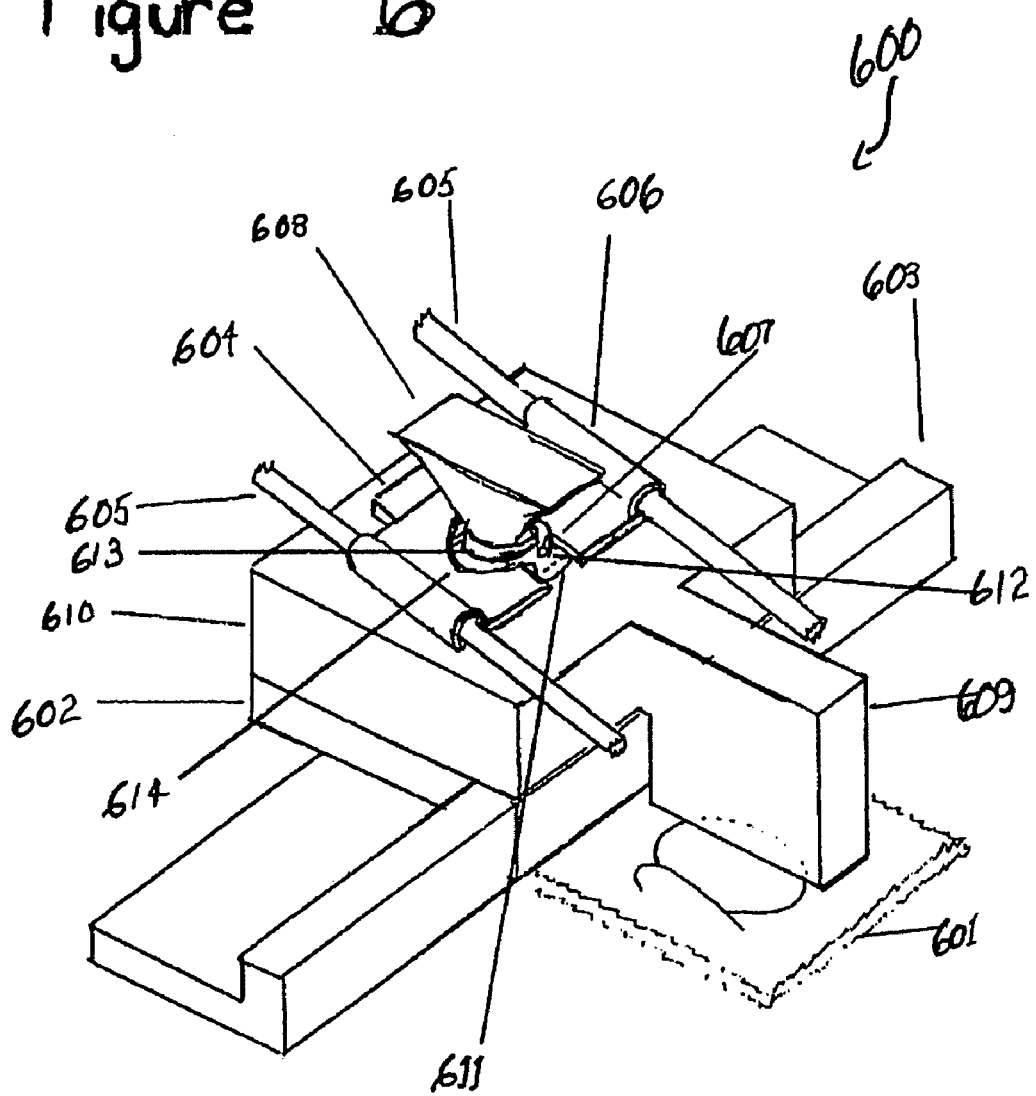
FIG. 6 is a close-up view of a chirographic text character scanner revealing another side of the scanner according to an embodiment of the present invention.

FIG. 6 is a close-up view of a chirographic text character scanner 600 revealing another side of the scanner according to an embodiment of the present invention. FIG. 6 illustrates a close-up of the scanner assembly, as viewed from a free end of reader boom stems 605 reveal scanner head 609 panned over a pre-written character disposed upon a pre-written medium 601. A cut-away section of the pre-written medium 601 reveals a pre-written cursive small Latin letter 'a' partly obscured by scan head 609.

The scan head 609 may be monolithically integrated into the scan device body 610. Connection between the scanner body 610 and the scan head 609 may be contoured to slideably fit around a vertical member of guide rule 603. The bottom of the scan device body 610 may be firmly affixed to the scanner platform 602. At a top of the scan device body 610 a circular well housing a quadrature wheel 611 may be attached to the scan device body 610.

Through a hollow center portion of quadrature wheel 611, grip handle 608 is shown attached to the scan device body 610 by a connecting neck section 613 in FIG. 6. The grip handle 608 may permit a user to mount the scanner assembly onto a receptacle bracket 606 by passing the grip handle 608 through opening 607 of receptacle bracket 606 and sliding the grip handle 608 into circular collar 614. A reciprocating spring latch 612 may be employed to lock connection neck 613 in collar opening 614.

When sliding the scanner assembly along guide rule 603 by holding and moving grip handle 608, the receptacle bracket 606 may slide along the probe boom stems 605, and the receptacle bracket 606 may rotate with an inclination of the boom with respect to guide rule 603. A scan direction sensor 604 may register changes in inclination from a relative rotation of scanner quadrature wheel 611.

The scanner platform 602 may provide a working glide surface when sliding the scanner against a top working surface of a horizontal member of the guide rule 603 and against an inside working surface of a vertical member of the guide rule 603.

Figure 7:
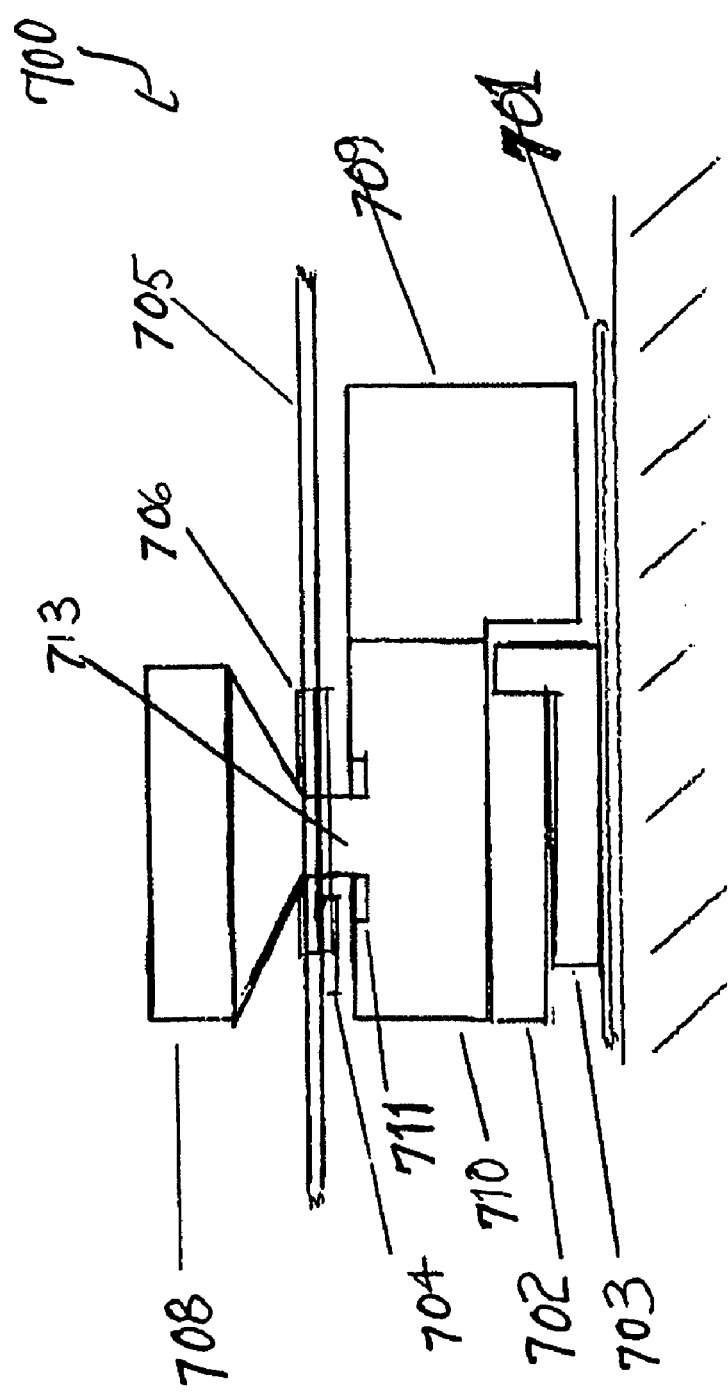
FIG. 7 is a side elevation view of a chirographic text scanner according to an embodiment of the present invention.

FIG. 7 is a side elevation view of a chirographic text scanner 700 according to an embodiment of the present invention. FIG. 7 shows a side elevation view of a scanner assembly parallel to a reader boom 705. A pre-written medium 701 is shown placed on a support surface, such as for example, a tabletop, shown by shading at the bottom of FIG. 7.

Guide rule 703 is shown resting on the pre-written medium 701 in contact with scanner platform 702. The scanner platform 702 is shown connected to the scan device body 710. The top of the scan device body 710 may be connected to grip handle 708 by way of neck connection 713. At a base of neck connection 713, a circular well may accommodate a quadrature wheel 711. A scan head 709 may be attached to the scan device body 710 by a horizontal connection permitting the scan head 709 to fit over a vertical member of guide rule 703.

The side elevation section illustrated in FIG. 7 also reveals a reader boom stem 705 comprising a receptacle bracket 706 engaging the boom stem 705. The bottom of receptacle bracket 706 also reveals a guide direction sensor 704 attached to a bottom face of the receptacle bracket 706 and in close proximity to quadrature wheel 711 to effect sensing of inclination of boom stem 705 with respect to guide rule 703 in a plane of the pre-written medium 1.

Figure 8:
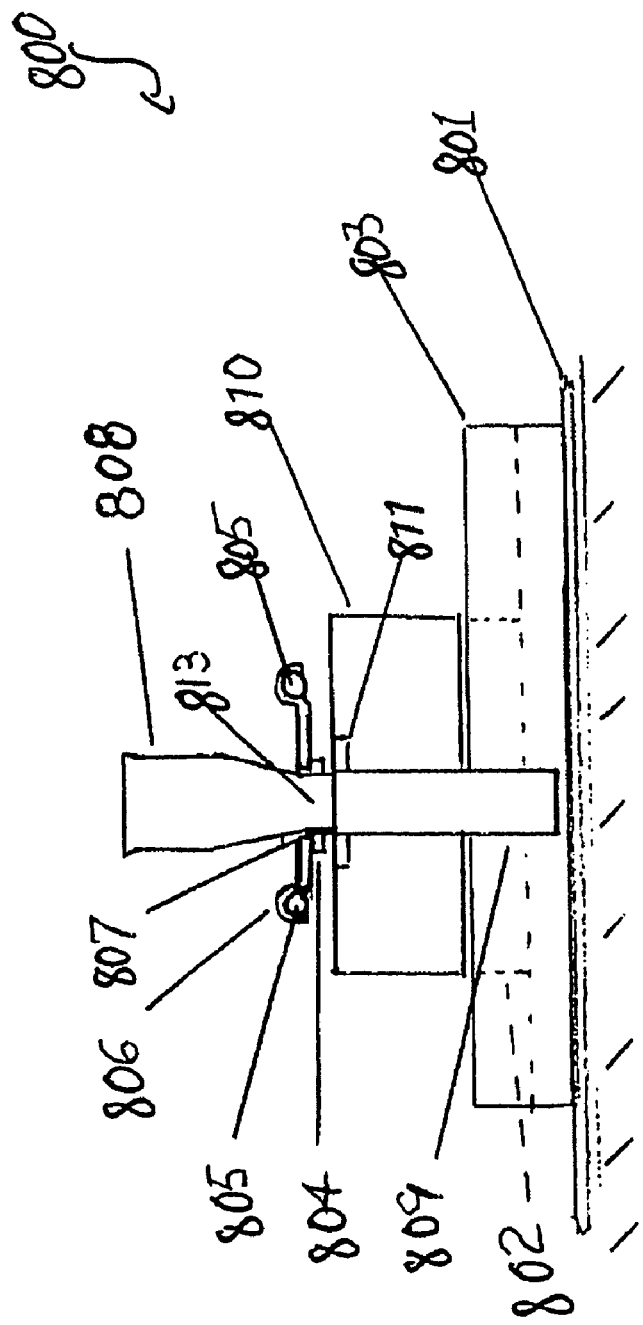
FIG. 8 is a front elevation view of a chirographic text scanner according to an embodiment of the present invention.

FIG. 8 is a front elevation view of a chirographic text scanner 800 according to an embodiment of the present invention. FIG. 8 shows a front elevation view of the scanner assembly and reveals elements similar to those shown in FIG. 7. Scan head 809 now appears in the foreground of FIG. 8 suspended by scan device body 810 over a pre-written medium 801 and resting upon an external surface, such as for example, a tabletop, shown with shading.

FIG. 8 provides a sectional view of boom stems 805 slidably engaged by receptacle bracket 806 and reveals receptacle opening 807 into which grip handle 808, shown in narrow profile, may fit into receptacle bracket 806 via scanner connection neck 813. The connection neck 813 partially obscures a glide direction sensor 804 in the background of FIG. 8. A front face of a vertical member of glide rule 803 fully obscures the scanner platform 802 in FIG. 8. Quadrature wheel 811 may be similar to quadrature wheel 711 disclosed in FIG. 7.

Figure 9:
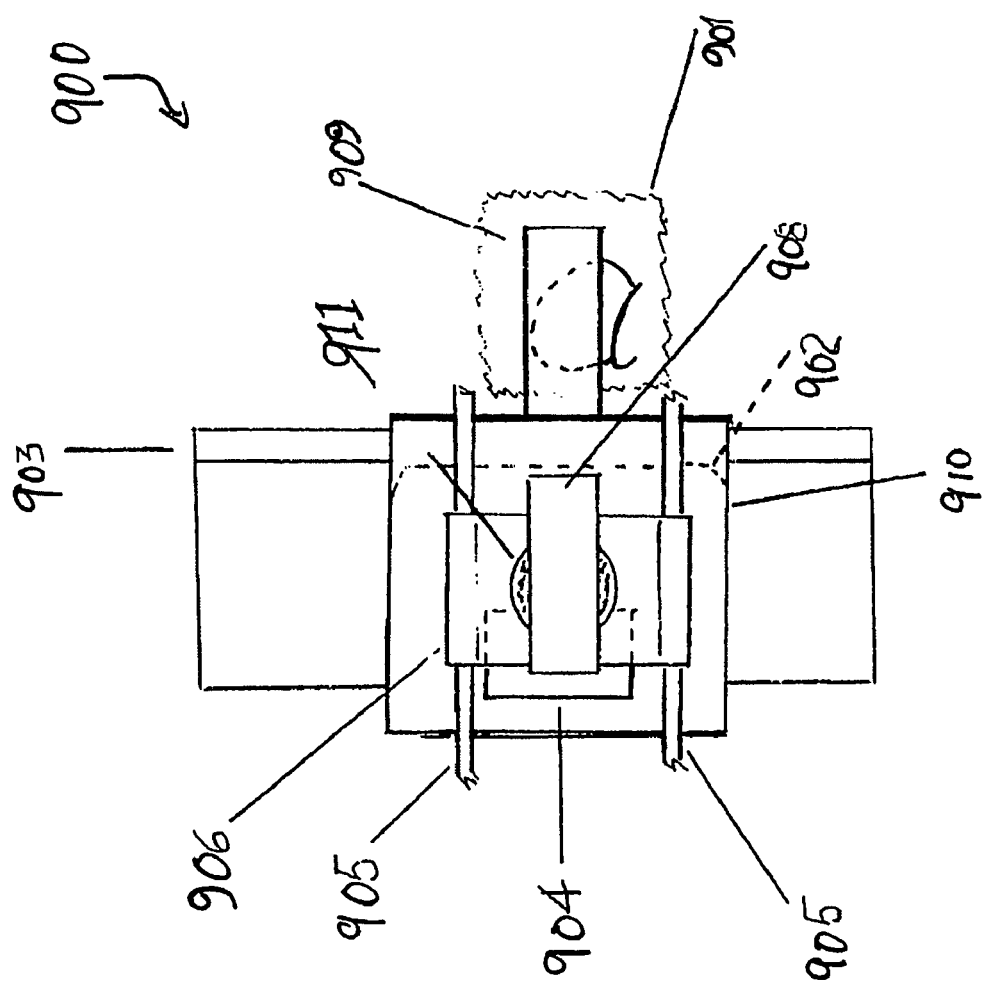
FIG. 9 is a top plan view of a chirographic text scanner according to an embodiment of the present invention.

FIG. 9 is a top plan view of a chirographic text scanner 900 according to an embodiment of the present invention. FIG. 9 shows a top plan view of the scanner assembly and reveals the relative position of some elements of the scanner assembly. The vertical overlap of glide direction sensor 904 over quadrature wheel 911 is illustrated in FIG. 9 and the angle tracked by direction sensor 904 between a line formed by boom stems 905 and guide rule 903.

The relative alignment of glide rule 903, in relation to a character disposed upon a pre-written medium 901 being scanned may be made more apparent by a font frame suggested by cut-away lines of the pre-written medium 901. A visible extension of scan head 909 along a font height direction of a cut-away of pre-written medium 901 illustrates spanning a written portion of a cut-away font frame by a single scan of font scan head 909 along rule guide 903 by moving grip handle 908 in a direction of guide rule 903.

Figure 10:
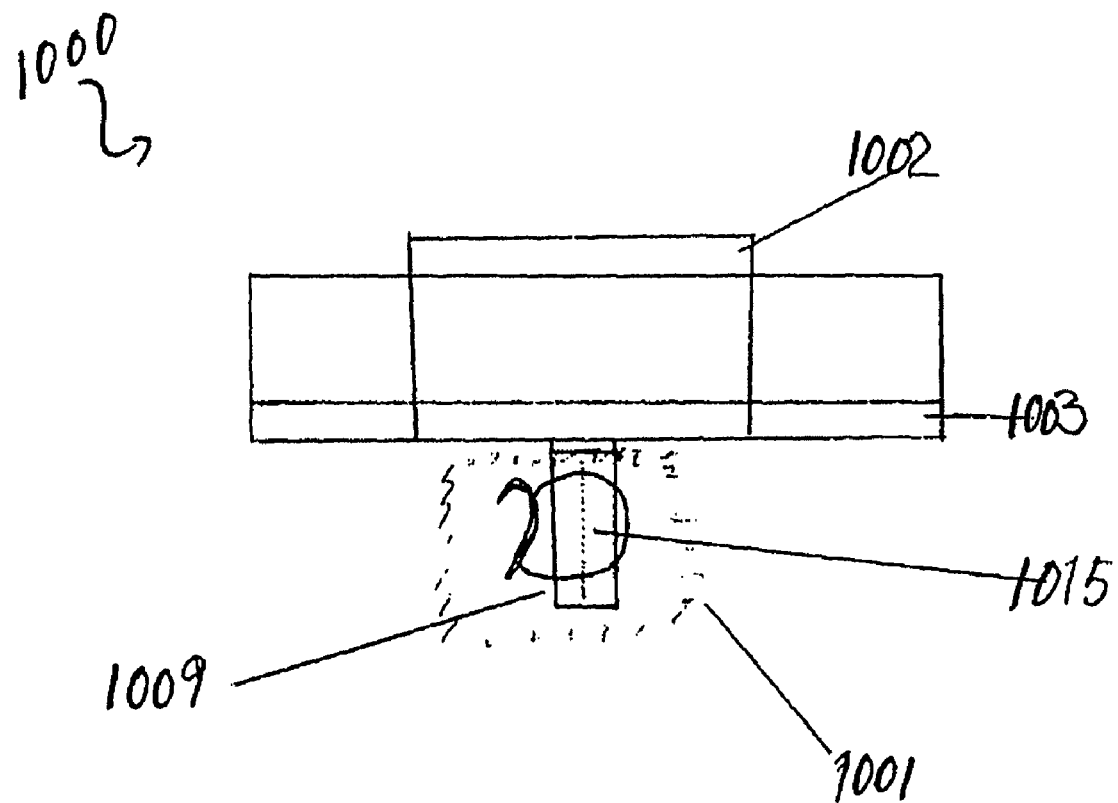
FIG. 10 is a bottom plan view of a chirographic text scanner according to an embodiment of the present invention.

FIG. 10 is a bottom plan view of a chirographic text scanner 1000 according to an embodiment of the present invention. FIG. 10 is a bottom plan view of the scanner assembly illustrating a scan head face and a linear sensor array 1015 molded into the scan head 1009 and being juxtaposed over a cutaway of the pre-written medium 1001. A character being scanned may appear inverted from the underside of the transparent cut-away of pre-written medium 1001.

Figure 11:
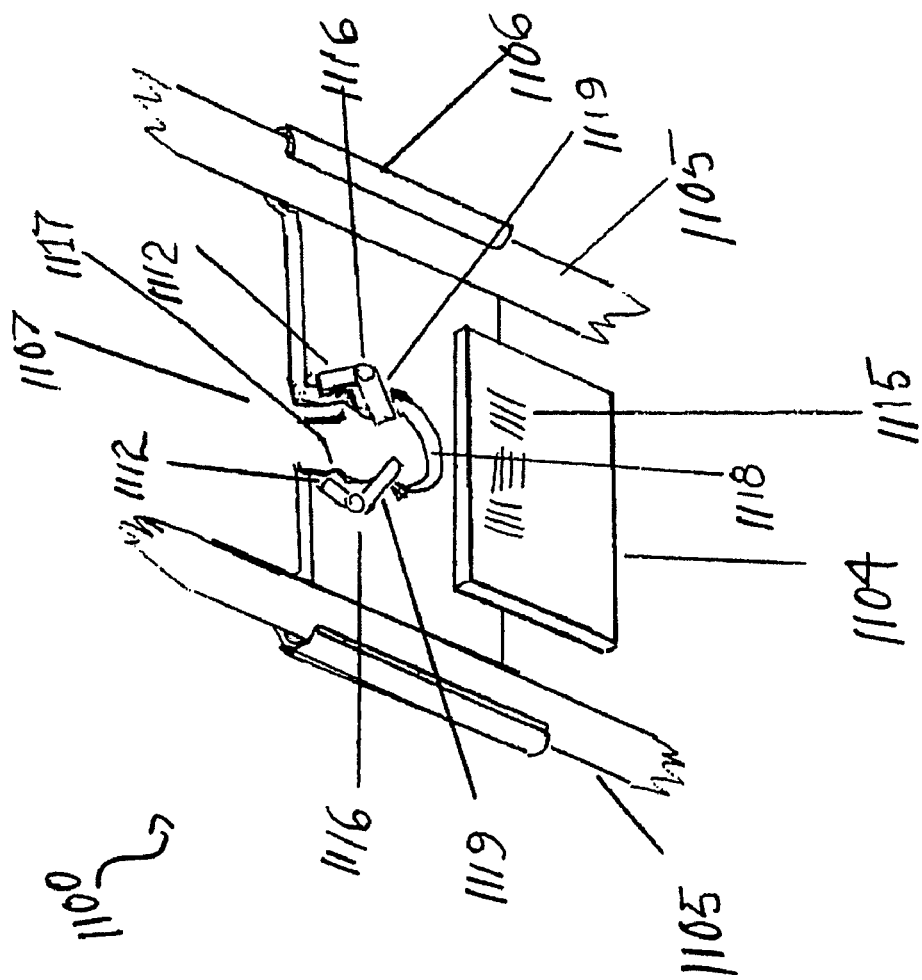
FIG. 11 is a bottom perspective view of a chirographic text reader receptacle bracket according to an embodiment of the present invention.

FIG. 11 is a bottom perspective view 1100 of a chirographic text reader receptacle bracket 1106 according to an embodiment of the present invention. FIG. 11 shows a bottom perspective detail of a modified reader receptacle bracket 1106. The numbering of reference numerals in FIG. 11 may not correspond to the numbering disclosed in the preceding figures. FIG. 11 illustrates a receptacle bracket 1106 that may be associated with a reader boom. The receptacle bracket 1106 may comprise boom stem portions 1105 shown as cut-away portions with boom bases in a downward direction of the cut-away portions and a free end of the boom stem portions in an upward direction.

The receptacle bracket 1106 may slide-ably engage boom stems 1105. The underside of receptacle bracket 1106 is shown partly obscured by a detail of guide direction sensor 1104. A face of sensor 1104 depicts sensor elements 1115 in linear texture.

A middle of receptacle bracket 1106 may comprise a circular collar opening 1118 for a scanner neck connection. The scanner side of receptacle bracket 1106 may comprise a channel opening 1107 through which the scanner neck connection may be inserted when mounting to the reader. On each side of channel opening 1107, a reciprocating collar latch comprising two arms may be fixed at a fixed angle. The arms may comprise a first opening arm 1112 and a second closing arm 1119. The two arms may meet on a pivot pin 1116 mounted upon receptacle bracket 1106.

The angle at which the arms are fixed may cause the arms 1112 to clasp, whenever the arms 1112 and 1119 are pushed past the collar 1118 opening by the scanner neck connection. Retracting the scanner neck may reverse the movement of arms 1112 and 1119 as the scanner is disengaged from the receptacle bracket 1106 along channel opening 1107. The underside edges of channel opening 1107 have on each side of the channel opening 1107 a humped but smooth obstruction 1117 that keeps the arms 1112 and 1119 locked in place in either an open or a closed position.

Aspects of the present invention may be found in a method of synthesizing a stylus path of an original writing and selecting a frame of focus, wherein the frame of focus may be an approximation of a font frame of a character to be recognized. In an embodiment according to the present invention, shifting the frame of focus in the carriage direction or in the line feed direction may permit the character recognition operation to proceed from character frame to character frame until an entire pre-written medium is been scanned.

Aspects of the present invention may also be found in scanning a pre-written page. An area of focus may coincide with a font coordinate frame for a writing to be scanned. A step in a spatial optical recognition method may be to determine a principal vertical and horizontal frame width.

A vertical frame height may be extracted from a written page by a measure of the vertical distance between written and unwritten portions of the page as the scanner-mounted reader traverses the page vertically by aligning a guide rule vertically over a pre-written medium and collecting positions where the span of the scanner indicates blank space. The vertical frame height may be assessed by subtracting the width of the blank space between written portions of each line.

Whereas a similar procedure may be used to extract a representative horizontal frame width by measuring recurring vertical blank space along a written line. The horizontal frame width may be determined character by character as the character scanning proceeds.

Once a principal frame has been determined, synthesizing a stylus path may begin by focusing on a first frame position of a first pre-written line suggested by a direction of the writing system.

Because the scan may proceed from one side of the font frame to the other, it may be assumed to begin a search from outside and to proceed inwardly toward a forward carriage direction. For a scanner head in use, an initial scanner point position may be the zero line point suggested by the writing system. In a Latin alphabet writing system, the zero point position may be at a top left corner of the first font frame on the first line of the page.

The initial position may comprise at least one blank scan width. Because the zero point position may fall on a blank horizontal and vertical line centered thereon, the method may comprise assigning radius zero and torsion zero at the zero point and an initial radius to the to-be-synthesized rotational path segment.

In an embodiment according to the present invention, the method may comprise advancing the scanner by a minimal step size along a forward carriage direction and incrementing an X-axis scan coordinate. Recognizing that in operating the scanner manually, a human user may not be able to detect and advance the scanner by a minimal step size, the system may be adapted to overcome human limitations by continually sampling a linear array of the scanner and by registering readings at each discernible shift of the carriage position as detected by the reader sensors.

In an embodiment according to the present invention, the method may comprise identifying a first positioning from identification of a first ink spot, for example, at a scanner dot position when a dot pitch of the scanner is within one order of magnitude of the ink spot diameter and when the span of the scan head sensor array exceeds the ink dot diameter by an order of magnitude.

A situation may arise where dot positions of the scanner head may be more than one order of magnitude smaller in size than a pen width of pre-written image markings. Another situation may arise where a vertical Y-font axis span of a scanner head dot sensor array may be less than the pen width of the pre-written markings. Under either of these situations, there may be contiguous ink dots in all minimum dot step directions.

In response to the above-named situations, the method may comprise changing scan heads so that a scanner dot pitch is within an order of magnitude of pen width and the span of the linear scan head sensor array exceeds the ink dot diameter by an order of magnitude.

In response to the above-named situations, the method may comprise changing the scan head characteristics. Because the dot density may be overly high for the point size of the pre-written markings, an adjustment may be made to lower the dot array density by skipping a regularly spaced proportion of sensor dots of the array to accelerate the pace of the scan dot step. The scan procedure may be adapted to compensate for an overly dense dot pitch.

Conversely, if the vertical Y-font axis span of the scanner head dot sensor array is less than the pen width of the pre-written markings, then the scan head trajectory may be modified to vertically scan multiple array spans to vertically exceed the pen width by an order of magnitude, while also performing a reduction of dot pitch.

Aspects of the present invention may be found in a spatial chirographic recognition technique that explains how a first handwriting stroke may be determined when placing a zero radius reference position at a center of a writing volume. In the case of scanning, the center of the writing volume may be discovered later or last. The scan may be free to select an initial inferred stylus position, wherein the first handwriting stroke may, by convention, be begun at the zero point of the first font frame.

In an embodiment according to the present invention, the reference stylus vector may be set to point in the positive Z-axis direction with radius length unity. A first inking mark may be determined, by scanning the volume, one step at a time, and by inspecting scanner signals for a detected ink mark. To consistently decide a first mark, the method may comprise starting each scanner inspection from the zero dot position to the last dot position along a positive line direction.

In an embodiment according to the present invention, upon encounter a first ink dot a spatial recognition technique may be used, wherein the X-Y coordinates of the ink dot position may be set as a first ink point. Rotation of a radius-one impulse vector from the Z-axis direction toward the first ink point may be determined based upon the location of the point on the font frame.

Positioning the first ink dot from a scanner zero point to a first ink point may be performed. If the first ink dot is isolated, then the positioning may be effected immediately. But that condition may not be determined and known until the scanner fails to find a contiguous ink spot after scanning the next scan carriage step.

Before asserting the direction of positioning of the first ink dot, the direction of an inked path may be determined. A second contiguous ink position may also be determined. At least three following possibilities may immediately arise:
1. There may be another contiguous ink dot in a current scan position.
2. There may be no other ink dot in a current scan position.
3. There may be another ink dot, non-contiguous with the first ink dot in a current scan position.

Considering situation 1 above, wherein a second contiguous ink spot may be found, the ink path direction may be close to a direction of a scan head linear array. Upon determining that a second contiguous ink spot may is found may permit setting of a first positioning path. A direction from an initial point to the first ink dot may be collinear with a path from a first to a second ink dot. In an embodiment according to the present invention, the first positioning path may be established by:
1. Altering a radius of a unit reference vector to half the distance to the first ink dot.
2. Translating the base of a reference sphere to the mid-point between the zero initial point and the first ink dot.
3. Setting a head of a modified reference vector to a small positive Z-axis location out of ink.
4. Rotating the modified (enlarged) vector by $\pi$ radians so that the head of the vector reaches the first ink spot at a small negative Z-axis.

Considering situation 2 above. When there is a single ink spot in a linear array, advance the scanner one step to find a contiguous spot. The second ink spot may be found in a vicinity of the first.

If no contiguous ink spot is found, then the preceding ink spot may be isolated. If the ink spot is the first ink spot of the scan, then an initial positioning to the ink spot may be confirmed to be valid and the procedure for setting a first positioning path described above regarding situation 1 may be effected immediately.

Regarding contiguous ink spots, the method may comprise proceeding in a similar manner as set forth above for situations 1 and 2, wherein contiguous ink spots may be found within minimal X and/or Y scan step directions, until no additional ink spots are found. Select the last ink spot found and locate the mid-point of a contiguous ink segment by finding the Mean of the X and Y coordinates, respectively, of the first and last ink spots. Translate the foot of the reference vector from the first positioning path center of curvature to the mid-point of the first inking segment. Continuing with the head slightly within ink from the last positioning rotation, translate the vector through $\pi$ radians to bring the vector head slightly out of ink at the last inking spot.

A second ink spot may be in a non-contiguous dot position of the same scan position. The ink spot may be in competition with the first ink spot, and may be designated second because of a convention of enumerating dot positions from the zero point scanner dot side. There is no physical reason to consider this initial point as differing from, or subsequent to the other, as far as treatment to recognition is concerned. Therefore, as the search for contiguous ink spots of the first of the ink spot begins, a similar but distinct search for the second one may also begin.

The preceding discussion illustrates a bifurcation of inking paths as the scanner traverses the font frame in one sweep. Other bifurcations may arise out of an initial ink spot. The same argument may hold and the procedure may be to add yet another search for a second bifurcation path.

Geometry may be employed to indicate paths that are near to the linear array direction, which may locate opposite ends of the path. A method for the travel of the foot of the reference vector may be to move the vector from the pivot point of a previous positioning path to the mid-point of a currently recognized line segment.

Unfortunately, the starting point of a recognized line segment may or may not match the first ink spot. Earliest path completion criteria may supersede nearest ink spot criteria. Initial positioning may be redone to position the reference vector from the scan zero point to the starting point of a first recognized line segment. An initial positioning to a first recognized isolated ink spot may satisfy the criteria, as noted in the linear situation 2 set forth above.

Changing the initial positioning to a first recognized inking path may comprise setting the first positioning path as follows:
5. Setting the radius of the unit reference vector to half the distance from the scan zero point to the starting ink spot of a first recognized line segment.
6. Translating a foot of a reference sphere to the mid-point between the zero initial point and the starting ink spot of the first recognized line segment.
7. Setting a head of the modified reference vector to a small positive Z-axis location out of ink.
8. Rotating the enlarged modified vector by $\pi$ radians so that the head of the vector reaches the first ink spot at a small negative Z-axis.

Segments that are recognized later may be traveled to the center of curvature of the previous positioning. The previous rotation of $\pi$ radians may bring the head of the reference vector from an out-of-ink depth at the previously recognized segment, to a slightly in-the-ink depth at the first ink spot of a next recognized segment.

Having rotated the reference vector head into ink from the previous inking path or from an initial positioning path, the foot of the reference vector may be moved to the center of curvature of the most recently identified path segment. The inking path may be traced by a rotation of $\pi$ radians from a slightly in-the-ink depth at the first ink spot of the current line to a slightly out-of-ink depth at the last ink spot of the current ink path.

Identification of curved inking paths may comprise similarities in the manner of handling bifurcation. Because the scanning direction is linear and the scan head sensor array is also linear, any curved path may foster a bifurcation.

Additionally, when handling an apparent bifurcation of an inking path, it may be discovered whether the bifurcating branches are rectilinear or whether they are a continuation of the same curve or curvature. Identification of all inking paths may be employed to establish whether the contiguous points successively follow one rectilinear direction or curve with some constant curvature.

Three consecutive ink spots may be employed to identify rectilinear segments exhibiting an X-to-Y gradient ratio Q, which may be partitioned in two so that only values Q-values between 0 and 1 may be used in X-Y ratios for straight lines in one partition of the font frame, and in Y-X ratios in a complementary partition.

Four consecutive ink spots may be employed to approximate circular paths by their curvature. Circular paths may bifurcate. Bifurcated branches may merge by sharing a final contiguous ink spot. The center of curvature may be determined by one of the following:

a) A midpoint between a common bifurcation and merge ink spots.
b) Derivation of the radius from successive approximations of curvature
c) Use of three non-collinear path points of greater reliability to solve for the center of curvature of the path.

Four non-collinear path points of greater reliability may be employed to solve for an ellipsoidal curve having principal axes aligned with the font frame.

Five non-collinear path points of greater reliability may be employed to solve for an ellipsoidal curve with principal axes not aligned with the font frame.

Another consideration for multiple bifurcated inking paths is that when there is a choice of combinations to track together, the pair that preserves either a common linearity parameter or common curvature parameter may be chosen over any other criteria. Conversely, multiple merged path segments may produce a parametric orphan segment having no counterpart after the merge. Such a former ink path segment may effectively end in the ink and may be treated like any other completed path segment.

A similar situation may apply for solitary path segments undergoing a torsional disturbance. No merge or bifurcation may be involved, nor does an inking have to end. An example is a linear path with a deflection that changes the Q-ratio with a torsional twist action. The line may not come out of ink. Each linear trace before and after such changes may be distinct path segments and may be treated as described with respect to disjoint line segments with modifications to account for a common end-point. Such paths ending in the ink and continued in the ink may be treated like any other completed path segment, for example.

Segments that are recognized within ink may be considered to have traveled from the center of curvature of a previous inking. A previous $\pi/2$ radian rotation of the reference vector may be employed to identify a same in-the-ink reference vector head location and the ending of a previous segment and the starting of a next segment. One change between the two may be torsional twist rotating the foot of the reference vector to a new center of curvature as the vector head remains stationary and the Q-ratio is changed.

Conversely, a previous $\pi$ radian rotation of the reference vector may be employed to identify the end of a previous path segment and the start of a next segment, where the end point is at zero ink depth.

Another change for an identified curved path may be that if the path is circular, then the inking rotation may be done around the Z-axis at some inking depth of the X-Y plane.

As long as there are ink spots which are not isolated, and whose contiguous neighbors are not exhausted, the scan may proceed until there are no more contiguous ink spots and there are no ink spots at the current scan head position.

Aspects of the present invention may be found in indicating the end of a font frame scan and establishing a font character width in addition to an initial font character height by connecting remaining isolated ink spots with a different path construction pattern. Because the isolated dots have no extended ink path segments, the inking may be done by an inversion according to the distance from the current rotation vector head and by having sorted the dots by distance and considering the nearest one.

The method may also comprise translating the foot of the rotation vector of a last recognized path segment to the first isolated ink spots. The method may also comprise rectifying the head of the vector over the nearest ink spot by a rotation of $\pi/2$ radians. The method may also comprise inverting the head of the rotation vector to assert that ink spot and return the vector head slightly out of ink by an annihilation of the inking impulse vector. The head and foot of the rotation vector may almost be coincident at the first nearest isolated ink spot.

The method may also comprise selecting the next nearest isolated ink spot. The method may also comprise repeating the translation of the foot from one to another isolated ink spot, followed by rectification by $\pi/2$ radians, and inversion and annihilation until all the isolated ink spots are exhausted.

The method may also comprise following a path to isolated ink spots by positioning rotations of $\pi$ radians from a small ink depth of one isolated spot to the next while the foot of the reference vector stops between end-points. Each such rotation step may be followed by an inversion of a shallow depth before beginning the positioning for the next isolated ink spot, or by annihilation to zero ink depth at the last isolated ink spot.

The method may also comprise arranging a final positioning path from the last isolated ink spot to an apparent center of an identified font frame and proceeding to record a final rotation to the center terminating with annihilation of the rotation vector at the center of the font face.

The dimensions of the font frame may be determined and the reference vector rooted at the center of the font face. The method may also comprise merging the dimensions of the movements of the reference vector derived from the scan to the dimension of the font coordinate system.

The method may also comprise casting the rotational movements of the reference vector to a reference rotational sphere, wherein the minimal reference sphere may cover the font frame and have a radius given by the Pythagorean length of the font frame sides, for example.

The foregoing scan-derived dimensions ascribed to the reference vector may be scaled to a reference-osculating sphere. Any rotations not centered at the center of the font face may be scaled by the cosine of the inverse latitude of the offset, for example. If the rotations do not coincide in latitude from the parallel great circle, then a segmentation of the principal font frame coordinates may be required to describe the path. The segmentation may either attenuate or magnify the radius of the reference sphere. Such changes may qualify for recording as radial torsion impulses from the inferred rotation sphere. Scaling the scanned reference vector rotation paths in this manner may effectively map the paths to an Eulerian topological ball for classification homotopy. In other words, scaling makes the transformed stylus path amenable to spatial identification up to topological uniqueness, for example.

Another phase of spatial reconstruction of a stylus path may be categorization of identified path segments, with respect to principal font axes, in order to develop a single reference sphere for inferred rotations of the stylus. This may be accomplished by accounting for the following considerations while traversing the identified rotation paths in reverse from the center of the font frame, in addition to the aforementioned scaling.

At each step of the process, reassess the order of visiting each orbit according to the proximity of neighboring orbits compared to the original, and according to the degree of torsional contortions needed to achieve a change of orbit. If a further orbit is reached with fewer twists and curvature changes, then the further one may be effectively closer on the standpoint of the minimal action criterion.

The method may also comprise identifying inking positions that lie on the principal axes, principal diagonals, and along edges of the principal frame. The method may also comprise adjusting the span of each such line, and registering a semi-circular inking arc. End-points terminating at a mid-point of the principal axis may be identified by a quarter-circular inking arc and by an inversion at the termination point that lies mid-way across the principal frame. If any of the segments identified with half-circle rotations now emerge to be a quarter-circle, then the path may be altered to adhere to the convention of the technique.

Similarly, distinct segments that share collinear endpoints may be recast as quarter-rotations if positioning ligatures between segments get simplified under quarter-rotations.

Radii of rotation may be assigned and the inking segments may be connected by positioning paths above the presumed writing surface, each end-point may be visited a number of times and minimal torsional adjustments may be made between inking segments.

Shorter line segments may be identified with a partition of the principal frame by a ratio of the length of the short segment to the width of the principal segment. A radius of curvature may be attenuated before connecting the line segments. Radial torsion impulses may be recorded for attenuations of the radius of curvature.

Curved line segments may require that the arc be followed by a limit-point search until a center of curvature is determined, and until the end-points of the arc are also determined. Once the center of curvature is determined, then a partition of the principal frame may be made to coincide with the ellipsoid of revolution of the arc and a setting of end-points in the rotated frame of the bounding ellipsoid may be registered.

If the arc is circular, then the offset from the center and attenuation of the curvature, if relevant, may be recorded. If the handwriting is cursive, a ligature inking may be associated with the shift from the first to second principal frame position. Each ellipsoidal character handwriting stroke may be associated with a partition of the principal font coordinates into secondary or tertiary frame segments. The change to partition coordinates by rotation and translation of principal coordinates may restore the usability of the identification instructions for straight line and circular segments in the identification of cursive lettering.

When all inking segments falling within the principal frame have been revisited and re-scaled, a path of a stylus may be synthesized with the scanned paths for archiving or comparison to other text samples. Effecting character recognition though, no further manipulation of derived spatial rotations may be required. A comparison to a standard set of inking rotations may however, be required.

Aspects of the present invention may be found in a spatial character recognition technique adapted to converts to text, three-dimensional real-time positional data of a stylus collected by a spatial chirographic sign reader. A chirographic text character scanner may be adapted to convert pre-written handwriting into spatial data for text recognition. The converse of the scan process is a rendering process for converting position data into glyph images of handwriting for display and/or for printing.

Aspects of the present invention maybe found in a rendering method for marking an output medium with glyph images made by spatial position data of a stylus tip.

Aspects of the present invention may be found in reversing the process of the spatial character recognition technique, to convert data acquired by a spatial reader device into glyph images on a raster medium of a display or a printing device. The rendering method may also accommodate displaying and/or printing data previously transformed into a form more suitable for text recognition.

Figure 12:
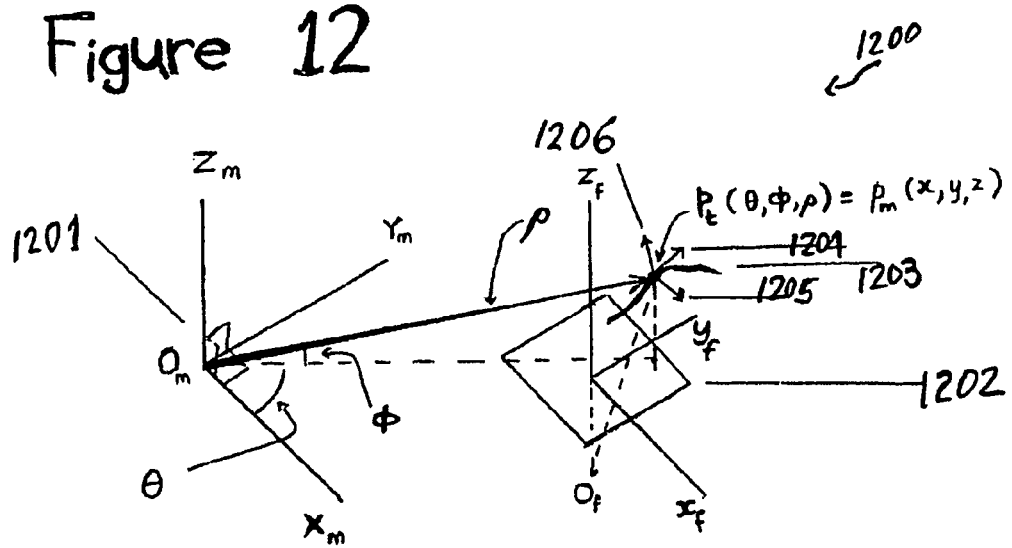
FIG. 12 is a top perspective schematic view of measurement coordinates of a spatial chirographic device according to an embodiment of the present invention.

FIG. 12 is a top perspective schematic view of measurement coordinates of a spatial chirographic device according to an embodiment of the present invention. FIG. 12 illustrates a top perspective schematic view of measurement coordinates of a spatial chirographic device showing the frame of the target typeface coordinates superimposed upon the same diagram. The measurement coordinates 1201, are shown on the left half of FIG. 12 and a typeface frame 1202 is shown on the right half of FIG. 12. A path segment 1203 of the stylus tip is depicted above the typeface frame 1202.

An origin $O_m$ of measurement coordinates 1201 marks the base of a radial vector $\rho$, pointing to a point $p_t$ along the stylus path. The vector $\rho$ corresponds to the boom extension to the stylus receptacle of a chirographic reader device. The vector $\rho$ forms measurement latitude angle $\phi$ of elevation from the horizontal plane and polar coordinate angle $\theta$ in the horizontal plane.

A natural coordinate map for spherical curves with font and stereographic projections may comprise a spherical coordinate system, and although the present invention may be viewed as an enhancement of X-Y digitizing devices employing the Cartesian Z-dimension, an embodiment of the present invention may use a geometrically distinct viewpoint and a preferred spherical coordinate system $\{\theta, \phi, \rho\}$ with $\theta$ representing the longitudinal angle, $\phi$ representing the inverse latitude, and $\rho$ representing the radial distance from the center of the projective sphere.

The change of measurement coordinates from spherical coordinates to rectilinear Cartesian coordinates may be given by the following transformations:

$x_m = \rho \cos(\phi)\cos(\theta)$;

$y_m = \rho \cos(\phi)\sin(\theta)$; and $z_m = \rho \sin(\phi)$.

The transformations guarantee that a point $p_t$ $(\theta, \phi, \rho)$, given in spherical coordinates, is identical to point $p_m$ (x, y, z), given in Cartesian coordinates, in the writing volume. The Cartesian axes $X_m$, $Y_m$, and $Z_m$ are also shown in FIG. 12 centered at the same measurement origin $O_m$ as set firth for the reader device.

The font frame coordinates marked $x_f$, $y_f$, and $z_f$ in FIG. 12 may be centered at the font origin $O_f$, which may be located below the typeface frame. The font frame coordinates may easily be derived from the measurement coordinates when the dimensions of the reader are given, as follows.

Assuming a font frame width 2w and a separation distance 2w between measurement origin $O_m$ and font origin $O_f$, the font frame coordinates may be given by:

$x_f = x_m - 2w$;

$z_f = z_m - 1$; and $y_f = y_m$

The preceding results hold providing that the font face and measurement coordinates share coincident X-axes and the font origin is at unit distance below the platform surface.

FIG. 12 also illustrates moving unit speed frame coordinates of the stylus path. The first coordinate is illustrated in FIG. 12 by a unit Tangent vector 1204 rooted at path position $p_t$, and the vector 1204 pointing in the direction of the stylus path. A second coordinate of the moving frame may be unit Normal vector 1205 rooted at the path position $p_t$, and pointing towards the center of curvature of the path. The final coordinate of the moving frame may be the Binormal vector 1206 pointing in the deflection direction of the Normal vector. The moving frame coordinates may trace the unit speed parameterization of the locus of $p_t$, and may be given by the arc vector s=(T, N, B), where T, N, and B, are the Tangent, Normal, and Binormal vectors respectively. Whenever the stylus path follows rotation in the plane, the Binormal component is zero and the Binormal vector is parallel to the polar axis of the curve corresponding to a rotation axis.

Figure 13:
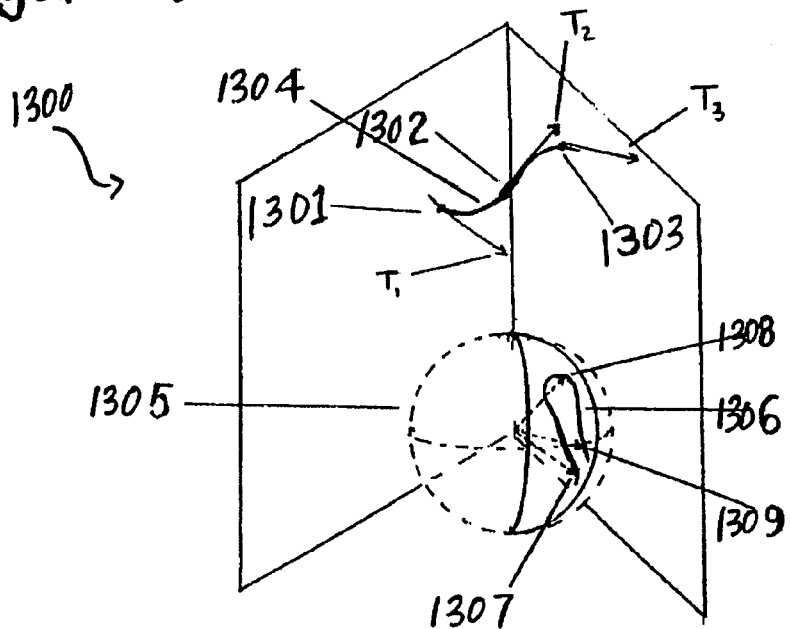
FIG. 13 is a schematic view of a projection of a stylus path onto a reference sphere revealing a locus of a tangent indicatrix of the stylus path on the sphere according to an embodiment of the present invention.

FIG. 13 is a schematic view of a projection of a stylus path onto a reference sphere revealing a locus of a tangent indicatrix of the stylus path on the sphere according to an embodiment of the present invention. FIG. 13 shows in detail three points labeled 1301, 1302, and 1303 of the stylus path 1304. FIG. 13 also depicts the projection of the unit speed curve 1304 onto a unit indicatrix sphere 1305. The indicatrix sphere 1305 may be formed by a parallel translation to the sphere of the unit speed vectors T, N, and B, labeled 1304, 1305, and 1306 in FIG. 13, such that the bases are rooted at the center of the indicatrix sphere 1305. The projection of the tangent indicatrix of the path 1304 is shown as path 1306 in FIG. 13. An indicatrix curve may comprise the head of each vector after the foot of each vector has been parallel translated to the center of the indicatrix sphere. The unit tangent vectors $T_1$, $T_2$, and $T_3$, may be rooted at path points 1301, 1302, and 1303 and may be translated to the indicatrix sphere 1305 to reveal the tangent indicatrix path points 1307, 1308, and 1309, respectively, of tangent indicatrix curve 1306.

Figure 14:
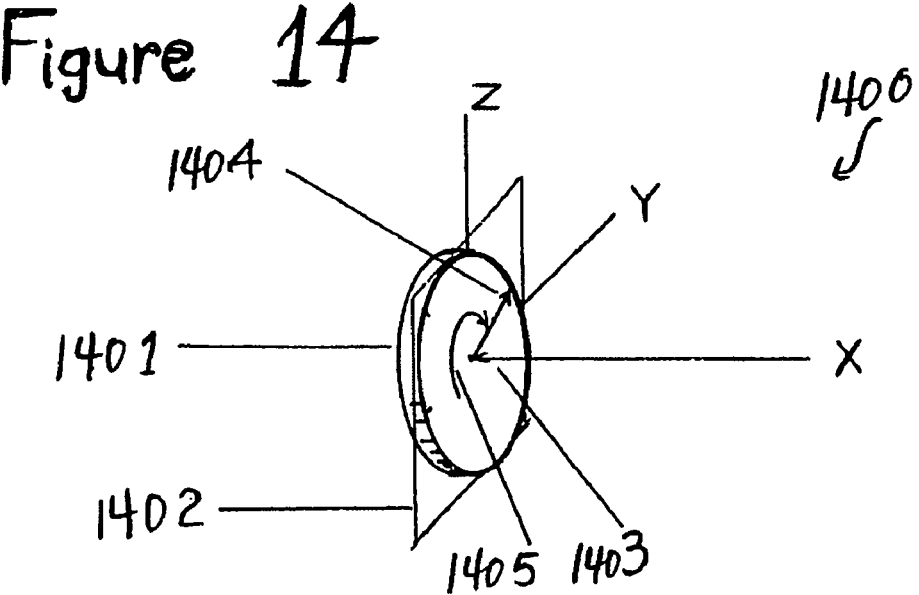
FIG. 14 is a schematic perspective view of a principal component of angular momentum represented by rotation of a disk in one of the principal axes of a writing volume according to an embodiment of the present invention.

FIG. 14 is a schematic perspective view of a principal component of angular momentum represented by rotation of a disk 1401 in one of the principal axes of a writing volume according to an embodiment of the present invention. FIG. 14 illustrates that the axis of rotation is the font X-axis. The disk therefore rotates in the Z-Y plane 1402 in FIG. 14.

The rotation may be associated with angular momentum, which may be represented by vector 1403 aligned to the axis of rotation, pointing toward the disk, and oriented so that a clockwise rotation of the indicatrix vector 1404 when facing the disk in the direction of vector 1403 may corresponds to positive angular momentum. The angle of rotation 1405 may be measured by the angular displacement of indicatrix vector 1404. The radial span of rotation may be altered by, scaling the length of the indicatrix vector 1404.

Figure 15:
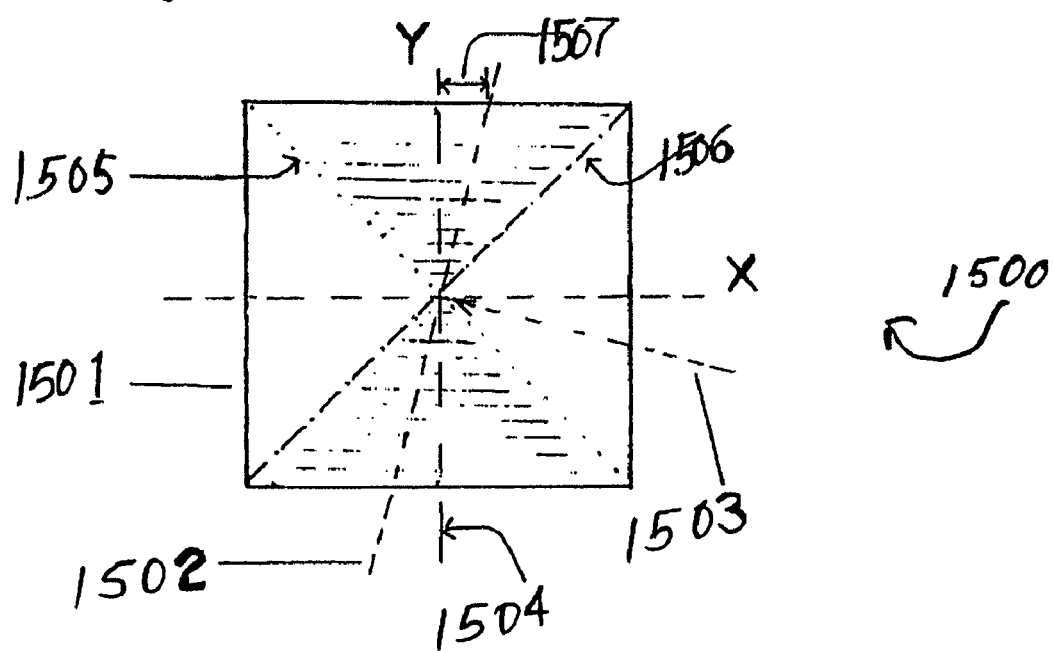
FIG. 15 is a schematic plan view of a distribution of components of angular momentum when an orientation is deflected from the principal axes according to an embodiment of the present invention.

FIG. 15 is a schematic plan view of a distribution of components of angular momentum when an orientation is deflected from the principal axes according to an embodiment of the present invention. FIG. 15 shows the distribution of components of angular momentum when the rotation is deflected from the principal axes of the writing volume. The writing volume may be indicated by a projection upon the font frame 1501. The distribution of angular momentum components shown in FIG. 15, assumes that the deflection is relative to the X-axis, so that the plane of rotation 1502, and the momentum vector 1503 are deflected at an angle relative to the principal Z-Y plane 1504 and the principal X-axis, respectively. The contribution to angular momentum vector 1503 from principal component Y relative to principal component X may be given by the Q-ratio of inclination. The Q-ratio may be given by, the tangent of the angle of deflection. For the unit indicatrix vector pointing in the positive Y-direction, the Q-ratio may be given by, the length of intersection line segment 1507 parallel to the X-axis.

The reciprocal of the Q-ratio may define the same rotation plane deflection, but relative to the Y-axis angular momentum vector instead. Either ratio suffices, except at the maximal deflection, when the reference contribution is zero, and the Q-ratio is undefined. To map all possible inclinations one may select one reference component axis for all defined ratios, and add the orthogonal component as the "ratio at infinity". But the distribution of charts is asymmetric. One embodiment may comprise partitioning the Q-ratio charts equally around the reference principal plane to avoid overlap by excluding one end-point in the range.

A symmetric partition of Q-ratio charts is illustrated by, the shading of the typeface area in FIG. 15. The plane of the deflection from the X-component of angular momentum may lie within the shaded area bounded by the plane 1505 of Q-ratio value minus one and by plane 1506 of Q-ratio value plus one. To avoid duplication of rotation planes in the X-momentum and Y-momentum charts, the minus one plane 1505 may be excluded from the shaded area so that together the X-momentum and Y-momentum Q-ratio deflection charts span all the rotation planes orthogonal to the X-Y plane in a one-to-one manner.

Figure 16:
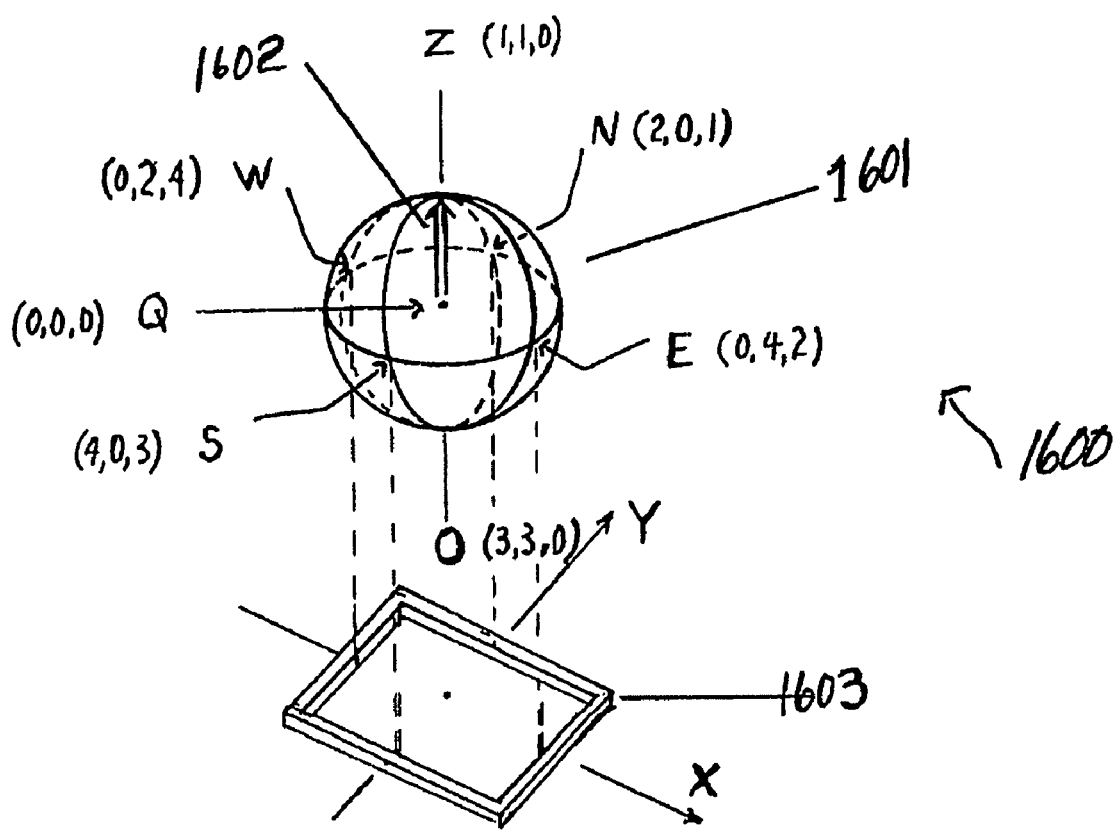
FIG. 16 is a perspective schematic view of a unit reference sphere with universal coordinate labels superimposed and with a typeface plane projected at a font frame represented with solid edges to aid recognition in ensuing details according to an embodiment of the present invention.

FIG. 16 is a perspective schematic view of a unit reference sphere with universal coordinate labels superimposed and with a typeface plane projected at a font frame represented with solid edges to aid recognition in ensuing details according to an embodiment of the present invention. FIG. 16 shows a perspective schematic view of the unit reference sphere 1601 having universal coordinate labels superimposed thereon. Unlike the unit indicatrix sphere 1301 of FIG. 13, unit reference sphere 1601 belongs to the configuration space. That is, the unit reference sphere 1601 is a stationary sphere made up of two stationary Riemannian hemispheres of a stereographic projection. A reference unit indicatrix vector 1602, also shown in FIG. 16 travels in the stationary sphere. A font frame 1603, represented with solid edges to aid recognition in ensuing details, may be projected from the X-Y projection plane of the reference sphere 1601.

The principal cardinal points of the universal coordinates are also shown in FIG. 16. These may be derived from the evolution of the indicatrix vector in each orthogonal momentum component. For all components, the center Q of reference sphere 1601 represents the zero of the indicatrix vector. Thus point Q has a universal position coordinate $\pi$=(0, 0, 0). For each of the three components, the indicatrix coordinate value 1601 may corresponds to a unit vector in the plane of rotation, and may be aligned to one of the positive principal axes of that plane such that a rotation of $\pi/2$ leads to the other positive principal axis. The rotation by $\pi/2$ of the indicatrix vector increments the position coordinate by a value of one.

The scale partitions the action of the indicatrix vector between geodesic rotations in state changes 1-2, 2-3, 3-4, and 4-1 and radial torsion actions along 0-1. The values shown in FIG. 16 are presented in slightly more detail in the table below.

| GRADUATING PRINCIPAL CARDINAL DIRECTIONS WITH UNIVERSAL COORDINATES | | | | | | | | | |
|---|---|---|---|---|---|---|---|---|---|
| Cardinal | Point | $\rho_x$ | $\rho_y$ | $\rho_z$ | $\pi_x$ | $\pi_y$ | $\pi_z$ | X | Y |
| Origin | Q | 0 | 0 | 0 | 0 | 0 | 0 | 0 | 0 |
| Zenith | Z | | | 1 | 1 | 1 | 0 | 0 | 0 |

-continued

GRADUATING PRINCIPAL CARDINAL DIRECTIONS WITH UNIVERSAL COORDINATES

| Cardinal | Point | $\rho_x$ | $\rho_y$ | $\rho_z$ | $\pi_x$ | $\pi_y$ | $\pi_z$ | X | Y |
|---|---|---|---|---|---|---|---|---|---|
| Nadir | O | | | −1 | 3 | 3 | 0 | 0 | 0 |
| North | N | | 1 | | 2 | 0 | 1 | 0 | 1 |
| East | E | 1 | | | 0 | 4 | 2 | 1 | 0 |
| South | S | | −1 | | 4 | 0 | 3 | 0 | −1 |
| West | W | −1 | | | 0 | 2 | 4 | −1 | 0 |

Figure 17:
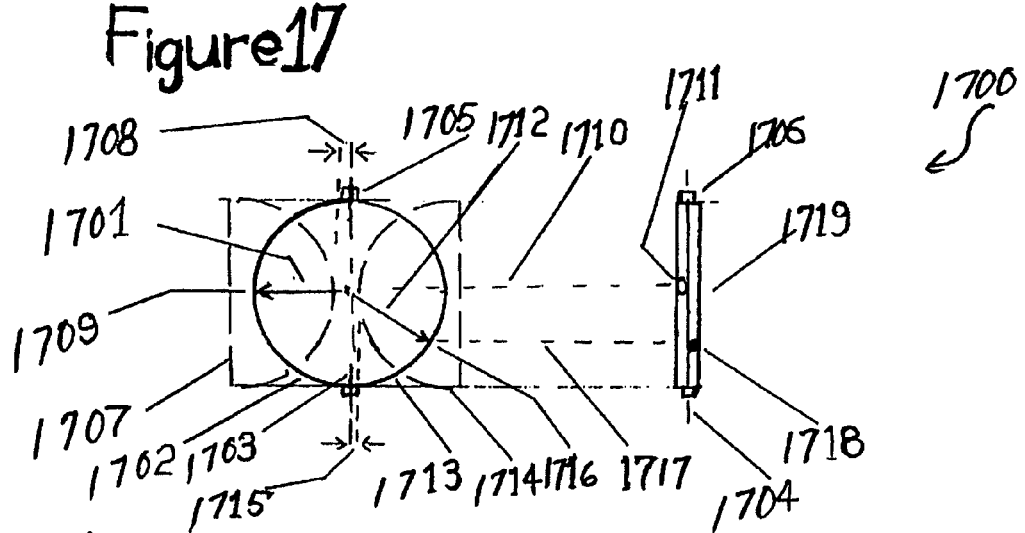
FIG. 17 is a sectional view of a unit reference sphere along an ink depth Z-axis showing a parallel projection of a typeface upon a font frame according to an embodiment of the present invention.

FIG. 17 is a sectional view of a unit reference sphere along an ink depth Z-axis showing a parallel projection of a typeface upon a font frame according to an embodiment of the present invention. FIG. 17 is a sectional view of the unit reference sphere 1701 and the font frame 1703 both illustrated previously in FIG. 16. In FIG. 17, the sectional view may be along the ink depth Z-axis that is laid out horizontally in the diagram. FIG. 17 shows a parallel projection plane 1704 of the typeface projection plane 1703. The parallel translation of the projection planes is also depicted by the relative displacement of the reference unit frame 1705 to the unit font frame 1706.

Points on the reference sphere in the positive Z direction belong to the positioning stereographic projection and are restricted to hemisphere 1702. Other points on the reference sphere in the negative Z-axis direction belong to the inking stereographic projection and are restricted to hemisphere 1703. The two hemispheres are separated by the typeface plane 1703.

The indicatrix vector 1701 corresponding to cardinal point (1, 1, 0) belongs to the positioning projection. The depth coordinate of vector 1701 is flattened by the projection transformation depicted by the hemispherical lens 1707 less the pen width aperture offset 1708. The transformation maps the head of indicatrix vector 1701 at point 1709 along a projection line 1710 to a non-inked positioning point 1711 on the unit frame 1706.

Another indicatrix vector 1712, shown in the general negative Z-axis direction, belongs to the inking projection hemisphere 1713. The depth coordinate of vector 1712 is flattened by the projection transformation depicted by the hemispherical lens 1714 incremented by an ink depth offset shown by the linear span 1715. The transformation maps the head of indicatrix vector 1712 at point 1716 along the projection line 1717 to an inking mark 1718 on the unit font frame 1706.

Figure 18:
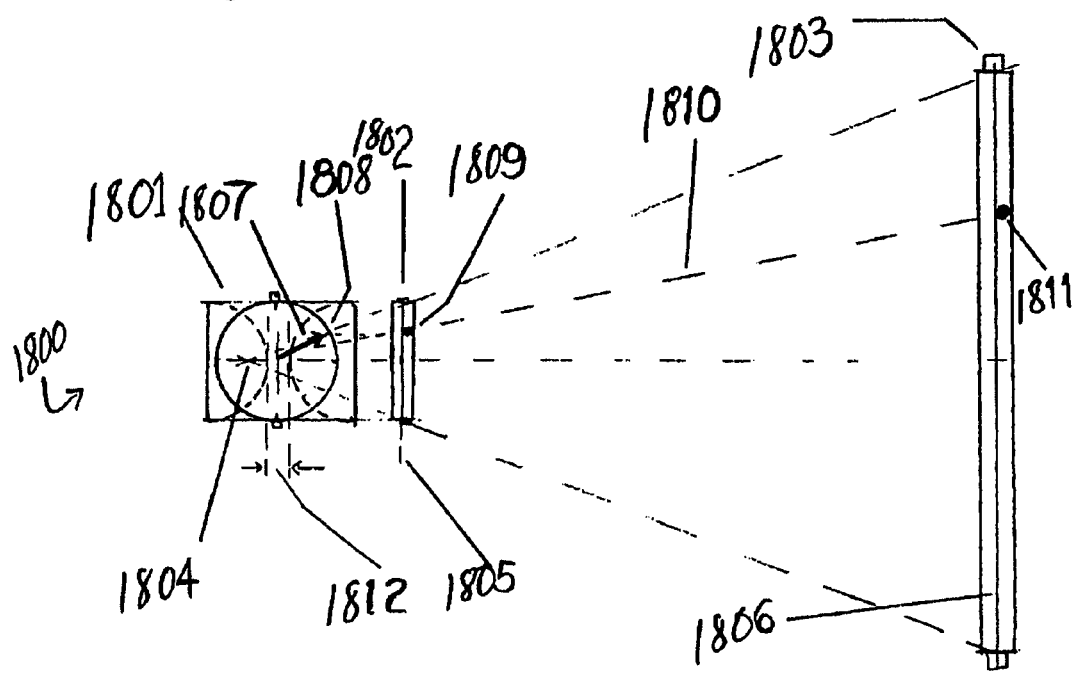
FIG. 18 is a sectional view along the Z-axis showing the magnification of a unit font frame projection to a raster frame dimension according to an embodiment of the present invention.

FIG. 18 is a sectional view along the Z-axis showing the magnification of a unit font frame projection to a raster frame dimension according to an embodiment of the present invention. The magnification process is depicted photographically by the geometrical placement of a unit projection lens assembly 1801 adjacent to the unit font frame 1802 placed at a distance from the raster frame 1803. The magnification achieved is given by the ratio of the distance of raster projection plane 1806 from focal point 1814 relative to the distance of the unit font plane 1805 from the same focal point 1804.

FIG. 18 illustrates the magnification of an indicatrix vector 1807 directed into the inking hemisphere. The relative ink depth of the vector 1807 located at position 1808 is flattened as before with a parallel projection to point 1809 on the unit font frame 1802. The expansion of unit font frame 1802 to dimensions of the raster frame 1803 is achieved by the conical projection of point 1809 on frame 1802 to point 1811 on frame 1803 along the conical projection ray 1810 centered at focal point 1804 of the unit projection assembly 1801.

In keeping with the optical metaphor, the size of the magnified spot 1811 may by convention be magnified with the magnification, so that the raster image is an analogue of the unit frame image. The resolution of the spot 1809 may be varied independently of magnification, by fineness of the pen width aperture of the flattening compound lens 1801 determined by the ink depth and pen width offsets of the compound lens. The highest resolution possible may ultimately be determined by the fineness of precision in the positional data of the stylus tip.

Figure 19:
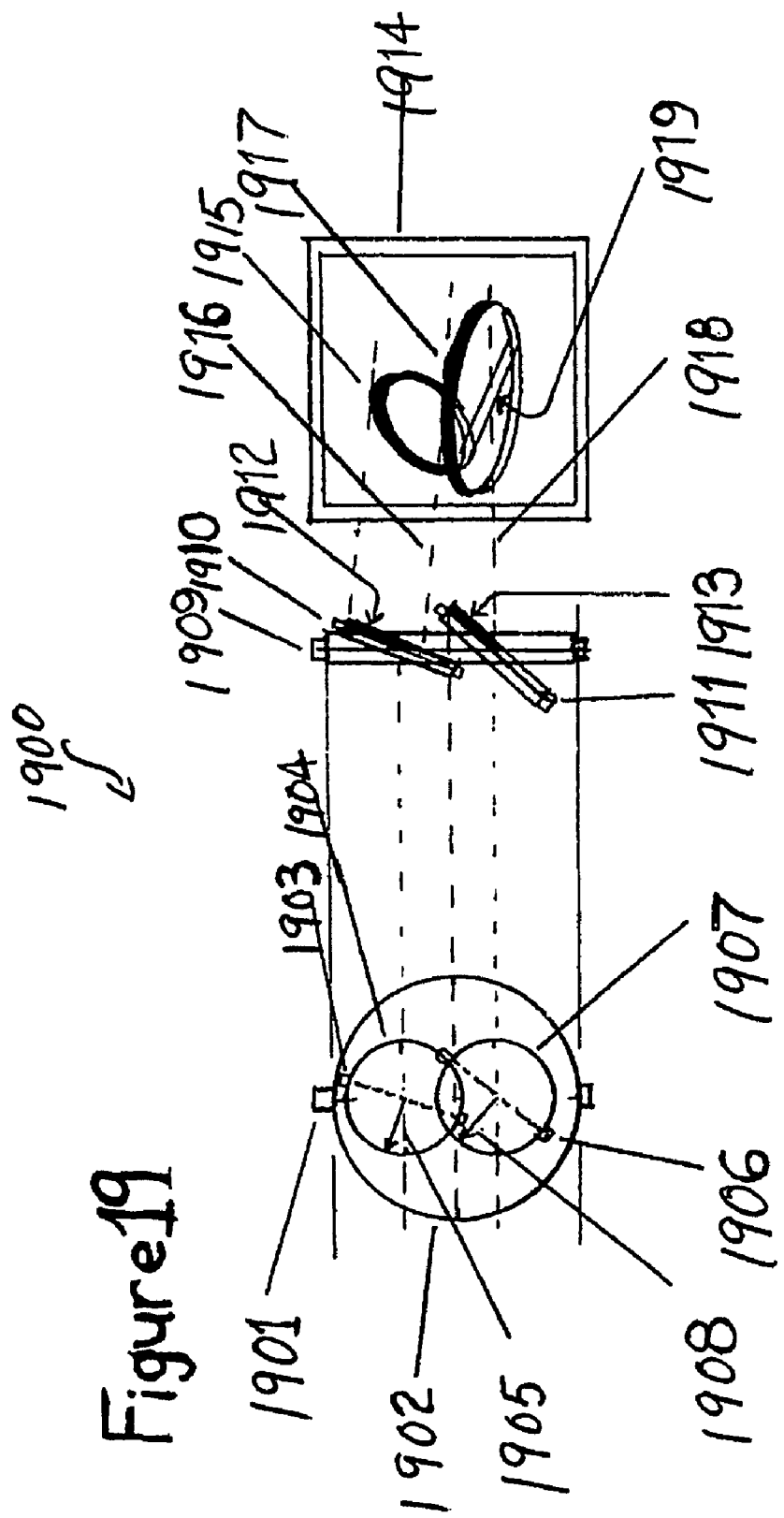
FIG. 19 is a view of a parallel unit projection when principal universal coordinates are partitioned into multiple segments according to an embodiment of the present invention.

FIG. 19 is a view of a parallel unit projection when principal universal coordinates are partitioned into multiple segments according to an embodiment of the present invention. FIG. 19 is an elaboration of the parallel unit projection of FIG. 17 when the principal universal coordinates are partitioned into multiple segments. FIG. 19 shows a principal frame 1901 of principal reference sphere 1902 overlaid with secondary segment frames 1903 and 1906 of secondary reference spheres 1904 and 1907, respectively. The orientation of the secondary frames may be depicted by indicatrix vectors pointed in the intrinsic (1, 1, 0) direction of their respective secondary axes.

The orientation of secondary frames relative to the principal frame is made apparent in the flattening projection frames 1910 and 1911 of the secondary frames 1903 and 1906, respectively. The ink-depth inclination of the secondary frames cause some of their inking portions to be out of ink with respect to the containing principal frames 1910 and 1911 so that only a portion 1912 and 1913 of flattened frames 1910 and 1911 actually generate ink markings.

An image of the resulting unit font plate 1914 is shown on the right portion of FIG. 19. The frame 1909 appears in square relief of frame boundaries of font plate 1914. Ink markings for the cursive letter 'd' are shown in the plate image with solid path lines, whereas positioning paths are shown with hollow path lines. Recalling the earlier teaching of the spatial character recognition technique, the secondary segments of the cursive letter d may be formed by two ellipsoidal paths of letter c connected by a torsional ligature path. This may be apparent in the plate by the inked portions of elliptical paths 1915 and 1917 spanning the inking portions 1912 and 1913, respectively, and connected by a linear interpolation ligature 1919. The relative dimensions of the various segments and views are not to scale because in the proper projections, indicatrix vectors 1905 and 1908 may be scaled onto ellipsoids, and projection rays, such as rays 1916 and 1918 may be parallel to the unit projection. The distortions have been accommodated to better clarify the description of the elements involved in the rendering procedure.

Aspects of the present invention may be found in a method of rendering stylus path glyphs wherein a unit font frame area may be magnified to dimensions expected in a medium of a raster device. Setting the size of a raster frame may be external to the rendering procedure, but the size may be determined to facilitate the procedure.

Dot resolution of the raster device may also be independent of the procedure, but dot-pitch of the raster device may be reconciled with pen and ink-depth apertures of a flattening compound lens of the renderer.

In an embodiment according to the present invention, it may be assumed that the dot pitch of the raster device may match a resolution aperture of the renderer when magnified to the raster dimensions. Under that assumption, the size of the resolutions of the unit font frame may match those of the raster medium, and no further scaling may be required when tracking the raster along the horizontal dot array or vertical line position.

It may also be assumed that the spatial data provide a continuum from font frame to font frame for the extent of an entire line, so that the font frames of the line may be mapped to the entire width of the raster medium and so that the frames on the same line are rendered concurrently. Given that assumption, a method for rendering a single font frame may be adequate for rendering an entire first line of text on the raster medium.

Likewise, the procedure for rendering an entire first font frame line may be repeated along the raster lines beyond the first font frame line by repeating, for the span of one font height, the procedures for rendering the first font frame line.

In an embodiment according to the present invention, a rendering procedure may comprise tracing stylus position points and marking as inked path segment positions falling within an ink-depth aperture of a flattened projection to principal unit font frame.

In an embodiment according to the present invention, the principal frame may also mark as inked path segment positions falling within the ink-depth aperture of the flattened projection to secondary unit font frames, and to mark the principal font frame if the secondary ink mark also falls within the ink depth of the superimposed principal frame.

Once the unit font frame has been marked by an entire recorded path for the current font frame, the markings on the raster medium may be duplicated, while taking into account any magnification into raster medium dimensions, the dot-pitch of the raster medium, and the resolution of the unit font frame.

Aspects of the present invention may be found in a spatial chirographic sign rendering technique adapted to mark a raster medium of a display or print device with inking dots. Marking the medium may be conducted according to the spatial location of a stylus tip of a spatial chirographic sign reader. Three-dimensional stylus position data may be directly collected by the reader, or may be converted to a standard form according to a spatial character recognition technique.

Scan direction measurement may be performed by stylus tracking enabling rendering of styling, such as that of a calligraphic pen or an art paintbrush. Aspects of the present invention may be found in rendering of styling art by the use of a spatial marker and a modified scanning device.

Aspects of the present invention may be fund in a coordinate system that may be associated with a spatial chirographic sign reader wherein:
1. For a font, consider a rectangular area containing all possible symbols as a font face.
2. Consider the font origin to be a fixed point located at the center of the font face and situated a distance below the writing surface.
3. The font face may be identified with an X-Y plane above the font origin, so that any symbol or typeface glyph may be associated with a trace of a conic section generated by a cone, whose apex lies at the origin.
4. A typeface for any character may be associated with conic sections generated by the cone whose apex lies centered at the font origin.
5. The coordinate arrangement may associate a font typeface with a projection of a conical trace upon the X-Y plane.
6. Association of the font typeface with the projective X-Y plane may ensure that the conical section adheres to a recognized typeface, but places no constraint upon the radial depth of the section, allowing for additional determination of the trace of a pen stroke, for example.

In an embodiment according to the present invention, sign/character recognition may be facilitated by restricting ink markings to a range of spatial pre-images of expected typeface glyphs by modeling a pen stroke into three dimensions employing the radial depth from the font origin of the pen stroke to add restrictions in the following manner:

7. Set a projective plane at a reference font depth (FD) from the origin.
8. Consider the writing tip to occupy an additional depth. For a given type of writing instrument, consider the existence of a maximal ink depth. Call the ink depth (ID).
9. Consider that a pen stroke may occur only when the writing tip approaches a projective plane by the ink depth (ID) or a lesser amount.
10. Consider an additional association of the writing tip with a pen height above the writing surface.
11. Consider the writing surface to be a volume bounded by the X-Y projection plane at the bottom and the writing surface at the top and where the volume may be shaped as a thin sheet having a thickness being a maximal ink depth (ID).
12. In the projective font coordinate system, the pen height may lie upon a projective point, that is, the height may be measured along a projective ray from the font origin by a distance along the ray above the writing surface.

Aspects of the present invention may be found in a chirographic text character scanner associated with a reader and adapted to detect the direction of scan. A scan direction measurement in the scanner device may be made relative to a direction of the reader boom stems.

A glyph may comprise a segment of inking along a path of a writing tip. The inking may comprise a number of characteristics, for example: One characteristic may be a glyph path. A glyph path may be described by a geometric curve tracing a locus of the coordinates of the projective points. Another characteristic may be the boldness or thickness of a pen stroke. This characteristic may be directly associated with the thickness of the writing tip.

A refinement of stroke thickness may be a variable weight of stroke, which may be specified by a conical writing tip (nib) tracing a heavier glyph at lower pen height. This characteristic mimics the inking strokes of brushes. A further refinement of glyph appearance may be a writing tip orientation producing a weight factored on stroke direction. This characteristic may mimic the directional weight of inking strokes of a calligraphic nib.

Whereas glyph weight classifications matter in many writing systems, a first characteristic to elucidate will be the path characteristic. A previously described spatial text character recognition technique may employ the following.

The geometry for tracking a pen tip may assume that a writing tip may follow a path having an initial downward direction into an inked surface, which may be defined as an extension of the pen followed by a retraction of the writing tip at an end of the glyph path, corresponding to raising the pen away from the writing surface.

The glyph path may comprise a conic section. Extension and retraction of the writing tip, although occurring out-of-ink depth may also be considered to be a conic section, although not projected onto the X-Y plane.

The path of the writing tip may comprise three connected conic sections: the out-of-ink extension of the pen to the writing surface, the in-ink trace of glyph path, and the out-of-ink retraction of the pen from the writing surface.

The path followed when marking a glyph may occupy a volume in and out of ink, but because the path is a one-dimensional curve through an alternating ink volume, the path may be associated with a curve on a surface adapted to be oriented.

Curves on spheres for which one hemisphere (say the southern hemisphere) is inked and the other non-inked have a natural stereographic projection where one equatorial hemisphere is homomorphic to the font coordinate projection.

A glyph path comprising font projection and inked hemispherical projections coinciding at respective, projective planes may equivalently be described by an inked hemispherical projection.

A glyph path comprising a qualifying stereographic projection may have at least one three-dimensional embedding, so that a three-dimensional coordinate map may fully describe the glyph.

A composition of glyph paths embedded in three-dimensional space may fully identify a font typeface made up of a sequence of glyphs.

Alphabetical, numerical, and other symbols of a particular writing system may be embedded in a three-dimensional coordinate map of ink (adapted to oriented) stereographic projections.

A coordinate map for spherical curves comprising font and stereographic projections described above may be a spherical coordinate system. The present invention may be adapted to employ a geometrically distinct spherical coordinate system $\{\theta, \phi, \rho\}$ wherein $\theta$ is the longitudinal angle, $\phi$ is the inverse latitude, and $\rho$ is the radial distance from the center of the projective sphere.

Aspect of the present invention may be found in a spatial chirographic sign rendering technique having a number of rendering attributes enabling tracing of the glyph path. The attributes may comprise a unit reference sphere derived from two hemispheres of a stereographic Riemannian sphere, universal labeling of the unit reference sphere by adapting an Eulerian topological ball, tracking the stylus path with a unit speed curve indicatrix vector in the reference sphere, a unit font frame for parallel projection of the indicatrix vector, a pen width aperture component of image resolution, a minimum ink depth aperture of image resolution, flattening the projection image to the limited resolution of the apertures, and a raster image frame marked by a magnification of the unit font frame onto the raster image frame.

Comparing the rendering attributes of the glyph path specified above with preceding glyph type characteristics, it may be seen that the rendering technique specified thus far accommodates glyph paths with pen widths of constant thickness. Furthermore, the rendering technique may employ a flattening lens projecting a constant minimum ink depth aperture and a constant pen width aperture. These correspond to two glyph-type characteristics.

A third glyph-type characteristic may require the rendering technique accommodate a variable ink stroke weight. This may correspond to an enhancement of the ink depth aperture attribute of the rendering technique. The enhancement may factor the weight according to the depth position of the indicatrix vector.

A fourth glyph-type characteristic may require that the rendering technique accommodate a variable pen width. This may correspond to an enhancement of the pen width aperture attribute factored on the path direction of the indicatrix vector relative to the orientation of the pen. This introduces an intrinsic pen orientation. When using a calligraphic nib metaphor, the pen width may be decomposed into two nib dimensions, for example, a nib width and nib height. The orientation of the pen may be captured, by binding one of the nib orientation axes to a scan direction attribute of the Scanner receptacle.

Aspects of the present invention may be found in a chirographic sign rendering technique supporting a variable minimum ink depth aperture and a variable pen width aperture factored on pen orientation. Pen orientation may be established after introducing a styling marker stylus onto a chirographic text character scanner receptacle and binding one of stylus orientation axes to a scan direction angle of the scanner receptacle.

Figure 20:
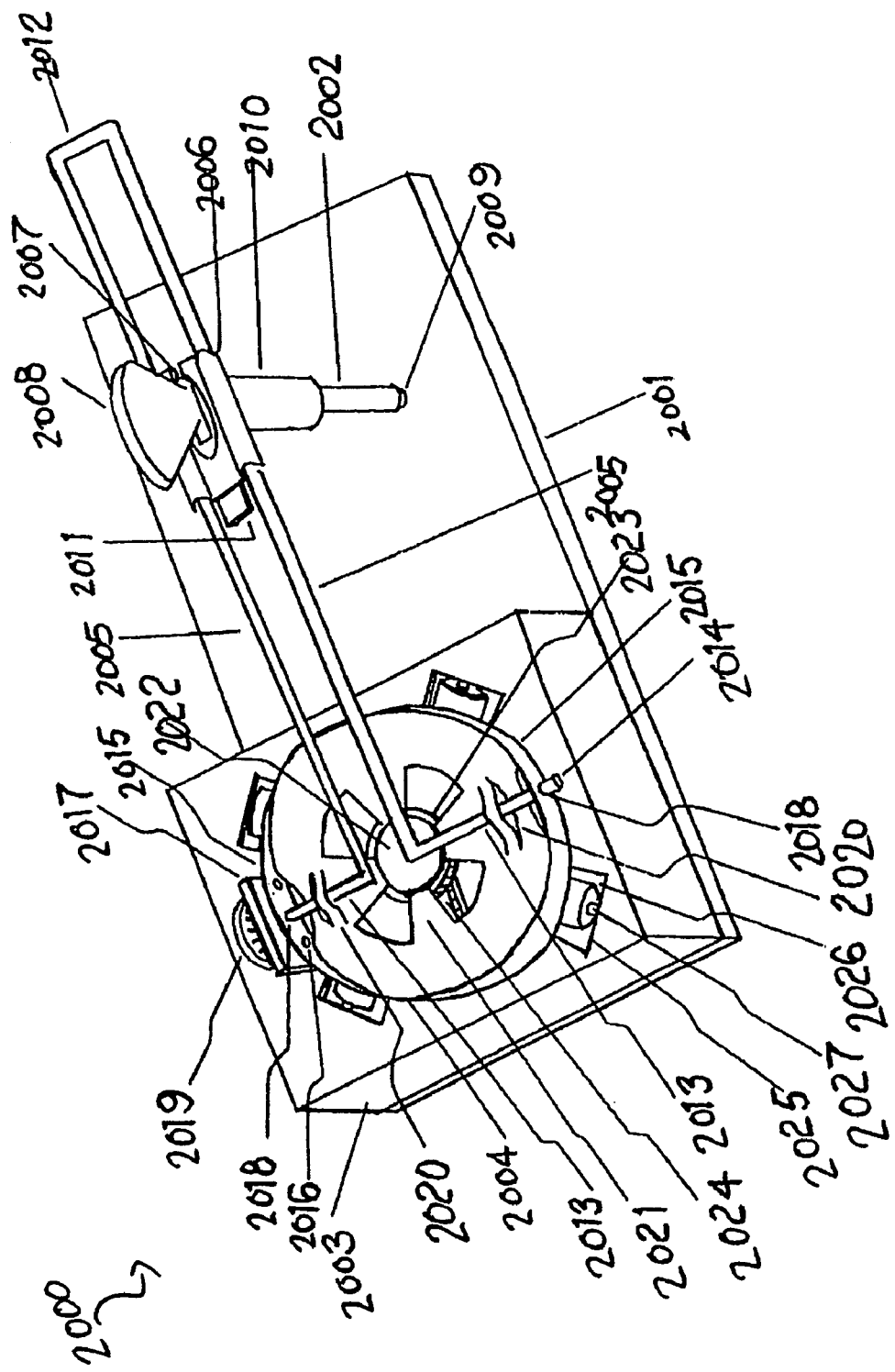
FIG. 20 is a top perspective view of a chirographic styling marker comprising a reader fulcrum support platform on a left side, a boom extended over a guide surface, and supporting a styling marker stylus on a boom receptacle according to an embodiment of the present invention.

FIG. 20 is a top perspective view of a chirographic styling marker system 2000 comprising a reader fulcrum support platform, a boom extended over a guide surface, and a styling marker stylus on a boom receptacle according to an embodiment of the present invention. FIG. 20 illustrates a top perspective view of the chirographic styling marker device, which in essence, is the text character scanner device, wherein the scanner device may be replaced with a marker stylus, for example.

The scanner pre-written medium may be replaced by a marker guide surface (medium) 2001. A scanner assembly may also be replaced with a marker assembly. The marker assembly may comprise a probe 2002, a shaft body 2010, and a grip handle 2008. The free end of the marker probe 2002 may comprise a marker (writing) tip 2009. The marker probe 2002 may fit slide-ably into the marker shaft body 2010.

Grip handle 2008 of the marker assembly may permit a user to manipulate the marker over a medium of the guide surface 2001. Connection of grip handle 2008 to marker body 2010 may be facilitated via receptacle opening 2007 of receptacle bracket 2006. Receptacle bracket 2006 may be slide-ably attached to boom stems 2005. The receptacle bracket 2006 may also comprise a pen orientation sensor 2011 for detecting the inclination angle between boom stems 2005 and a reference orientation of the pen. The reference axes of the marker may be the symmetry axes of the grip handle 2008 and may comprise an axis parallel to broad gripping surfaces of the head and another axis that is perpendicular to the gripping surfaces. Both of these axes may be parallel to the plane of the receptacle bracket 2006, for example.

Reader support platform 2003 remains largely as specified early regarding the spatial chirographic text character scanner. The boom stems 2005 may be connected at far ends with bridge section 2012. Opposite ends of the boom stems 2005 may bend at the base into pinions 2013 of fulcrum bracket 2004. The pinions 2013 may engage the fulcrum bracket 2004 through a support collar 2015. The support collar 2015 may be attached to fulcrum bracket 2004. The pinion 2013 may engage the support collar 2015 in a rotatable fashion via stabilizing openings 2020 of fulcrum bracket 2004 and opening 2018 of support collar 2015. Pinions 2013 may emerge on the other side of the support collar 2015 as a pinion end 2014, for example. Only one pinion end 2014 is shown in the FIG. 20, but there exists another one on the far end of the pinion 2013, which is obscured.

Pinion 2013, whose end is obscured in FIG. 20, may pass through opening 2018 of support collar 2015 and through similar openings in pinion quadrature sensor 2017. Pinion end 2014 may be attached to quadrature wheel 2019.

A working surface of fulcrum support collar 2015 rests upon roller 2026, which may be rotatably attached to housing well 2025 of support platform 2003, by means of axle 2027, for example. Only one of the four supporting wheel fixtures is labeled in FIG. 20. In FIG. 20, a difference from the spatial chirographic sign reader and the chirographic text character scanner may be the depiction of four support wheel wells early only three were illustrated in the previous figures.

Fulcrum bracket 2004 may be attached to major support pinion 2022 via four flanges 2021, only one of which is labeled in FIG. 20. Quadrature wheel 2023 may be attached to the major support pinion 2022 and rotation of pinion 2022 may be detected by quadrature sensor 2024 attached to an underside of the top surface of platform 2003. The undercarriage details of platform 2003 may be similar to those specified for the spatial chirographic sign reader described above.

Figure 21:
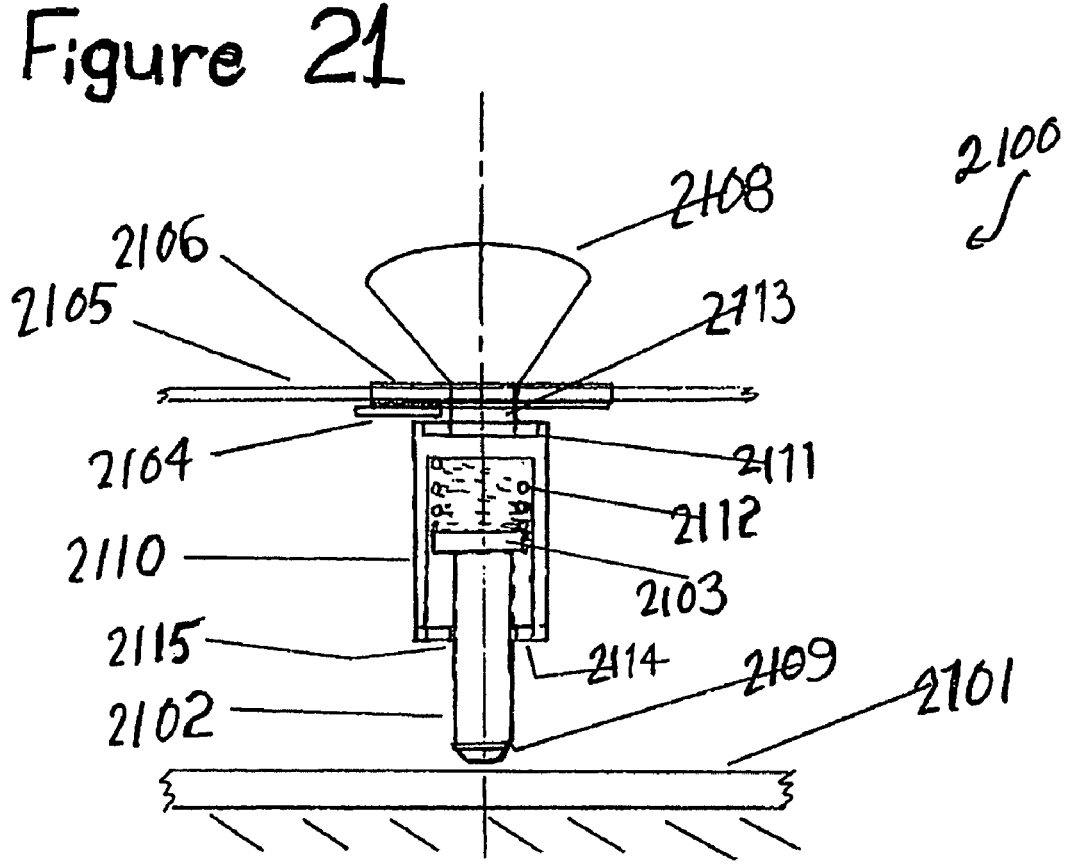
FIG. 21 is a side elevation section view of a marker assembly along a reader boom according to an embodiment of the present invention.

FIG. 21 is a side elevation section view of a marker assembly 2100 along a reader boom according to an embodiment of the present invention. FIG. 21 shows a side elevation view of the marker assembly 2100 parallel to reader boom stems 2105. Glide surface 2101 is shown placed on a support, such as for example, a tabletop shown shaded at the bottom of FIG. 21.

Marker assembly 2100 is shown suspended over glide surface 2101 from receptacle bracket 2106 resting upon boom stems 2105. The top of the shaft body 2110 may be connected to grip handle 2108 via a neck connection 2113. At a base of the neck connection 2113 at the top of shaft body 2110, a circular well may accommodate quadrature wheel 2111. The marker (writing) tip 2109 may be attached to marker probe shaft 2102. The probe shaft 2102 may fit into shaft body 2110 through opening 2115 formed by bottom wall 2114 of shaft body 2110. An inside end of marker probe 2102 may be formed as a head 2103 adapted to slide along an inside face of shaft body 2110. The head 2103 of probe shaft 2102 may be maintained pressed toward shaft opening 2115 by an enclosed spring 2112.

Marker probe shaft 2102 may be is designed to recede into shaft body 2010 as a user presses the marker against glide surface 2101 by tip 2109 in the course of simulating a marking upon a surface with the marker stylus. The spring 2112 may compress as probe 2102 enters/recedes into the shaft body 2110. When the user raises the stylus from the pressed state, the probe 2102 may extend to an extended position by the recoil of spring 2112. Spring-loaded action of the marker may provide a sense of depth that the user may apply when styling a simulated mark, for example.

FIG. 21 also reveals receptacle bracket 2106 engaging boom stems 2105. The bottom of receptacle bracket 2106 reveals a pen orientation sensor 2104 attached to a bottom face of receptacle bracket 2106 in close proximity to quadrature wheel 2111 to effect sensing of an orientation of marker head 2108 with respect to boom stems 2105 in a plane of glide surface 2101.

Figure 22:
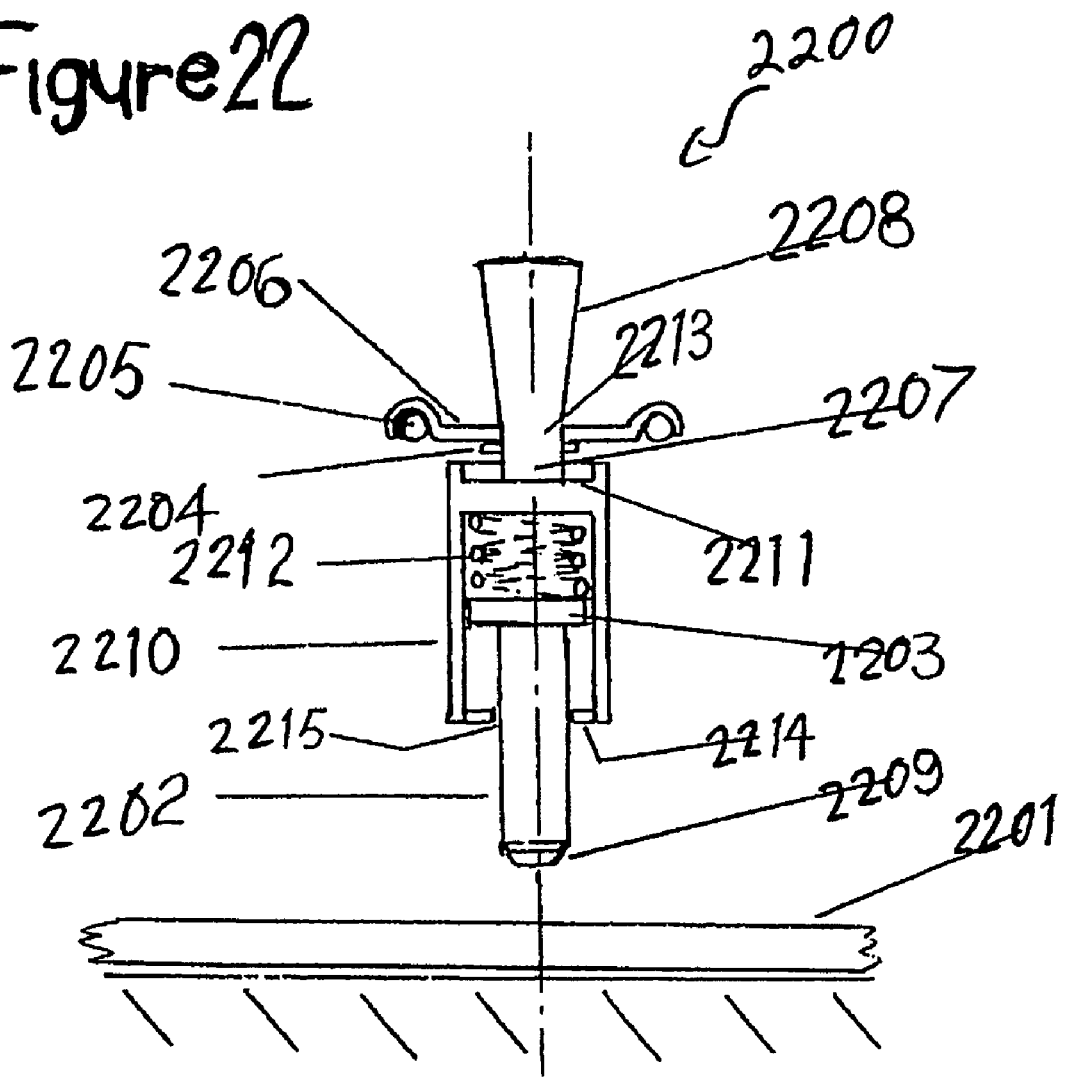
FIG. 22 is a front elevation section view of a marker assembly according to an embodiment of the present invention.

FIG. 22 is a front elevation section view of a marker assembly 2200 according to an embodiment of the present invention. FIG. 22 shows a front elevation view of the marker assembly comprising similar elements as those illustrated in FIG. 21. FIG. 22 illustrates a sectional view of boom stems 2205 slide-ably engaging receptacle bracket 2206 and receptacle opening 2207. Grip handle 2208 is shown fitting into receptacle bracket 2206 via handle connection neck 2213. The connection neck 2213 partially obscures the glide direction sensor 2204 in the background of FIG. 22. Quadrature wheel 2211 appears unchanged from FIG. 21. Similarly, elements 2209, 2210, 2212, 2213, 2214, and 215 of marker assembly 2200 appear unchanged from FIG. 21 due to cylindrical symmetry.

Figure 23:
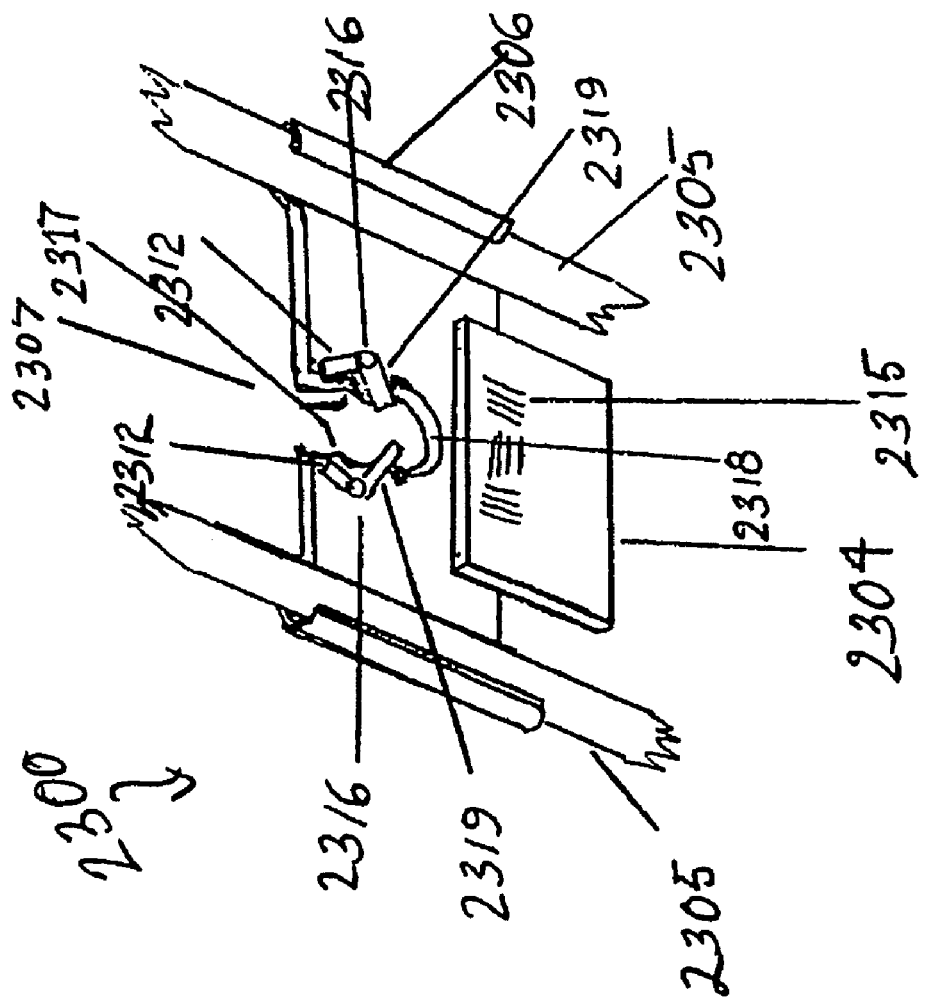
FIG. 23 is a bottom perspective detail view of a marker receptacle bracket of a chirographic text character scanner according to an embodiment of the present invention.

FIG. 23 is a bottom perspective detail view 2300 of a marker receptacle bracket 2306 of a chirographic text character scanner according to an embodiment of the present invention. FIG. 23 shows a bottom perspective detail of the marker receptacle bracket 2306.

The receptacle bracket 2306 may slide-ably engage boom stems 2305. The underside of the receptacle bracket 2306 is shown partly obscured by a detail of the guide direction sensor 2304. The face of the guide direction sensor 2304 depicts sensor elements 2315 in linear texture.

The middle of receptacle bracket 2306 may comprise a circular collar opening 2318 for a scanner neck connection depicted in prior figures. The scanner side of the receptacle bracket 2306 features a channel opening 2307 through which the scanner neck may be inserted when mounting onto the reader, for example. Each side of channel opening 2307 may comprise reciprocating collar latches each comprising two arms, a first opening arm 2312 and a second closing arm 2319. The two arms may meet at a pivot pin 2316, which may be mounted on receptacle bracket 2306.

The angle at which the arms are fixed may cause arms 2312 to clasp, when arms 2319 are pushed past the collar opening 2318 by the scanner neck. Retracting the scanner neck may reverse the movement of arms 2312, as the scanner is disengaged from the receptacle bracket 2306 along channel opening 2307. The underside edges of channel opening 2307 on each side thereof, may comprise a humped, smooth obstruction 2317 maintaining the arms locked in place in either an open or closed position.

Figure 24:
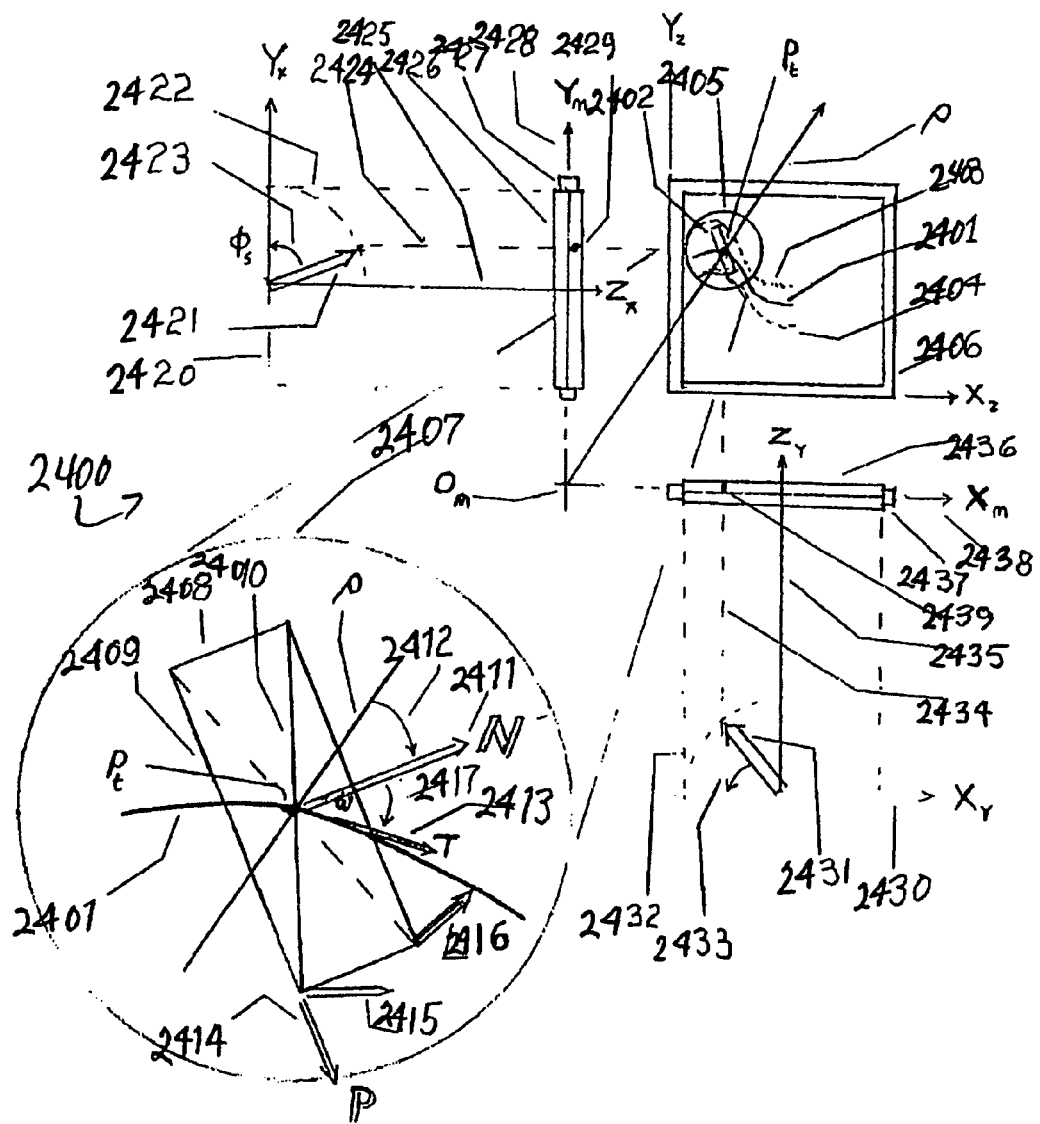
FIG. 24 is a plan view of a calligraphic marker tip in reader measurement coordinates superimposed over indicatrix projections to a unit font frame illustrating calligraphic pen stroke styling according to an embodiment of the present invention.

FIG. 24 is a plan view 2400 illustrating calligraphic marker tips in reader measurement coordinates superimposed over indicatrix projections to a unit font frame illustrating calligraphic pen stroke styling according to an embodiment of the present invention. FIG. 24 illustrates three parallel flattening indicatrix vector projections along the X, Y, and Z-axis lines of sight. The three projection planes may be aligned to measurement coordinates of a spatial chirographic device. The projection that shows the typeface may have measurement coordinate features superimposed there over.

A boom stem axis starting at measurement coordinate origin $O_m$ is shown in FIG. 24 as boom axis vector $\rho$ pointing to a point $p_t$ on stylus path 2401. A plan section of marker tip 2402 is also shown with point $p_t$ located at the marker center point. The shape of marker tip 2402 may cause the marker width to vary along the stylus path 2401 by a range marked by upper bound curve 2403 and lower bound curve 2404.

A circular area 2405 of the typeface frame 2406 may contain pen orientation details 2407 magnified in the circular enclosure on the lower left portion of FIG. 24. The detail shows a fragment of the boom vector $\rho$ traversing the stylus path 2401. The rectangular profile of the marker tip shows a short marker edge 2408, a long marker edge 2409, and a diagonal 2410 passing through the marker center-point $p_t$ on stylus path 2401.

The orientation of the stylus may be designated to the flat side of the marker, whose plane may be identified by a narrowest two pairs of edges of the marker. This designation makes vector 2411, normal to the flat face, the marker orientation vector. The orientation may be measured by orientation angle 2412 between the orientation vector 2411 and the reader boom axis vector $\rho$.

Deploying the marker in the direction of normal vector 2411, labeled N, may produce broad calligraphic strokes. Deploying the marker in a direction perpendicular to a broad stroke direction may produce a narrow calligraphic stroke, for example. The narrow stroke direction is indicated by parallel vector 2414, labeled P. Whereas a narrow profile may produce a maximal stroke weight in the broad face direction, marker profiles of perceptible thickness may produce a maximal stroke weight in an orientation broadside to the diagonals of the rectangular profile. These are shown as maximal weight directions of vector 2415 and vector 2416. The direction of the stylus tip path may be denoted by the tangent indicatrix vector T and is illustrated by the vector 2413 in the detail 2407. Vector 2413 makes an angle 2417 with orientation vector 2411 of value ω radians.

Thus, there may be a decomposition of the pen width in each of the font projection axes and the two widths may not always be the same. The two widths may be the same when the marker profile is circular, for example. And this fact was used to represent the apertures of the chirographic sign rendering technique with a single projection, for example.

When the marker profile is rectangular, the profile in each font frame axis may be accounted for separately, such as with the two projections aligned to the top margin and the right margin of FIG. 22, for example. Each of the projections may be identical to the projection depicted in FIG. 23, for example, of the chirographic sign rendering technique. No further elaboration is needed, aside from the requirement to calculate two components of the aperture. A subscript may designate the axis parallel to the line of sight being used.

The X-axis line of sight sectional view along the ink depth Z-axis 2425 may be labeled $Z_X$. The projection plane 2420 may be labeled $Y_X$. The indicatrix vector 2421 may be rooted on projection plane 2420. The head of the indicatrix vector 2421 may be on the indicatrix sphere shown partially with arc segment outline 2422. The indicatrix vector 2421 may form, along with projection plane 2420, latitude angle 2423 of $\phi_s$ radians in a unit speed coordinate frame and parallel projection line 2424 parallel to the projection axis 2425. The projection may translate the head of indicatrix vector 2421 along the projection line 2424 to an inking mark 2429 of a renderer medium 2426 of unit font frame 2427.

The Y-axis line of sight sectional view along the ink depth Z-axis 2435 may be labeled $Z_Y$. The projection plane 2430 may be similarly labeled $X_Y$. The indicatrix vector 2431 may be rooted on projection plane 2430. The head of the indicatrix vector 2431 may be on the indicatrix sphere, shown partially with the arc segment outline 2432. The indicatrix vector 2431 may form along with projection plane 2430, latitude angle 2433 of $\phi_s$ radians in the unit speed coordinate frame and parallel projection line 2434 parallel to the projection axis 2435. The projection may translate the head of indicatrix vector 2431 along projection line 2434 to an inking mark 2439 of renderer medium 2436 of the unit font frame 2437.

The stroke weight components may be calculated for an arbitrary marker profile, orientation, and marker path. Consider that the motion of the center-point along the indicatrix tangent vector T may sweep a volume known as a parallelepiped, given by the triple scalar product $$\mathbb{P} \times \mathbb{N} \cdot T = |\mathbb{P}| |\mathbb{N}| |cos(\omega)|$$

Operationally, the motion may be calculated from the determinant of a matrix formed by the components of $\mathbb{P}$, $\mathbb{N}$, and T arranged into the rows of the matrix. The volume does not vary with direction, so that the broadside span is always derivable.

Figure 25:
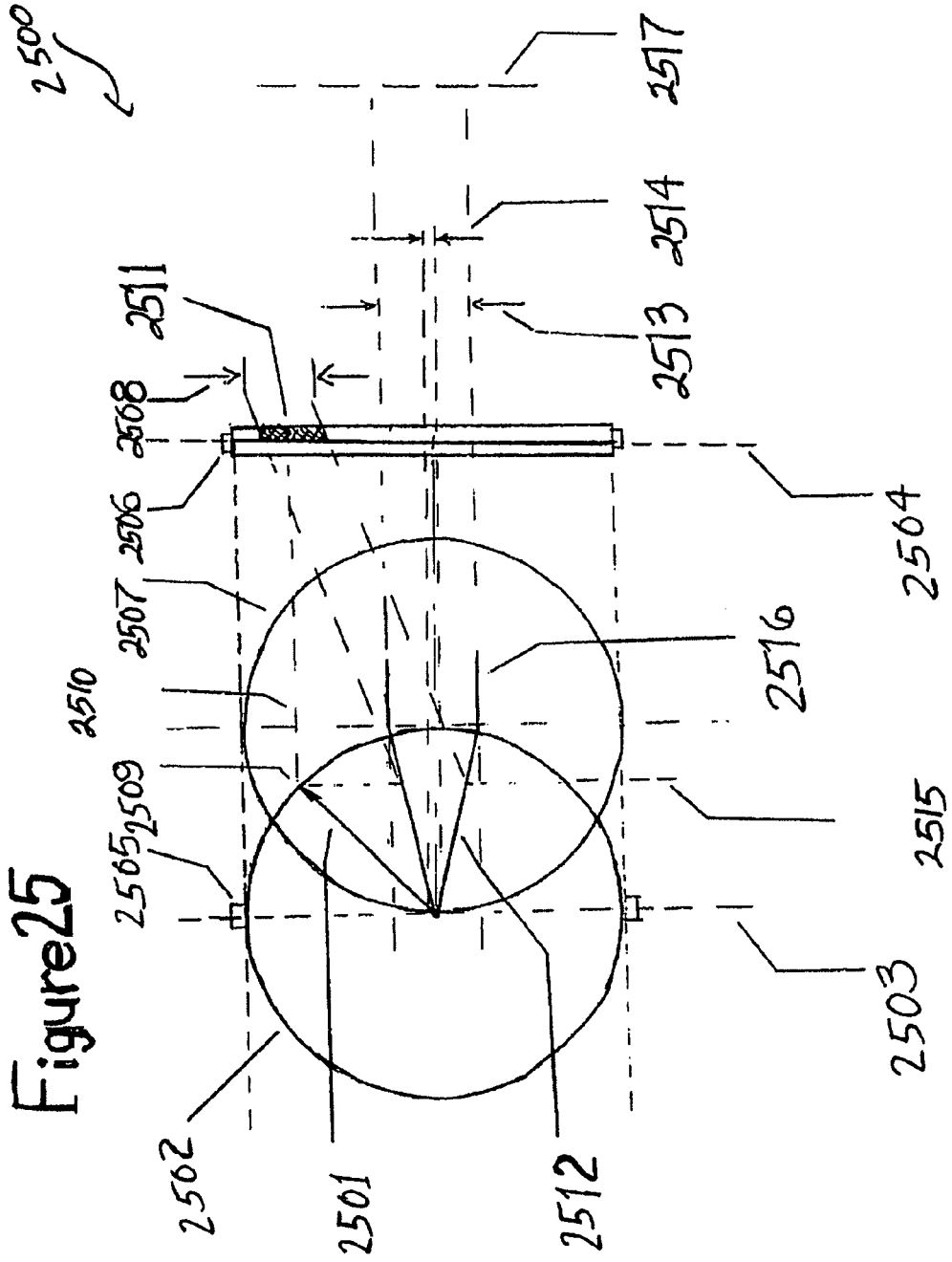
FIG. 25 is an elevation view of a cylindrical brush marker with a conical length distribution of brush hairs superimposed over indicatrix projection to a unit font frame according to an embodiment of the present invention.

FIG. 25 is an elevation view 2500 of a cylindrical brush marker with a conical length distribution of brush hairs superimposed over indicatrix projection to a unit font frame according to an embodiment of the present invention. FIG. 25 is a sectional view along the ink depth Z-axis laid out horizontally. FIG. 25 shows a parallel projection plane 2504 of typeface projection plane 2503. Parallel translation of the projection planes is also depicted by the relative displacement of the reference unit frame 2505 to unit font frame 2506. A reference unit sphere 2502, centered in the typeface plane 2503, may serve as a guideline for indicatrix vector 2501, centered on a concentric indicatrix sphere.

The indicatrix vector 2501, in the negative Z-axis direction, may be flattened by a projection transformation depicted by spherical lens 2507 transforming the head of indicatrix vector 2501 at point 2509 along projection line 2510 to an inked positioning point 2511 on unit frame 2506.

A flattening projection simulating a paintbrush is depicted in FIG. 25 as a spherical aperture lens 2507, within which a conical volume 2512 may determine an aperture at a depth plane 2515 to be projected as aperture 2508 around position 2511 on plane 2504. Ends of a conical marker tip 2512 may determine a maximal ink depth aperture 2513 and a minimal ink depth aperture 2514. A guideline 2516 of a marker shaft may meet plane 2517 of a supporting receptacle at above projection plane 2504.

Calculation of an active ink depth aperture, shown here schematically as interval length 2508 may be an interpolation of the aperture between a minimum value 2514 and a maximum value 2513 factored by the location of depth plane 2515 along cone 2512.

When deployed in a writing volume, a pen orientation of a marker stylus tip may affect operations relative to rendering characters, for example. An initial orientation of the pen may be set/defined when the marker is mounted. Because the grip handle of the marker may indicate the orientation, a user may decide on an initial attitude at which the handle may be locked into a receptacle opening. The initial orientation may be recorded for reference in the rendering process.

An aspect ratio may also be specified to indicate relative sizes of narrow and broad edges of a simulated calligraphic nib. Rendering employing a simulated calligraphic nib may be made by parallel projection of a profile of an anisotropic nib from an active orientation along a tangent indicatrix and onto a normal indicatrix plane. The resulting profile width may be employed to set the effective current pen width in the unit font frame.

Where cylindrical paintbrush styling is relevant, a brush length may also be specified to indicate active variation of an ink depth aperture. The brush length may be scaled to a span of marker probe travel, for example.

A maximal ink depth aperture may also be specified to correspond with a broadest stroke of the simulated brush when the probe is fully compressed into the marker shaft, for example.

Rendering of a simulated cylindrical brush stroke may be made by interpolation of the ink depth aperture parameterized by depth of the indicatrix vector head.

Calligraphic and cylindrical paintbrush effects may be combined when simulating a flat paintbrush. The interpolated ink depth aperture may be factored with a profile projected onto an indicatrix normal plane.

Rendering of the simulated flat paintbrush may be made by parallel projection of an interpolated profile of an anisotropic brush from an active orientation along the tangent indicatrix and onto the normal indicatrix plane. The resulting interpolated profile width may be employed to set an effective current pen width in a unit font frame.

In an embodiment according to the present invention, the marker device may be instrumented to automatically assert rendering attributes as readings usable by the rendering process. Such modifications may be employed to automate the rendering process. Stylized sign images may be rendered employing a pen plotter device. A tip of the plotter may be capable of stylized markings, for example.

A chirographic reader may be adapted to produce real-time spatial data from handwriting strokes asserted by a writer using a stylus while time and position data are gathered electronically, for example. Spatial and temporal data may be expressed in spherical coordinates in a three-dimensional spatial volume above a writing surface with strokes being parameterized versus time. The spatial and temporal data may be used to identify handwriting signs employing font coordinates.

Handwriting strokes associated with signs, glyphs, and/or characters may be recorded. When a depth of a stylus tip is above a maximal 'ink' depth, the handwriting strokes may be designated positioning or inking. The strokes may be converted into separate stereographic projections to interpret the stylus tip path into rotations along projection Riemann hemispheres. Positional data may be mapped into universal cardinal coordinates of an Euler topological ball. The path of the stylus in the topological ball may be decomposed into geodesic rotation and torsion deformation to enable recognition of the handwriting strokes as text identified by standard inking paths of a reference characters set of a written language system. Three-dimensional, real-time, positional data of a stylus may be collected.

Figure 26:
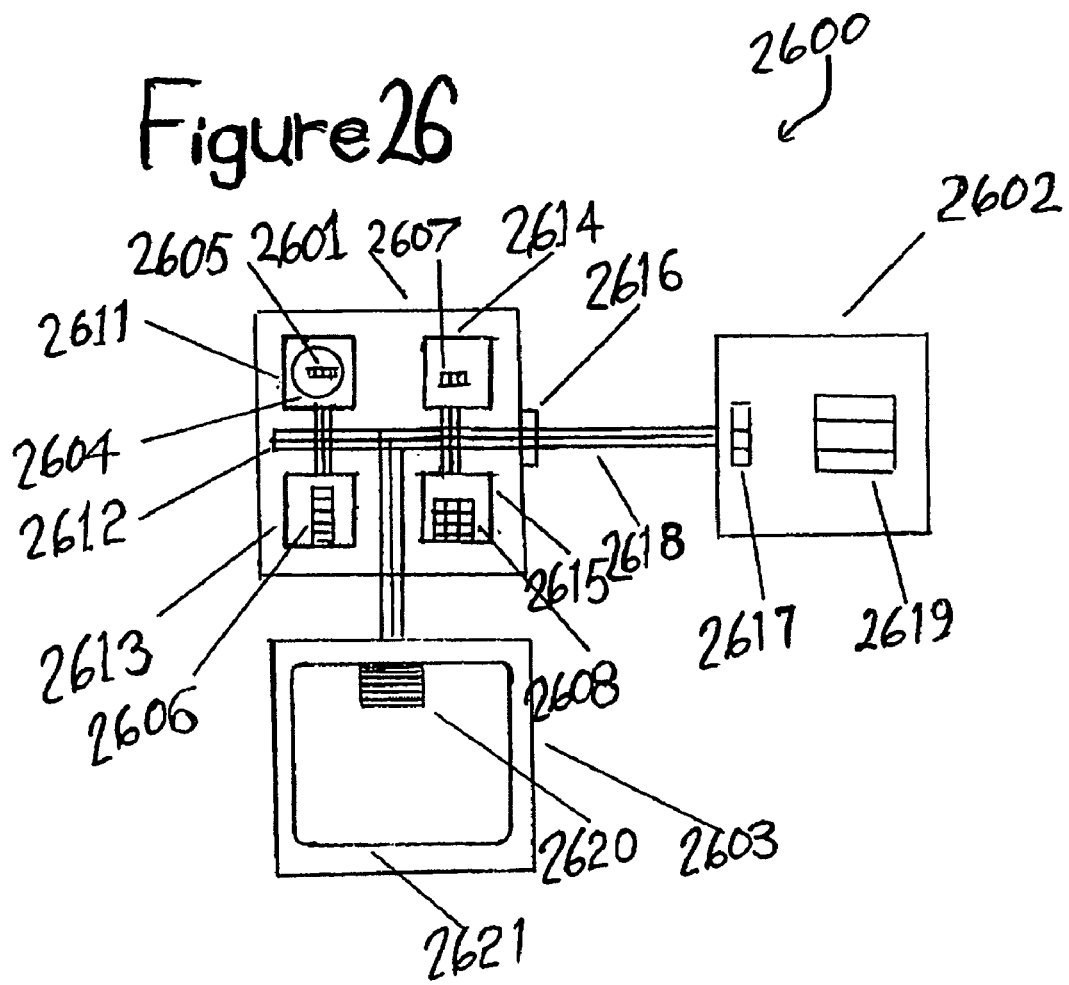
FIG. 26 is a view of a chirographic system illustrating a central system unit connected to a chirographic input and output device according to an embodiment of the present invention.

FIG. 26 is a view of a chirographic system 2600 illustrating a central system unit connected to a chirographic input and output device according to an embodiment of the present invention. FIG. 26 shows the chirography system 2600 according to an embodiment the present invention in box diagrams, featuring main system unit 2601 connected to a representative chirographic input device 2602 and a representative output device 2603. The main system unit 2601 shows a number of modules and may feature a central processing unit (CPU) 2611, a data transmission bus 2612, a memory module 2613 connected to CPU 2611 via data bus 1212, a system timer clock 2614 connected to a CPU 2611 via data bus 2612, a data storage unit 2615 also connected to CPU 2611 via data bus 2612. Data bus 2612 may connect CPU 2611 to the output display device 2603. The main system unit 2601 may comprise an interface connector 2616 for chirographic devices, such as for example, chirographic device 2602.

CPU 2611 may comprise a program module 2604 depicted by a circle within CPU 2611. A data element 2605 of program module 2604 may comprise a multiply segmented register enclosed in module 2604. System memory 2606 may be enclosed in memory module 2613 and may be a columnar array of register data elements. A copy of one element of the memory array 2606 may be loaded onto one register segment of CPU 2611, for example.

A system clock module 2614 may features a segmented register element 2607, where the segments may represent accumulated time data, tick countdown data, and other hardware data, such as a device line interrupt array, for example. Data storage element 2608 of data storage unit 2615 is shown as a two dimensional array of register data elements in FIG. 26, and may be implemented by a mass storage disk.

The chirographic device 2602 may employ at least two types of data elements, comprising for example, array 2617 of interface data registers and array 2619 of measured chirographic position data. An output device 2603 may also employ at least two forms of output data, for example, device memory module 2620 for a raster image array and a display image medium 2621.

A data transmission bus 2612, in FIG. 26, may comprise an external extension 2618, which may interconnect the chirographic device 2602 to central system unit modules, for example. Data transmission bus 2612 may comprise three parallel lines logically representing three separate channels for input, output, and interrupt for example.

Figure 27:
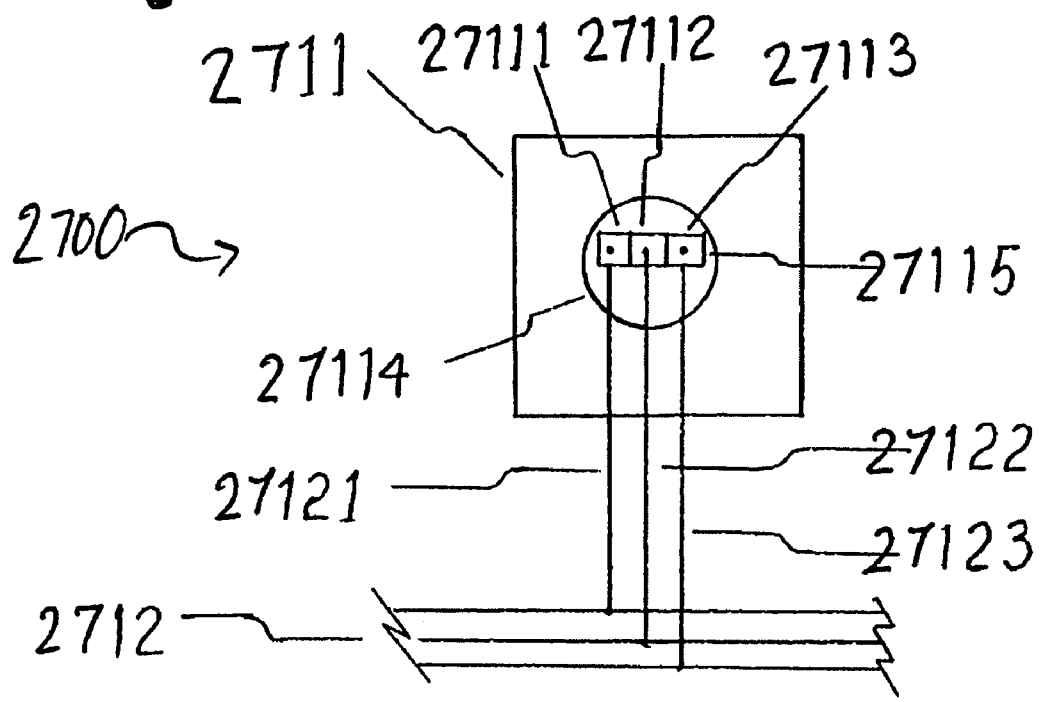
FIG. 27 is a schematic diagram of a central processing unit (CPU) comprising a data transmission bus and a CPU register and an operating system kernel according to an embodiment of the present invention.

FIG. 27 is a schematic diagram 2700 of a central processing unit (CPU) 2711 comprising a data transmission bus, a CPU register, and an operating system kernel according to an embodiment of the present invention. FIG. 27 illustrates a CPU module 2711 corresponding to CPU 2611 in FIG. 26. A contained program module 27114 was labeled 2604 in FIG. 26. Similarly, segmented register 2605 of FIG. 26 is labeled 27115 in FIG. 27. Segmented register 27115 may be segmented in three ways: by segment 27111 for data input, by segment 27112 for hardware interrupt lines, and by segment 27113 for data output, for example. The three data end-points may correspond to three channels of transmission bus 2712, which may feature channels 27121, 27122, and 27123 terminating at CPU register segments 27111, 27112, and 27113, respectively. The opposing end-points at the device end of the bus are shown in FIG. 28.

Figure 28:
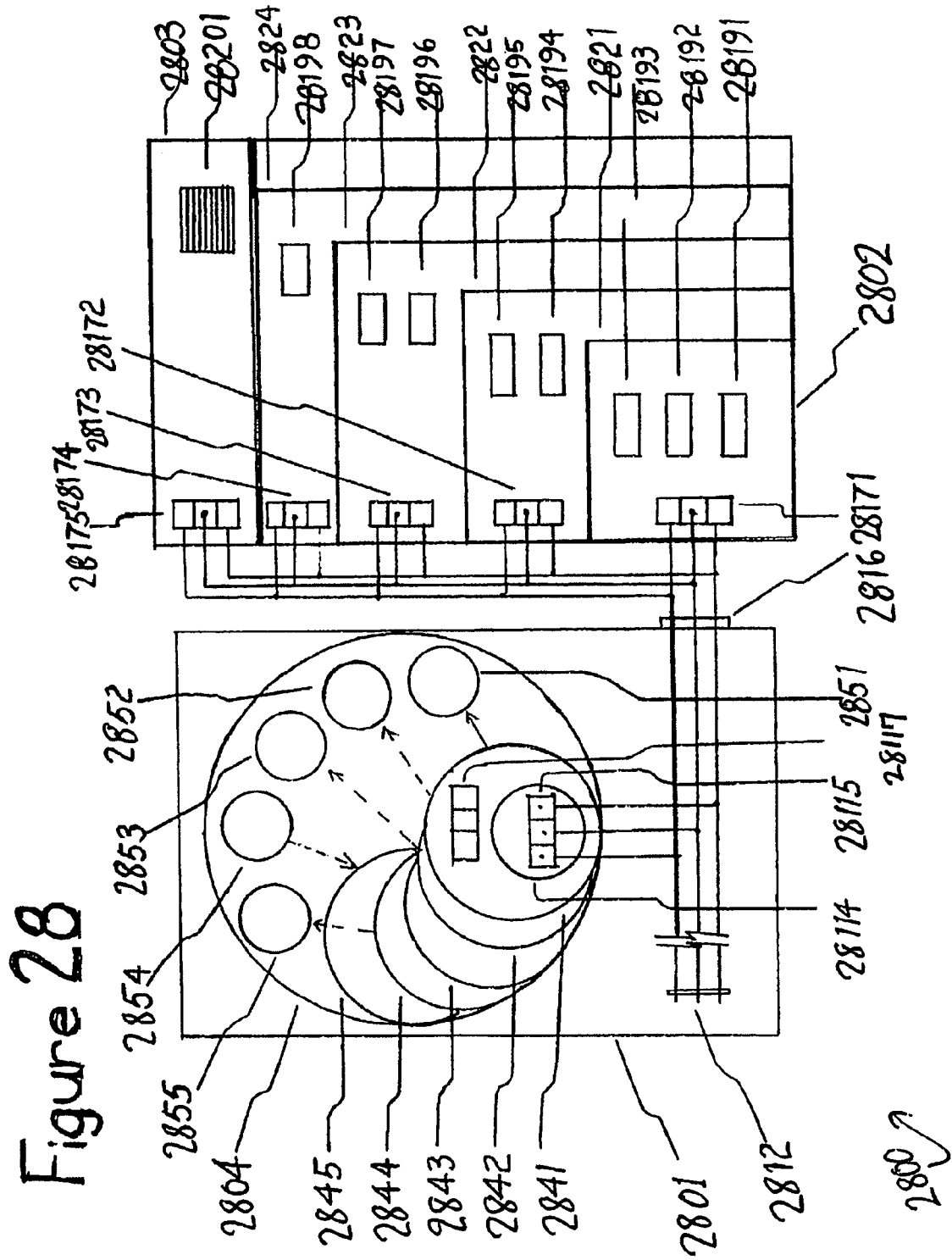
FIG. 28 is a schematic diagram of an operating system kernel comprising a device driver module and a corresponding interface to a chirographic device and corresponding chirographic data wherein a chirographic application program module may utilize chirographic device data according to an embodiment of the present invention.

FIG. 28 is a schematic diagram 2800 of an operating system kernel comprising a device driver module and a corresponding interface to a chirographic device and corresponding chirographic data, wherein a chirographic application program module may utilize chirographic device data according to an embodiment of the present invention.

FIG. 28 shows the data paths illustrated in FIG. 27 in more detail. System unit 2801 is enlarged and bus and program elements are featured. A portion of system unit 2801 is shown containing an enlarged program module 2804. Bus channels are shown connected directly from a triple-segmented register 28115 to a cut-away section of a triple-channel transmission bus 2812. Termination points of the bus channels may be chirographic interface register arrays. The data transmission bus may terminate at an interface register array of each device. These are shown in FIG. 28 for five representative devices and are numbered sequentially from reference numeral 28171 to 28175, and each interrupt endpoint may be marked with a bold dot on an interrupt vector register segment, for example.

Bus channels of bus 2812 may pass through a bus connector 2816 to an array of devices contained within representative device 2802. The devices may be labeled 2821 for a reader device type, 2822 for a writer device type, 2823 for a scanner/marker device type, for example. An output device type may be labeled 2803 and may correspond with an output device type illustrated in FIG. 26, for example, and may be a printer or another display type. The devices in FIG. 28 are shown in cascading plan relief, with the reader device type 2821 in the foreground and the output device type 2803 in the furthest background position. For purposes of description, the foreground device may be considered to be in active communication with the CPU by a holding of an interrupt lock on a bus communication channel.

Program module 2604 of FIG. 26 may be assigned to operating system kernel 2804 in FIG. 28. Segmented register 27115 from FIG. 27 may be in detailed kernel input/output (I/O) context 28114 of kernel program module 2804. The kernel I/O context 28114 of kernel module 2804 may belong to a device driver module 2841. In FIG. 28, device driver 2841 in the forefront, may comprise active I/O communication through segmented register 28115 with device 2821 through device interface register array 28171. Other device drivers waiting for operation on the CPU are shown in cascading relief behind the foreground device driver 2841. These may include devices 2842, 2843, 2844, and 2845, which may be connected to corresponding device drivers via interface register arrays 28172, 28173, 28174, and 28175, respectively.

The kernel module 2804 may also comprise an array of processes running in end-user context, and which may request services from the chirographic devices. The processes may be represented with application program modules labeled 2851, 2852, 2853, 2854, and 2855. For purposes of description, the modules shown may be active device drivers, and devices, and a direction of data paths may be illustrated with arrows between the application modules and the device driver module.

A solid arrow of the data path between device driver 2841 and application program module 2851 may indicate active data exchange between them. Other data paths, that are in idle state, such as between 2844 and 2855, for example, are shown with broken line arrows. Presuming that a device driver cascade order corresponds to a queue order for device 2802, it may be inferred that in the processing instance illustrated in FIG. 28, output device 2803 may be servicing application module process 2854 through device driver module 2845, for example.

Application data received by the application modules may be transmitted from contents of the position data arrays of an appropriate device type. Reader device 2821 may feature an array of data elements 28191, 28192, and 28193 of three spatial chirographic measurements. Writer device 2822 may feature typeface X-Y coordinate measurements stored on position registers elements 28194 and 28195. Text setter device 2823 may feature position register elements 28196 and 28197 to store a carriage column position in a line and row rank of a line in a setting page. A scanner/marker device 2824 may add a scan direction or pen orientation data register 28198 to the preceding device types.

At a beginning of each data acquisition cycle of a device driver, the device driver may copy an initial time of acquisition from a real time register 28117. At an end of a data acquisition cycle, the device driver may associate acquired positional data with a recorded real time interval. In some embodiments a time counter may be available on a device. A time nearest to a position measurement may be more accurate, so the chirography system design may take that into account. When the chirographic device has a clock, data provided by the device may include accumulated time of that device. A protocol for electing a primary time management module (timekeeper) may be instituted when the system comprises multiple devices, with different counter frequencies. A CPU timer may comprise a primary reference for all clocks on a chirographic device.

Figure 29:
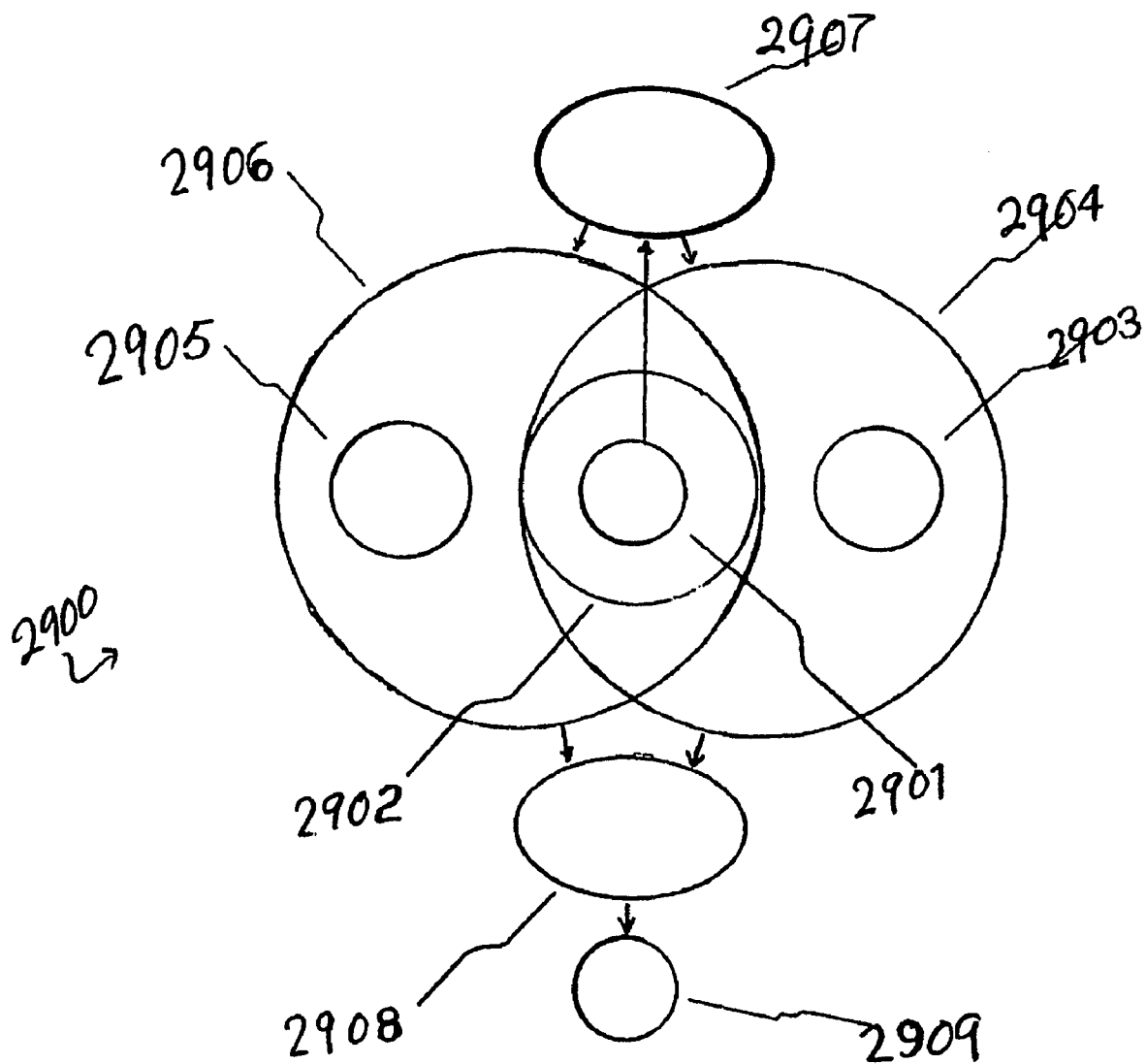
FIG. 29 is a Venn diagram schematic view of chirographic applications and data sharing paths employed by various application types according to an embodiment of the present invention.

FIG. 29 is a Venn diagram 2900 schematic view of chirographic applications and data sharing paths employed by various application types according to an embodiment of the present invention. FIG. 29 represents a high level schematic depiction of designs of chirographic application programs of a chirography system. The depiction is in the form of a Venn diagram showing common procedures and data shared paths among the application types.

Procedures of the spatial character recognition technique in accordance with an embodiment of the present invention may be are codified by character recognition application module 2901. Text character manipulating procedures may be codified by text character setting application module 2902. Recreating spatial position data from scanned text may be codified in scanning application module 2903. Module 2904 may indicate a scanner function employing procedure of setter module 2902 and recognition module 2901, and scanning application 2903. A sign styling application module 2905 may also rely upon procedures of the setter module 2902 and the recognition module 2901 in a fully integrated styling module 2906.

The chirography applications may comprise a repository of reference paths of a writing system depicted by module 2907 in FIG. 29. The repository may be developed by a calibration of a reader or writer device type. Calibration may be represented with an arrow leading from module 2901 to module 2907 in FIG. 29. Later use of recognition data may be illustrated with the arrows leading downward from module 2907 to modules 2904 and 2906, and from modules 2904 and 2906 to rendering module 2908. The result of the rendering application module 2908 leads to a raster imaging procedure 2909 of the output device.

Figure 30:
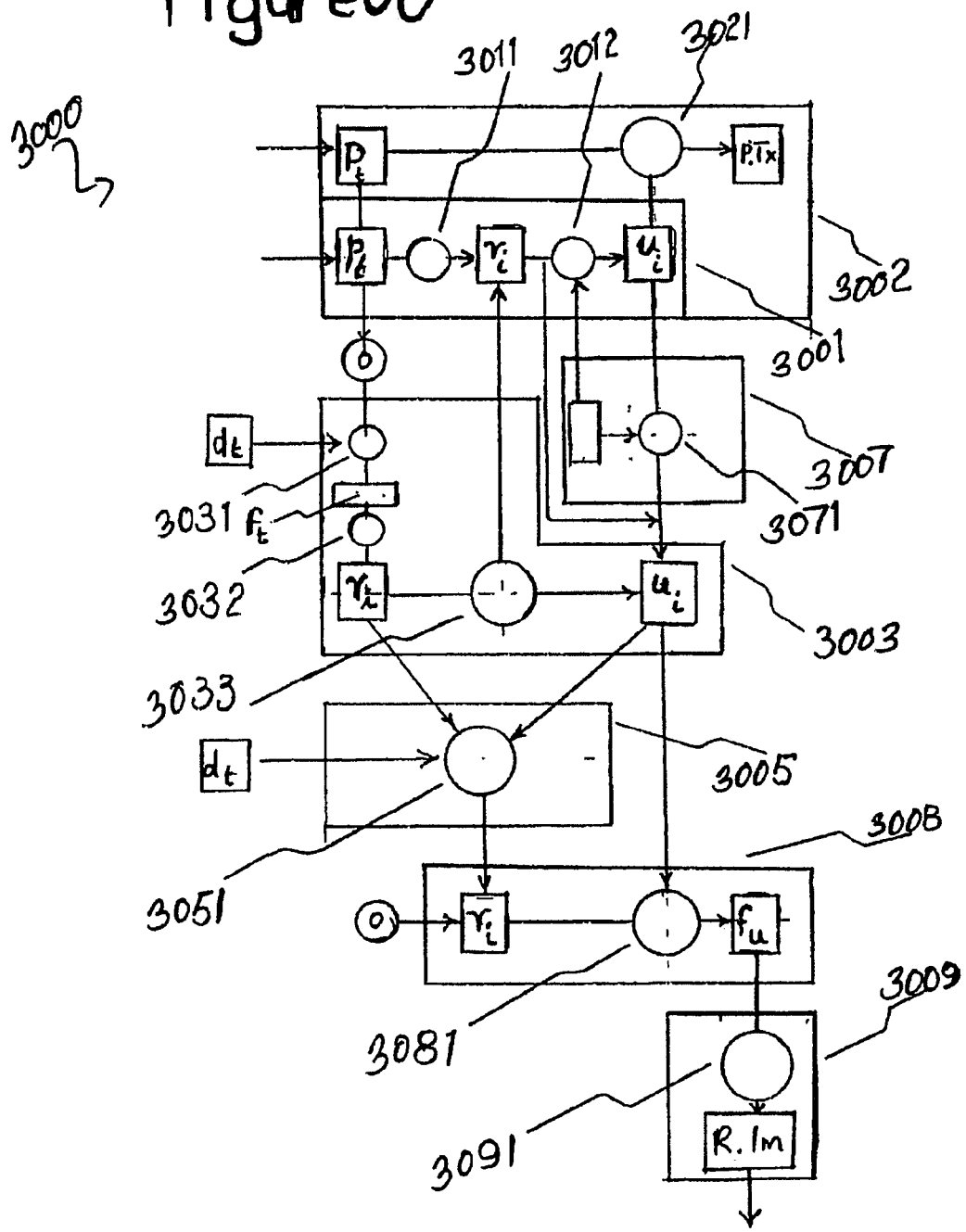
FIG. 30 is a diagram illustrating chirographic application modules showing main data transformations of respective chirographic procedures according to an embodiment of the present invention.

FIG. 30 is a diagram 3000 illustrating chirographic application modules showing main data transformations of respective chirographic procedures according to an embodiment of the present invention. FIG. 30 illustrates details of chirographic application modules showing data transformations of chirographic procedures. Exemplary modules illustrated are a character recognition module 3001, a text-setting module 3002, a scanning module 3003, a styling module 3005, a reference repository module 3007, a rendering module 3008, and an output raster-imaging module 3009.

The character recognition module 3001 may perform a spatial transformation procedure 3011 converting real-time position data $p_t$ into indicatrix vector reference paths $r_i$. The character recognition module 3001 may perform a recognition procedure 3012 identifying captured paths from potential reference text paths $u_i$.

The character text-setting module 3002 may employ real-time setter positioning data $P_t$ and identified text characters $u_i$ to set a page of text $P_{Tx}$ using a setter procedure 3021.

The scanner module 3003 may comprise scanning procedure 3031 aligning position inputs $p_t$ and $P_t$ along a scan orientation $d_t$ to recognize font coordinates $f_t$. The procedure may be followed by indicatrix vector normalization procedure 3032 resulting in indicatrix vector reference paths $r_i$. The scanning result may be applied to the recognition process, as implied by a data path arrow taking result $r_i$ into the character recognition module 3001 or may be applied to rendering along a data path leading to rendering module 3008.

In a similar fashion, the sign styling module 3005 may apply orientation direction $d_t$ to position inputs $p_t$ and $P_t$ before taking stylized result $r_i$ into rendering module 3008.

The rendering module 3008 may convert indicatrix vector paths $r_i$ into unit font frame coordinates by a path flattening procedure 3081. Procedure 3091 of output module 3009 may magnify a unit frame image $f_u$ to dimensions of output raster device image $R_{im}$.

A chirography system in accordance with an embodiment of the present invention may be operated through connecting all units of the chirographic system and electrically powering them. A kernel of the operating system may identify connected chirographic devices and initiate the devices with an appropriate device initialization request, for example.

The operating system may be configured to handle user-initiated requests for chirographic data. The chirographic devices may be initialized by the operating system during start-up, as services that may always be available, and particular applications may be invoked after start-up, upon request by a user.

When the power is turned on and a device is detected at the operating system kernel, an INITIALIZE directive may be invoked to set all operational data to a reference starting value corresponding to an appropriate initial position of deployment of the device, for example.

For each user-process requesting chirographic services, an initialization of data channels for input and/or output may be made with an OPEN device request. When a process completes, the device may restore channel resources back to the kernel with a CLOSE device request. Other user-initiated directives may include requests, such as for example, a RESET request, which would perform the equivalent of the INITIALIZE request. Likewise, a REOPEN request or an equivalent thereof may perform a user-level reset of the device channels.

When the system power is turned off, or if a shutdown directive is received by the kernel, the operating system may send a TERMINATE directive to the chirographic device for safe termination of activities.

Elimination of a wire connection for a chirographic device may be achieved through opening a circuit of a device wire connection and replacing two open circuits (a transmitting and receiving open circuits, for example) with wireless assemblies. The wireless assemblies may comprise an antenna, a transmitter, and a receiver for a wireless communication medium, such as for example, radio frequency (RF) or infrared (IR) electromagnetic radiation, for example.

A transmitter/receiver assembly may be connected to a chirographic device via a data wire outlet and to a system unit via a data transmission bus connector, for example. The two assemblies may communicate wirelessly with each other. The wireless assembly connected to the system unit may be adapted to receive transmissions from the chirographic device and communicate the signals to a system CPU in the same manner as a directly connected device.

A wireless assembly connected to a system unit may be adapted to transmit to the chirography device via an antenna in the same manner as a directly connected CPU. Conversely, a wireless assembly connected to a system unit may be fitted with circuitry to emulate the chirography device and avoid wireless transmission to the device if upstream communication from the CPU to the device is not required. The wireless assembly connected to the system unit may be fashioned into an adaptor receiving transmissions and responding to CPU communications.

An emulating adaptor may be coupled to the system unit at a data bus connector and the system CPU may interface with an emulated device register array. The interface register array may transmit data elements to the CPU from the emulated position data array elements. The elements may be mapped by metadata definitions of a wireless device. A wireless transmission module of the adaptor may receive the metadata as a first wireless connection initialization step, for example. The emulator may distribute received metadata capabilities of a sending device into mappings for the adaptor emulated data array.

Subsequent data transmissions may be received and distributed to the emulated data arrays according to the metadata device capabilities data mapping. A catch-buffer may be added to the emulator and employed to accumulate received data points and to accommodate differences between CPU reading rates and wireless transmission rates, for example.

In accordance with an embodiment of the present invention, chirographic input device readings may be directed to a wireless transmission module. The wireless transmission module may continually transmit recently acquired values to a receiving adaptor.

Figure 31:
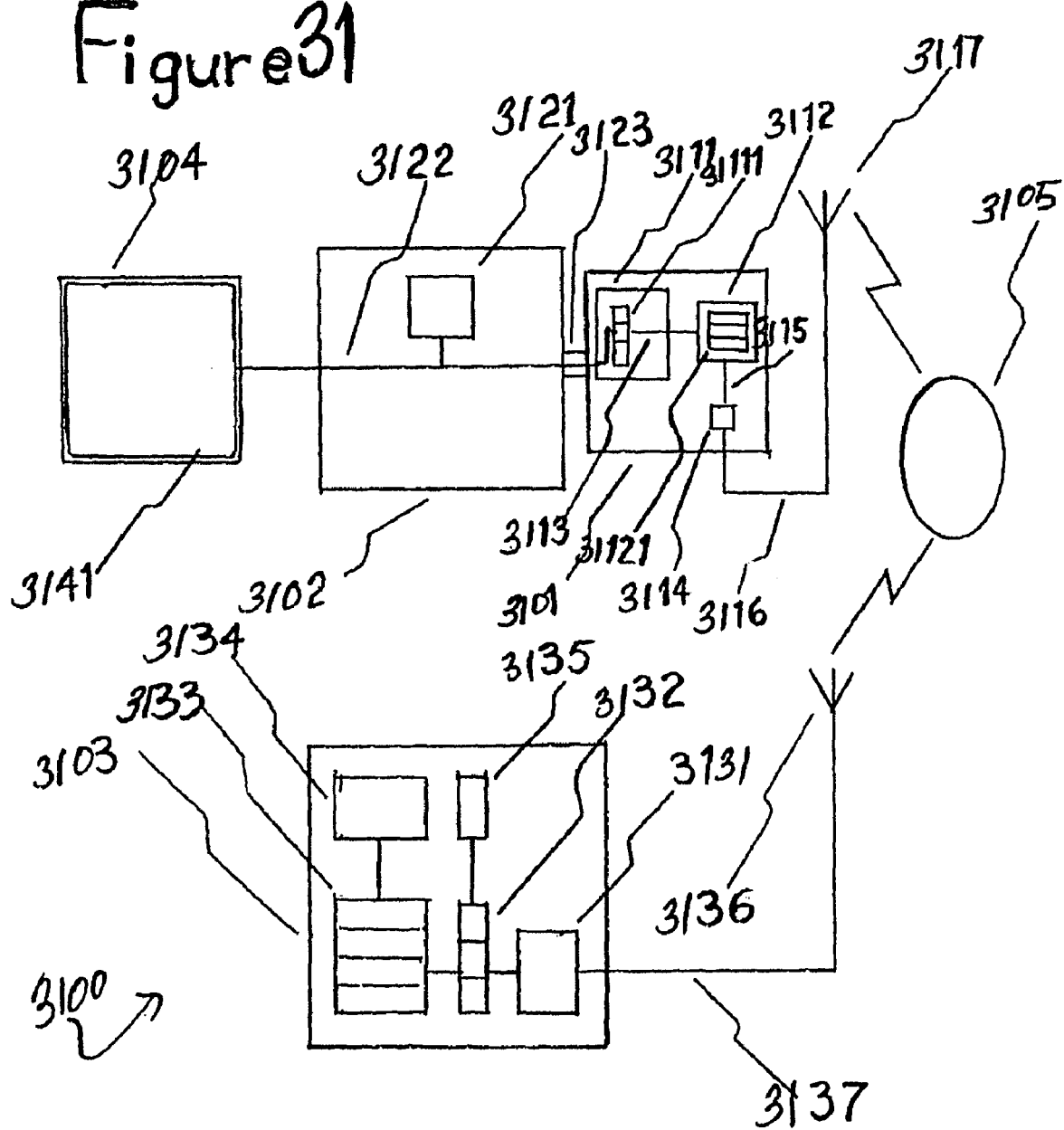
FIG. 31 illustrates a chirographic system comprising a central system unit connected to an output device and to an adaptor of a chirographic input device wherein the chirographic input device may comprise wireless communication via a wireless adaptor according to an embodiment of the present invention.

FIG. 31 illustrates a chirographic system 3100 comprising a central system unit connected to an output device and to an adaptor of a chirographic input device, wherein the chirographic input device may comprise wireless communication via a wireless adaptor according to an embodiment of the present invention. FIG. 31 illustrates a wireless spatial chirography system in accordance with an embodiment of the present invention. The system may comprise a wireless adaptor unit 3101 attached to a main system unit 3102 by a connector 3123. The adaptor unit 3101 may be in wireless contact with a chirographic device 3103 through an electromagnetic medium 3105 comprising radio frequency (RF) or infrared (IR) transmission frequencies, for example. The system unit 3102 may comprise a CPU module 3121 and a data transmission bus 3122. The data transmission bus 3122 may be connected via an output display device 3104 to CPU module 3121. The connector 3123 attaching main system unit 3102 to the wireless adaptor 3101 may also serve as an interface connector 3123 for a chirographic devices data path.

The wireless adaptor 3101 may comprise a chirographic device interface emulator 3111 comprising an emulated interface device interface register array 31111 connected to a data module 3112 via data path 3113. The data module 3112 may comprise an array of data elements 31121 and the values contained in the array elements may be chirographic position data received via wireless adaptor via data path 3115 from a wireless receiver module 3114. The wireless module 3114 may receive a signal from antenna 3117 via data path 16 and the signal may be decoded and converted into data buffered into data elements 31121.

A wireless chirographic device 3103 may comprise all the features of a chirographic peripheral device, such as for example, an interface register array 3132 and an array of spatial position data elements 3133. The device 3103 may also comprise a wireless transmitter module 3131 adapted to send device data to adaptor 3101 via serial transmission at antenna 3136 via data path 3137. The transmitted data may include device metadata represented by auxiliary register element 3135 defining an identity of source interface 3132, and by auxiliary data element 3134 defining an identity of data array elements 3133. To the interface emulator 3111 of adaptor 3101, the data array 3112 may appear to be a buffer 3133 of the chirographic device 3103.

An operation in accordance with an embodiment of the present invention of a wireless chirography system may be a one-way wireless communication between a chirographic input device and the main system unit. This may be accomplished by a protocol supplying the wireless adaptor, at initialization of wireless transmissions of the chirographic device, a complete metadata mapping of the chirographic device data capabilities. The metadata may include an identifier for each data element, an indicator of type of element, and a sequential position within the interface register array and data array. The metadata register array may include a transmittal sequence number counter and a local clock timer counter.

The initial transmission may convey all of the foregoing metadata to the receiving wireless adaptor. The metadata on the wireless adaptor may be used to assign subsequent destinations for serial data received from a wireless chirographic device.

Subsequent transmissions from the wireless chirographic device may comprise the contents of data array elements encapsulated in register metadata, such as for example, the transmittal sequence number.

A chirography system in accordance with an embodiment of the present invention may be capable of running chirographic applications. Chirographic applications may comprise chirographic sign reading, text character identification, text reading, page layout setting, handwriting page scanning, sign styling, and image rendering, for example. These applications may be performed separately or in combination to achieve combined effects. All applications may be hosted on one system. Chirographic devices may be distributed among system hosts specialized to peculiar functions of chirographic device. Combining chirographic effects may comprise employing multiple networked chirography systems.

One chirography application may comprise conversion of handwriting into laid-out text, wherein the text may be converted into identified binary information interchange codes, such as for example, ASCII, EBCDIC, and UNICODE. A chirographic system may provide a gateway from the realm of handwriting into digital computing. A chirographic system network may be a natural extension of a system for inter-networking into a realm of binary coded information exchange.

Another chirography application may comprise scanning of handwriting for the purpose of conversion into binary information interchange codes. Another may be rendering handwriting styles as a font type. Another may be calligraphic styling of handwriting signs. Another may be styling of script with ink-brush font effects.

Aspects of the present invention may be found in partitioning applications of a chirography system into distributed services, grouping the services by data manipulation characteristics, and classifying the services by protocol designations relative to a type of request from a service client perspective. Protocols specify how client-hosted requests may be conveyed to service hosts, and how a server conveys back a response result.

In an embodiment according to the present invention, three primary protocols may be defined, each corresponding to a particular type of client request. The three primary protocols may comprise, for example, a handwriting protocol, an image rendering protocol, and a digital information interchange protocol.

Figure 32:
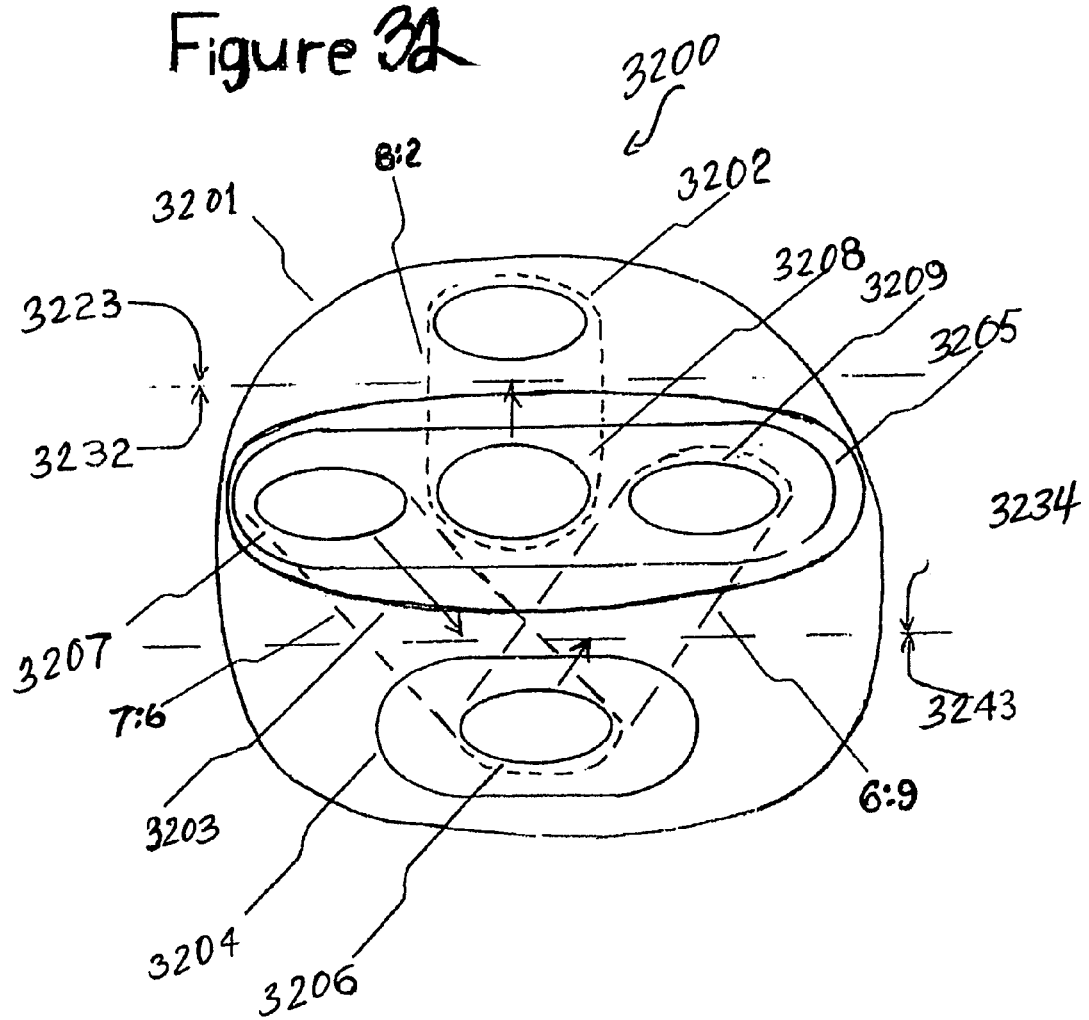
FIG. 32 illustrates chirographic applications partitioned into three protocol groupings in schematic Venn diagrams featuring digital information exchange, handwriting, and image rendering chirography protocol areas according to an embodiment of the present invention.

FIG. 32 illustrates chirographic applications partitioned into three protocol groupings in schematic Venn diagrams 3200 featuring digital information exchange, handwriting, and image rendering chirography protocol areas according to an embodiment of the present invention. FIG. 32 illustrates the chirography applications featuring digital information exchange, handwriting, and image rendering chirography protocol areas. The entities may be indicated by ovals and are labeled sequentially by digits. Generic chirography protocol may be an all-containing oval labeled 3201 in FIG. 32. This chirography protocol may be partitioned into three protocols: a digital information interchange/text recognition protocol labeled 3202, a handwriting/chirography protocol labeled 3203, and a rendering protocol labeled 3204. These three protocols may be adapted to interface via conversion services.

Data protocol conversions from chirographic protocol 3203 into digital information interchange 3202 may be illustrated via dividing line labeled 3232. Conversions in an opposite direction, for example, when converting reference character set text into handwriting, may comprise a reverse conversion interface 3223.

The chirography protocol 3203 may comprise a text-setting/page layout protocol labeled 3205. The rendering protocol 3204 may comprise an imaging protocol labeled 3206.

At a next level, the page layout protocol 3205 may comprise a styling protocol 3207, a reading protocol 3208, and a scanning protocol 3209, respectively.

A reader may utilize the information interchange protocol 3232 across text recognition. The text reader protocols may labeled employing combination label 8:2 in FIG. 32 using an oval traced with a broken line and comprising source and destination protocols, and labeling the composite of both in a same sequence as a defining interface direction.

A styling marker may employ the styling layout protocol 3207 to render the pen tip aperture. The styling layout protocol 3207 may employ the imaging protocol to a pen-tip aperture style imaging. The Styling layout protocol 3207 may cross protocol interface 3234 and may utilize the protocol combination delineated with the broken line labeled 7:6 in FIG. 32.

The scanner may employ scanner layout protocol 3209 to develop a scanned page and font spatial positions developed from elements of a unit font frame imaging protocol 3206 in a direction reversed from the rendering process. A scanner may employ protocol type 6:9 across interface 3243.

Figure 33:
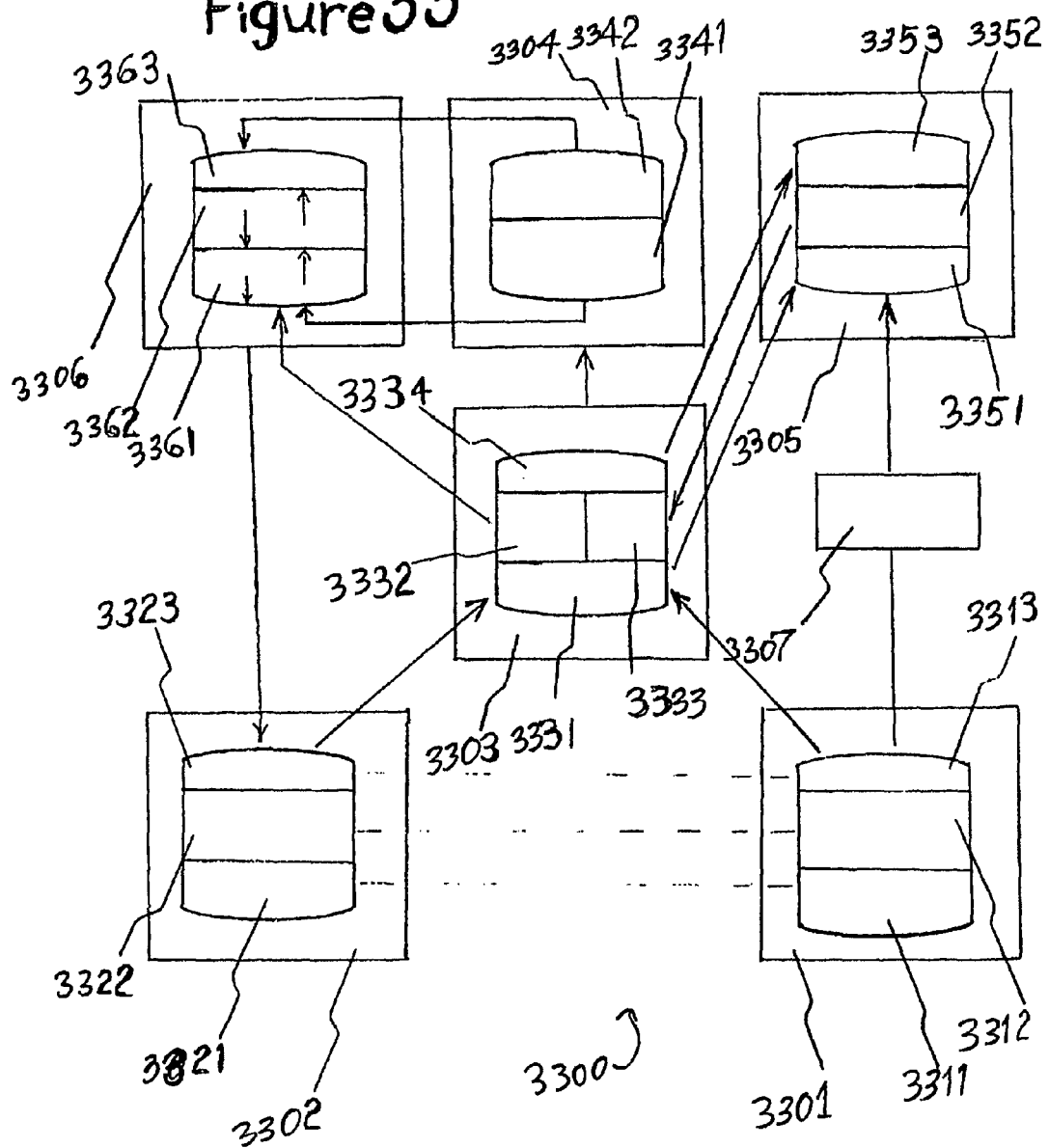
FIG. 33 illustrates three protocol groupings arranged in columns with details providing protocol procedures and/or data type according to an embodiment of the present invention.

FIG. 33 is a diagram 3300 illustrating three protocol groupings arranged in columns with details providing protocol procedures and/or data type according to an embodiment of the present invention. Render groupings 3302 and 3306 appear on the left side and recognition groupings 3301 and 3305 appear on the right side of the central chirography protocol groupings 3302 and 3304. Each protocol grouping may comprise sub-types arranged in a bottom-up sequence. The semantics of chirography protocol groupings 3302 and 3304 may require that the sub-types be procedures or actions relating to handwriting, for example. The chirography protocol stack may outline a functional decomposition.

The recognition column groupings 3301 and 3305 on the right hand side of FIG. 33 may comprise data sub-types arranged in relative proximity to chirography protocol grouping sub-types. At the bottom, spatial data may used to form characters of a writing system. In the middle, spatial data may be standardized. In the upper portion, standardized data may be convertible into information interchange encoded text.

The renderer column groupings 3302 and 3306 on the left may comprise geometric entities sub-types that may be converted to other sub-types by manipulation with rendering and presentation protocols. The left column features renderings of differing forms of geometric entities, and whose content may be described by geometric symbols or images. These rendering forms may be image data type and may be pertinent in a visual input/output context of adjacent chirography protocol services.

The layering may be given in bottom-up sequence and may be refined slightly by grouping sub-type items that are closely related. The layering of sub-types may be interleaved with other identifying characteristics.

A stylus positioning data sub-group may be labeled 3301. This sub-group may comprise three layers of positioning data forms. An analog stylus position comprising a position signal asserted by reader sensors and labeled 3311, spatial stylus paths comprising an array of positions converted to geometric coordinate measurements calibrated into spatial units and labeled 3312, and standardized stylus paths suitably transformed for rendering or recognition protocols and labeled 3313.

The font-frame positioning may be labeled 3302 at the same layer as stylus positioning data sub-group 3301 but in the left column. Constituent sub-types may be similar as for sub-group 3301 except of font-frame perspective, and may comprise: a typeface position corresponding to a stylus location and labeled 3321, a typeface curve or arc corresponding to a projection of a spatial stylus path and labeled 3322, and a standardized set of handwriting strokes on a type face and labeled 3323.

The chirographic protocol grouping may be labeled 3303 and may be placed slightly above the stylus positioning sub-groups and may be consumed by chirographic protocol group 3303. The chirographic protocol grouping may be made up of the following: a reading protocol labeled 3331, a rendering protocol labeled 3332, a recognition protocol labeled 3333, and a setting protocol labeled 3334.

The presentation protocol sub-grouping may be next in the bottom-up layering sequence and labeled 3304. Presentation protocol sub-group 3304 may comprise: a stylizing protocol labeled 3341 and a scanning protocol labeled 3342.

The information interchange and recognition references may be assigned to the next sub-group labeled 3305. The reference collection of standardized paths of a writing system may be labeled 3351, the information interchange code assignments of the reference collection labeled 3352, and a composite digital document encoded in interchange code and labeled 3353. The digital document 3353 may arise from gathering of text elements 3331, which may be identified by recognition protocol 3333 and deposited into a page buffer by setter protocol 3334.

Rendered image forms grouped under an imaging sub-group may be labeled 3306 and may comprise: a pen aperture rendered in image sub-type labeled 3361, a unit font face image rendered in imaging sub-type 3362, and a raster image rendered in imaging sub-type 3363.

The calibration protocol may be grouped separately under label 3307. Calibration subsumes the operation of reading, so that the calibration protocol may properly be contained in reading protocol 3331. It is illustrated separately in FIG. 33 to minimize confusion.

When performing handwriting operations, the data conversion direction in FIG. 33 may be marked by upward pointing arrows in the lower right section. A text character reading operation may be accomplished by acquisition of stylus position readings 3311 and transforming the readings 3311 into spatial measurements 3312 of the stylus path and normalizing the stylus paths spatial measurements 3312 into a standard form 3313, for example.

When creating a new set of reference paths for a writing system character set, the vertical arrow indicates the next conversion path from standardized paths 3313 into reference paths 3351 via the calibration protocol 3307. When using a writer device to do the calibration, additional font frame position readings 3323 may supplant the less accurate X-Y coordinate readings of standardized path 3313 in the calibration protocol 3307.

The font-frame position readings 3323 may also be amenable to visual display via rendering protocol 3332. Calibration inputs may be visually checked for accuracy before they are committed to the reference collection 3351.

When the reading procedure is performed for information interchange, the recognition protocol 3333 may convert the standardized path 3313 into information interchange coded text 3352 by comparison against the reference collection 3351.

Where the writing is conducted with a setter device, additional carriage and line position measurements may enable the sequential setting of recognized text via the layout protocol 3334. The result may be a composite collection of information interchange code text, or a digital document 3353 appropriately annotated with page layout control characters such as 'new line' and 'carriage return'.

When the object of the reading operation is to display handwriting, the standardized stylus path 3313 may be amenable to manipulation by the rendering protocol 3332 for conversion into an output image 3363 as magnified from the unit frame image 3362.

When the handwriting is done with a stylizing marker, the rendered pen aperture image 3361 and the flattening projection of standardized spatial path 3313 may be modified according to the type of stylizing being performed by the stylizing protocol 3341. When the styling is that of an art brush stroke, the standardized paths may be used to vary the pen thickness according to ink depth, and so modifying an un-stylized font image into a stylized image. Where the object of the handwriting is a printing of the stylized image, the stylized image may be magnified to raster frame dimensions of the printer before printing.

In the scanning protocol 3342, the starting data may be the raster image 3363. The setting procedure 3334 may be reversed to isolate a first font image 3362 of a handwritten character, and whose standardized path may be recreated by the scanner procedures. The scanning procedure may reverse the flattening step of the rendering process to create the standardized stylus path 3313 from the flat font face values 3323. When the object of the scan is to create a document 3353 of digital interchange code text 3352, the standardized path 3313 may subsequently undergo text recognition via recognition protocol 3333 outlined in the preceding sections.

Figure 34:
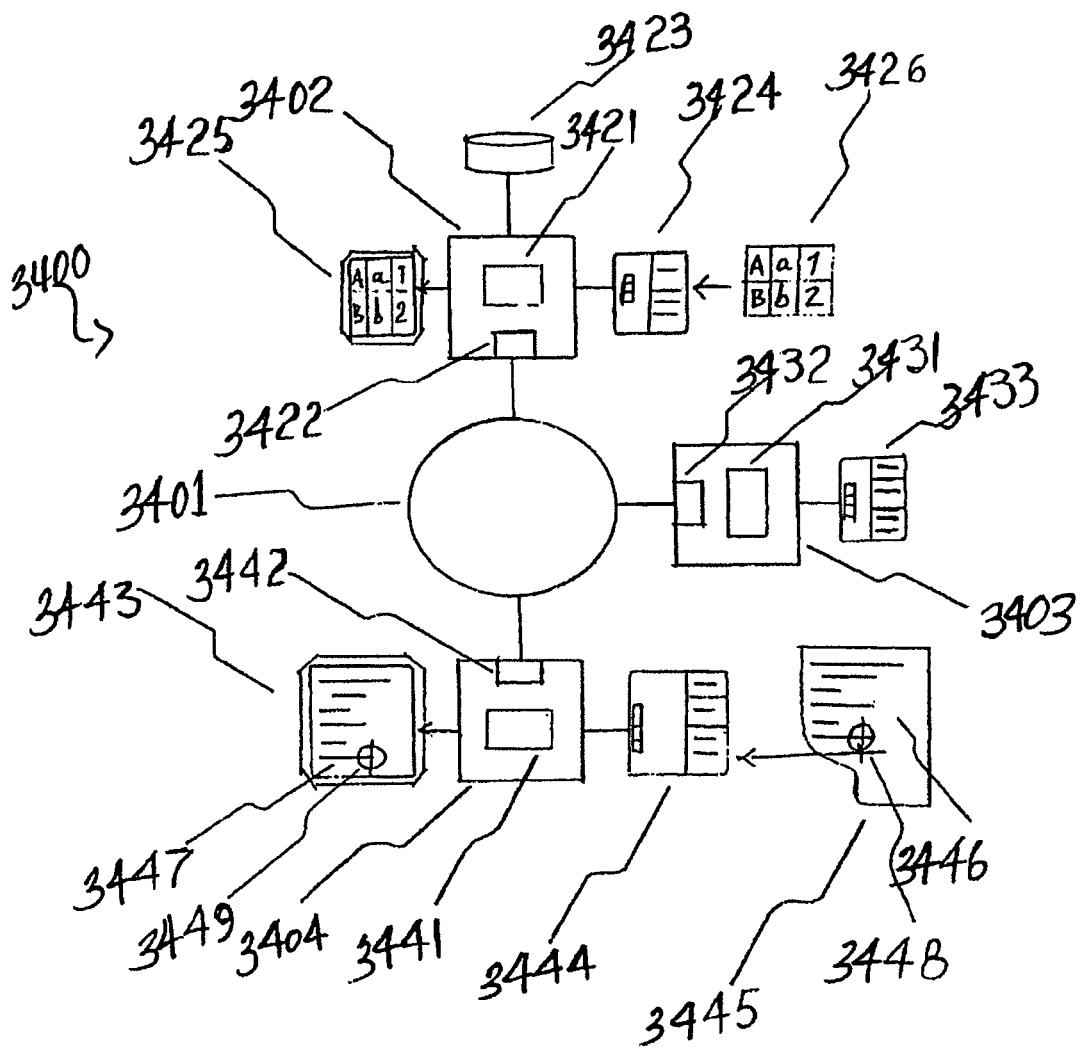
FIG. 34 illustrates a chirographic network in schematic form comprising networking components in a chirographic system wherein three types of chirographic systems are illustrated according to an embodiment of the present invention.

FIG. 34 illustrates a chirographic network 3400 in schematic form comprising networking components in a chirographic system wherein three exemplary types of chirographic systems are illustrated according to an embodiment of the present invention. FIG. 34 illustrates a chirography network system comprising networking components added to enable networking. An exemplary three types of chirography systems are depicted in FIG. 34. The three systems may be connected to a network 3401 via network interfaces 3422, 3432, and 3442.

A first system labeled 3402 is shown featuring network interface 3422 and CPU 3421. In this sample system, the chirographic device may be a text writer 3424, and the system may also comprise a storage repository 3423 for reference collection 3423 of text characters and standardized stylus paths. FIG. 34 illustrates a calibration procedure in progress. The inputs being calibrated may be standard characters of the Latin alphabet and occidental Arabic numerals, and a portion 3426 is shown in FIG. 34. The inputs may be visually checked by the rendered images on the output device 3425.

A second system labeled 3403 is also shown connected to the network. The system unit may comprise CPU 3431 and network interface 3432. The device 3433 may comprise data points for a setter or page layout protocol procedure. No display is featured in FIG. 34. It may be assumed that this is a field deployment of a mobile text setter, wherein immediate visual cognizance of inputs is not required, for example. No local reference collection of standardized paths is featured. The recognition services for this networked system may therefore be done remotely on system 3402, for example.

A third system labeled 3404 is also shown connected to the network. The system may comprise a CPU 3441 and a network interface 3442. An output display 3443 may be provided. The device 3444 maybe a scanner. A pre-written page 3445 is shown being scanned, and most of the page content 3446 is shown already scanned in facsimile in the output screen 3447. The scanner position 3448 in the page 3445 may be matched by a display cursor position 3449 on the output screen 3443. A facsimile display, such as output device 3443 may render the spatial data without conversion into text. When the displayed images are information interchange encoded text, then system 3404, like system 3403 may perform recognition through the network using recognition protocol services available on system 3402.

Figure 35:
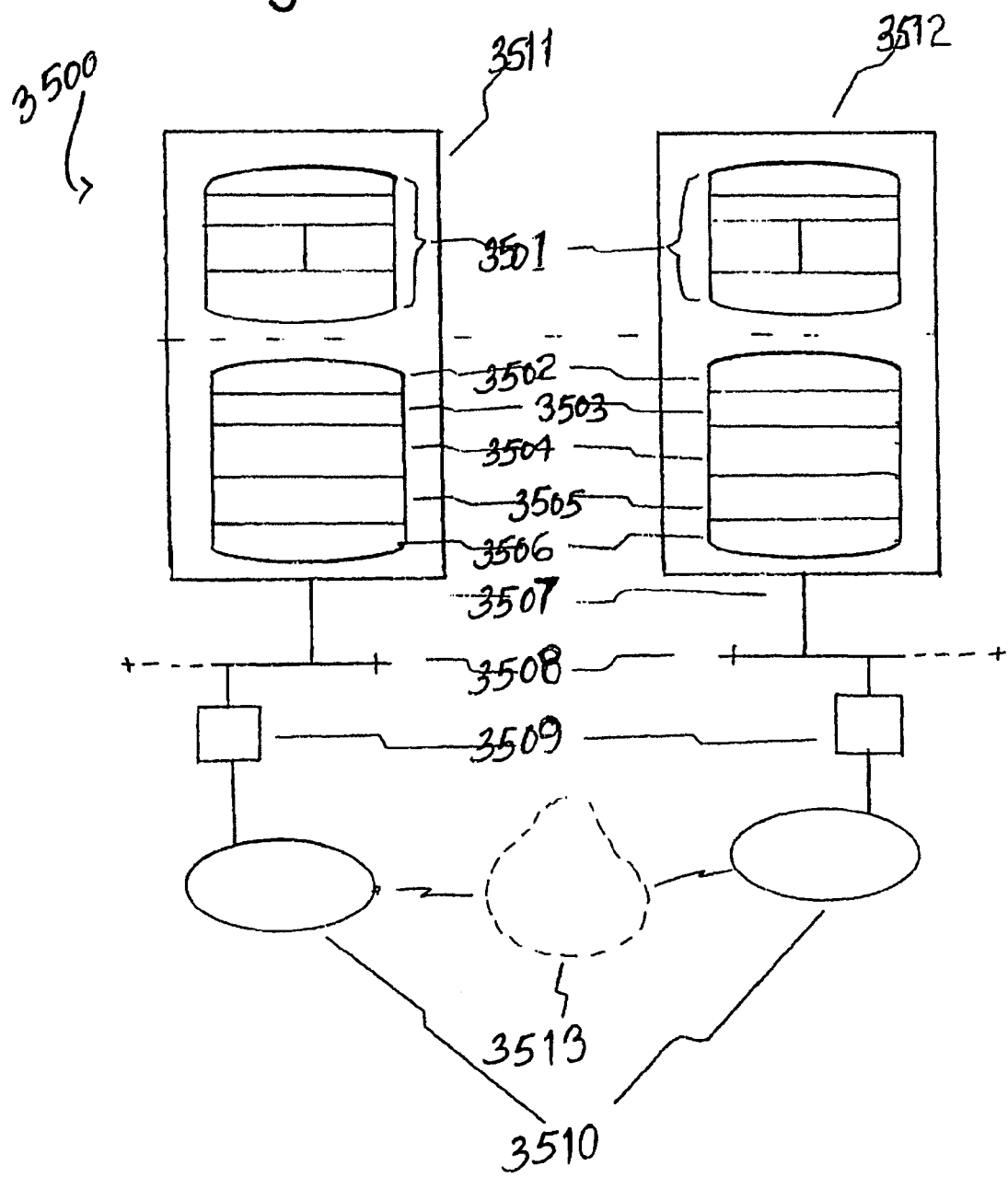
FIG. 35 illustrates additional networking protocols to facilitate operation of chirographic application protocols within a network according to an embodiment of the present invention.

FIG. 35 is a drawing 3500 illustrating additional networking protocols to facilitate operation of chirographic application protocols within a network according to an embodiment of the present invention. FIG. 35 illustrates an overall construction of the chirography network system. A representative client and server system may be displayed side by side. A client system 3511 is shown on the left and a counterpart server system 3512 on the right side of the drawing 3500. The chirography application protocols shown may be as sub-grouping 3501. The client and server sides may comprise identical protocol counterparts. Whereas a client side may feature requests and a server side may service responses. It may be customary to provide both the client and server sides with a full complement of procedures capable of utilization.

In comparison with FIG. 33 may confirm that grouping 3501 may comprise of the chirography protocols topped with the presentation protocol sub-group. Together, the protocols make up the application layer 3501 of the chirography network. Below the application protocol layer, there may be a remainder of the standard International Standards Organization (ISO) depiction of the protocols of a standard network.

A session layer 3502 may administer resources to an authenticated user of the system. A connection layer 3503 may isolate a first set of network resources as interfaces, commonly known as socket devices. These devices may be designed to as great an extent as possible respond to generic input/output (I/O) interface procedures in a manner similar to that of local devices. Whenever an I/O procedure is invoked on the socket interface, the invocation may be transported to a remote host. The response may be transported back in like fashion.

The transport layer 3504 may protect the integrity of the communications. The transport layer 3504 may rely upon the network layer 3505 to locate and bind to the remote communication end-point. The data link layer 3506 may send and receive transmission signals and perform synchronization hand-shakes with communication counterparts. A physical layer 3507 may represent the communication medium and may be the line connecting the client system 3511 and the server system 3512 to the respective networks. The physical medium may be a ground line or may be wireless. The ground line may be copper conductor or an optical fiber, each capable of providing different communication speeds. Likewise, for wireless media, the frequency range may comprise any of the commonly used broadcast frequencies.

Irrespective of the physical medium, the network topology may span a local area network first, shown by the segments labeled 3508 followed by a wide area network depicted as ovals 3510 reached via routing devices 3509. Access between wide area networks depends upon intermediate telecommunication carriers depicted by the dotted network cloud 3513 irrespective of whether they are ground line telecommunications, cable broadcast, satellite, microwave or cellular. In practice, the procedures of the network protocol 3505 may be sufficient for negotiating a pathway through all the routing devices in cloud 3513 separating the chirography client system 3511 and chirography server system 3512.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A spatial chirography system for operating spatial chirographic devices and using calligraphic styling data as an adaptation of chirographic position data of a spatial chirographic styling sign marker wherein the chirographic system comprises:
    a chirographic system unit;
    a chirographic device connected to the chirographic system unit; and
    chirographic data-including position within a volume,
    wherein the chirographic system unit comprises:
    a central processing unit;
    a system memory module;
    a system time clock;
    a data storage medium;
    a data transmission bus; and
    a wired or wireless bus connector for chirographic devices and
    wherein chirographic position adapted to styling position data of a spatial chirographic styling sign marker comprises:
        page scan position data of a chirographic text character scanner;
        an adaptation to a simulated orientation of a calligraphic nib of one coordinate of a chirographic device to a spatial direction of an orientation of a marker; and
        an adaptation to a simulated depth of ink marking by an art brush tip of one stylus position coordinate orthogonal to a typeface coordinate plane, wherein the adaptation to a simulated orientation of a calligraphic nib of one coordinate of a chirographic device to the spatial direction of the orientation of the marker comprises at least one of an adaptation of a direction of scan of a chirographic text character scanner to a spatial direction of the orientation of the marker in relation to an active direction of a marker handwritten stroke in stylus position coordinates and an adaptation of one stylus position coordinate to a spatial direction of the orientation of the marker in relation to the active direction of a marker writing stroke in the stylus position coordinate, wherein a rotation plane of stylus orientations being parallel to the typeface coordinate plane of a chirographic text character setter.

2. The spatial chirography system according to claim 1, wherein the chirographic device connected to the chirographic system unit comprises a spatial chirographic styling sign marker adapting at least one of a spatial chirographic sign reader, a chirographic text character writer, a chirographic text character writer, a chirographic text character setter, a chirographic text character scanner, a system output device, and a spatial chirographic styling sign marker.

3. The spatial chirographic system according to claim 1, wherein chirographic data of a spatial chirographic sign reader comprises:
    a time counter provided by a timing clock of the chirography system;
    a first coordinate dimension of a spatial position of a chirographic stylus tip;
    a second coordinate dimension of the spatial position of the chirographic stylus tip;
    a third coordinate dimension of the spatial position of the chirographic stylus tip; and a reading of coordinate dimensions of the spatial position of the chirographic stylus at a common minimum time interval that is a measurement relaxation time of the spatial chirography system.

4. The spatial chirographic system according to claim 1, wherein the chirographic data within a volume from which the system recognizes a character further comprises at least one of reference path data of a spatial character recognition technique, text setting position data of a spatial chirographic text character setter, page scan position data of a spatial chirographic text character scanner and renderer position data of a spatial chirographic sign rendering technique for a system output device and wherein the text setting position data of the chirographic text character setter comprises:
- font frame position data of a chirographic text character writer;
- a first coordinate dimension of a typeface carriage columnar position of the writer in a line being set with text; and
- a second coordinate dimension of a typeface line rank position of the writer in a page being set with text.

5. The spatial chirographic system according to claim 1, wherein the chirographic data within a volume from which the system recognizes a character further comprises at least one of reference path data of a spatial character recognition technique, text setting position data of a spatial chirographic text character setter, page scan position data of a spatial chirographic text character scanner and renderer position data of a spatial chirographic sign rendering technique for a system output device and wherein page scan position data of a chirographic text character scanner comprises:
- text setting position data of a chirographic text character setter;
- a direction of scan of a scanned page line in relation to a reference direction of a typeface line in setter position coordinates;
- an adaptation of a first stylus position coordinate to a first font frame coordinate and to a first scan dot position dimension;
- an adaptation of a second stylus position coordinate to a second font frame coordinate and to a second scan dot position dimension; and
- an adaptation of a third stylus position coordinate to a volume dimension offset from a frame coordinate plane and set according to a synthesized spatial path.

6. A spatial chirography system for operating spatial chirographic devices comprising:
- a chirographic system unit;
- a chirographic device connected to the chirographic system unit; and
- chirographic data, wherein the chirographic system unit comprises:
- a central processing unit;
- a system memory module;
- a system time clock;
- a data storage medium;
- a data transmission bus; and
- a wired or wireless bus connector for chirographic devices;
- wherein chirographic data comprises at least one of spatial position data of a spatial chirographic sign reader, spatial position data of a chirographic text character writer, reference path data of a spatial character recognition technique, font frame position data of a chirographic text character writer, text setting position data of a chirographic text character setter, page scan position data of a chirographic text character scanner, styling position data of a spatial chirographic styling sign marker, and renderer position data of a spatial chirographic sign rendering technique for a system output device; and
- wherein styling position data of a spatial chirographic styling sign marker comprises:
- page scan position data of a chirographic text character scanner;
- an adaptation to a simulated orientation of a calligraphic nib of one coordinate of a chirographic device to a spatial direction of an orientation of a marker; and
- an adaptation to a simulated depth of ink marking by an art brush tip of one stylus position coordinate orthogonal to a typeface coordinate plane, wherein the adaptation to a simulated orientation of a calligraphic nib of one coordinate of a chirographic device to the spatial direction of the orientation of the marker comprises at least one of an adaptation of a direction of scan of a chirographic text character scanner to a spatial direction of the orientation of the marker in relation to an active direction of a marker handwritten stroke in stylus position coordinates and an adaptation of one stylus position coordinate to a spatial direction of the orientation of the marker in relation to the active direction of a marker writing stroke in the stylus position coordinate, wherein a rotation plane of stylus orientations being parallel to the typeface coordinate plane of a chirographic text character setter.

7. The spatial chirographic system according to claim 1, wherein the chirographic data within a volume from which the system recognizes a character further comprises at least one of reference path data of a spatial character recognition technique, text setting position data of a spatial chirographic text character setter, page scan position data of a spatial chirographic text character scanner and renderer position data of a spatial chirographic sign rendering technique for a system output device and-renderer position data of a spatial chirographic sign rendering technique for a system output device comprises:
- sign styling position data of a spatial chirographic styling sign marker;
- a system memory array which to render a chirographic sign;
- an adaptation of a first dimension of the system memory array to a dimension of an output device raster dot scan position and to a first typeface coordinate dimension; and
- an adaptation of a second dimension of the system memory array to a raster line and a dimension of an output device raster line scan position and to a second typeface coordinate dimension.

* * * * *